United States Patent
Ray et al.

(10) Patent No.: US 12,056,906 B2
(45) Date of Patent: Aug. 6, 2024

(54) COMPRESSION OF MACHINE LEARNING MODELS UTILIZING PSEUDO-LABELED DATA TRAINING

(71) Applicant: Intel Corporation, Santa Clara, CA (US)

(72) Inventors: Joydeep Ray, Folsom, CA (US); Ben Ashbaugh, Folsom, CA (US); Prasoonkumar Surti, Folsom, CA (US); Pradeep Ramani, Milpitas, CA (US); Rama Harihara, Santa Clara, CA (US); Jerin C. Justin, San Jose, CA (US); Jing Huang, Chandler, AZ (US); Xiaoming Cui, Santa Clara, CA (US); Timothy B. Costa, Beaverton, OR (US); Ting Gong, San Jose, CA (US); Elmoustapha Ould-ahmed-vall, Chandler, AZ (US); Kumar Balasubramanian, Chandler, AZ (US); Anil Thomas, San Ramon, CA (US); Oguz H. Elibol, Sunnyvale, CA (US); Jayaram Bobba, Portland, OR (US); Guozhong Zhuang, Hillsboro, OR (US); Bhavani Subramanian, Hillsboro, OR (US); Gokce Keskin, Mountain View, CA (US); Chandrasekaran Sakthivel, Cupertino, CA (US); Rajesh Poornachandran, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/466,141

(22) Filed: Sep. 13, 2023

(65) Prior Publication Data
US 2024/0070926 A1 Feb. 29, 2024

Related U.S. Application Data

(63) Continuation of application No. 18/152,643, filed on Jan. 10, 2023, now Pat. No. 11,798,198, which is a
(Continued)

(51) Int. Cl.
*G06F 12/02* (2006.01)
*G06T 9/00* (2006.01)
*G06T 15/00* (2011.01)

(52) U.S. Cl.
CPC ............ *G06T 9/002* (2013.01); *G06F 12/023* (2013.01); *G06T 15/005* (2013.01); *G06F 2212/302* (2013.01); *G06F 2212/401* (2013.01)

(58) Field of Classification Search
CPC ......... G06T 9/002; G06T 15/005; G06T 1/20; G06F 12/023; G06F 2212/302; G06F 2212/401; G06F 12/08
See application file for complete search history.

(56) References Cited

U.S. PATENT DOCUMENTS 5,901,277 A 5/1999 Chu et al.
6,366,289 B1 4/2002 Johns
(Continued)

FOREIGN PATENT DOCUMENTS

CN 109993684 A 7/2019
EP 3506108 A1 7/2019

OTHER PUBLICATIONS

Extended European Search Report received for EP Application No. 18209352.6-1221, mailed on May 24, 2019, 11 pages.
(Continued)

*Primary Examiner* — Jitesh Patel
(74) *Attorney, Agent, or Firm* — JAFFERY WATSON MENDONSA & HAMILTON LLP

(57) ABSTRACT

Embodiments are generally directed to compression in machine learning and deep learning processing. An embodi-
(Continued)

ment of an apparatus for compression of untyped data includes a graphical processing unit (GPU) including a data compression pipeline, the data compression pipeline including a data port coupled with one or more shader cores, wherein the data port is to allow transfer of untyped data without format conversion, and a 3D compression/decompression unit to provide for compression of untyped data to be stored to a memory subsystem and decompression of untyped data from the memory subsystem.

20 Claims, 48 Drawing Sheets

Related U.S. Application Data continuation of application No. 16/750,819, filed on Jan. 23, 2020, now Pat. No. 11,557,064, which is a continuation of application No. 15/859,408, filed on Dec. 30, 2017, now Pat. No. 10,546,393.

(56) References Cited

U.S. PATENT DOCUMENTS

| | | | |
|---|---|---|---|
| 6,557,083 | B1 | 4/2003 | Sperber et al. |
| 6,625,671 | B1 | 9/2003 | Collette et al. |
| 7,305,582 | B1 | 12/2007 | Moser et al. |
| 7,873,812 | B1 | 1/2011 | Mimar |
| 8,692,837 | B1 | 4/2014 | Sreenivas et al. |
| 9,507,346 | B1 | 11/2016 | Levinson et al. |
| 9,704,054 | B1* | 7/2017 | Tappen ............... G06F 18/23 |
| 10,528,864 | B2 | 1/2020 | Dally et al. |
| 10,860,922 | B2 | 12/2020 | Dally et al. |
| 10,891,538 | B2 | 1/2021 | Dally et al. |
| 2001/0045951 | A1 | 11/2001 | Allen |
| 2005/0105125 | A1 | 5/2005 | Park et al. |
| 2006/0098689 | A1 | 5/2006 | Stultz et al. |
| 2007/0002068 | A1 | 1/2007 | Whitted |
| 2011/0092291 | A1 | 4/2011 | Perlman |
| 2013/0039408 | A1 | 2/2013 | Cohen et al. |
| 2013/0054835 | A1 | 2/2013 | Sliger et al. |
| 2013/0159000 | A1* | 6/2013 | Ju ..................... G10L 15/1822 704/E15.005 |
| 2013/0201195 | A1 | 8/2013 | Sreenivas et al. |
| 2014/0063024 | A1 | 3/2014 | Zhang et al. |
| 2014/0092092 | A1 | 4/2014 | Li et al. |
| 2014/0184601 | A1 | 7/2014 | Dunaisky et al. |
| 2014/0297588 | A1 | 10/2014 | Babashetty et al. |
| 2015/0119149 | A1 | 4/2015 | Spitzer et al. |
| 2015/0379425 | A1 | 12/2015 | Dirac et al. |
| 2016/0062947 | A1 | 3/2016 | Chetlur et al. |
| 2016/0217369 | A1* | 7/2016 | Annapureddy ........ G06N 3/082 |
| 2016/0239209 | A1 | 8/2016 | Malyugin et al. |
| 2016/0247501 | A1* | 8/2016 | Kim .......................... G06N 7/01 |
| 2016/0253597 | A1* | 9/2016 | Bhatt ..................... G06N 20/00 706/12 |
| 2016/0328822 | A1 | 11/2016 | Liao et al. |
| 2017/0032543 | A1 | 2/2017 | Cho et al. |
| 2017/0061569 | A1 | 3/2017 | Sathe |
| 2017/0076422 | A1 | 3/2017 | Shen et al. |
| 2017/0169208 | A1 | 6/2017 | Jantz et al. |
| 2017/0223712 | A1 | 8/2017 | Stephens et al. |
| 2017/0293994 | A1 | 10/2017 | Li et al. |
| 2018/0046906 | A1 | 2/2018 | Dally et al. |
| 2018/0096261 | A1* | 4/2018 | Chu ....................... G06N 20/20 |
| 2018/0165789 | A1 | 6/2018 | Gruber et al. |
| 2018/0196964 | A1 | 7/2018 | Getson et al. |
| 2018/0199066 | A1 | 7/2018 | Ross |
| 2018/0217934 | A1 | 8/2018 | Engh-Halstvedt et al. |
| 2018/0232912 | A1 | 8/2018 | Nevraev et al. |
| 2018/0293758 | A1 | 10/2018 | Bar-On et al. |
| 2019/0005407 | A1 | 1/2019 | Harris et al. |
| 2019/0050710 | A1* | 2/2019 | Wang ..................... G06N 3/063 |
| 2019/0064813 | A1 | 2/2019 | Binet et al. |
| 2019/0075301 | A1 | 3/2019 | Chou et al. |
| 2021/0114616 | A1 | 4/2021 | Altman |
| 2021/0271977 | A1* | 9/2021 | Yang ..................... G06V 10/82 |

OTHER PUBLICATIONS

Goodfellow, et al. "Adaptive Computation and Machine Learning Series", Book, Nov. 18, 2016, pp. 98-165, Chapter 5, The MIT Press, Cambridge, MA.

Nicholas Wilt, "The CUDA Handbook; A Comprehensive Guide to GPU Programming", Book, Jun. 22, 2013, pp. 41-57, Addison-Wesley Professional, Boston, MA.

Ross, et al. "Intel Processor Graphics: Architecture & Programming", Power Point Presentation, Aug. 2015, 78 pages, Intel Corporation, Santa Clara, CA.

Shane Cook, "CUDA Programming", Book, 2013, pp. 37-52, Chapter 3, Elsevier Inc., Amsterdam Netherlands.

Stephen Junkins, "The Compute Architecture of Intel Processor Graphics Gen9", paper, Aug. 14, 2015, 22 pages, Version 1.0, Intel Corporation, Santa Clara, CA.

\* cited by examiner

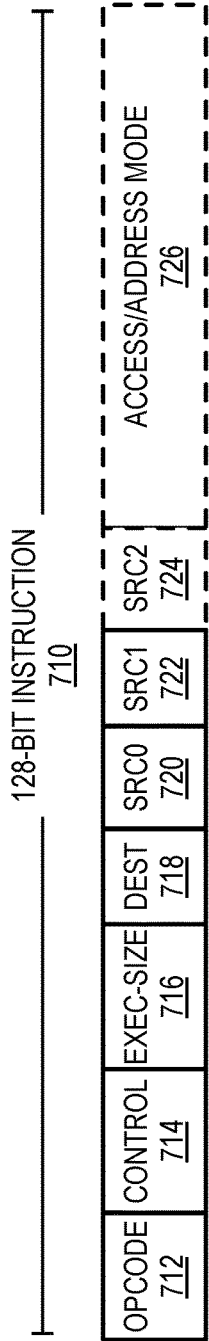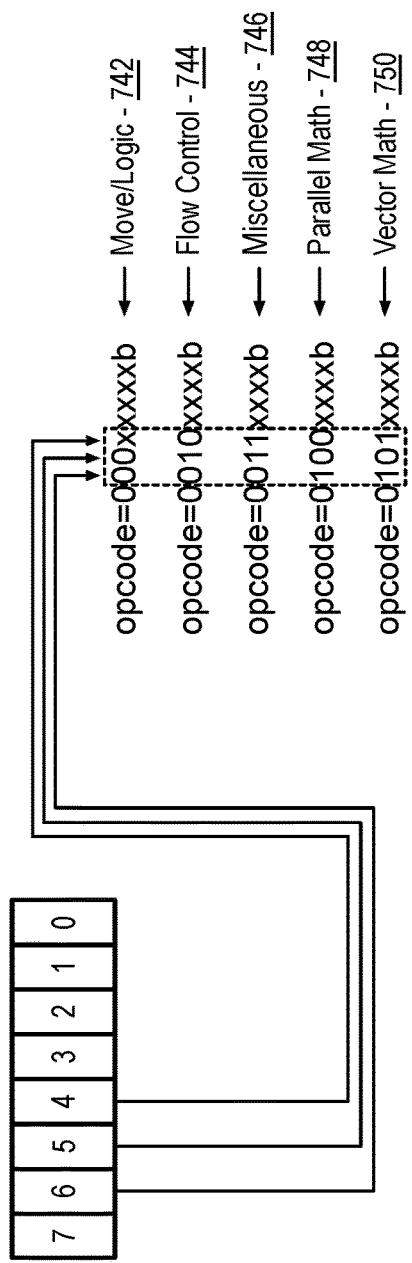
FIG. 7

COMPRESSION OF MACHINE LEARNING MODELS UTILIZING PSEUDO-LABELED DATA TRAINING

CLAIM TO PRIORITY

This Application is a continuation of and claims the benefit of and priority to U.S. application Ser. No. 18/152,643, entitled DYNAMIC ASSIGNMENT OF DOWN SAMPLING INTERVALS FOR DATA STREAM PROCESSING, by Joydeep Ray, et al., filed Jan. 10, 2023, and issued as U.S. Pat. No. 11,798,198 on Oct. 24, 2023, which is a continuation of and claims the benefit of and priority to U.S. application Ser. No. 16/750,819, entitled POLICY-BASED SYSTEM INTERFACE FOR A REAL-TIME AUTONOMOUS SYSTEM, by Joydeep Ray, et al., filed Jan. 23, 2020, and issued as U.S. Pat. No. 11,557,064 on Jan. 17, 2023, which is a continuation of and claims the benefit of and priority to U.S. application Ser. No. 15/859,408, entitled COMPRESSION IN MACHINE LEARNING AND DEEP LEARNING PROCESSING, by Joydeep Ray, et al., filed Dec. 30, 2017, and issued as U.S. Pat. No. 10,546,393 on Jan. 28, 2020, the entire contents of which are incorporated herein by reference.

TECHNICAL FIELD

Embodiments described herein generally relate to the field of electronic devices and, more particularly, compression in machine learning and deep learning processing.

BACKGROUND

The compression of data, in which a certain set of data is reduced in size, is commonly performed in computer processing. The data compression can reduce the amount of data to be transmitted or stored in memory, and thus provide significant savings in required storage capacity, transmission time, and data handling.

In particular, machine learning and deep learning in graphics processing utilizes large amounts of data, and such processing can greatly benefit from data compression.

However, conventional compression systems are limited in their ability to effectively compress data in certain graphics operations, and in particular in machine learning and deep learning operations.

BRIEF DESCRIPTION OF THE DRAWINGS

Embodiments described here are illustrated by way of example, and not by way of limitation, in the figures of the accompanying drawings in which like reference numerals refer to similar elements.

FIG. 7 is a block diagram illustrating graphics processor instruction formats according to some embodiments;

DETAILED DESCRIPTION

Embodiments described herein are generally directed to compression in machine learning and deep learning processing.

In some embodiments, an apparatus, system, or process provides for compression in the following:

(1) Utilizing 3D compression blocks for compression of untyped graphics data;
(2) Evaluating sensor data streams and intelligently downsampling data sets for learning algorithms;
(3) Compressing models into reduced precision values by re-training with pseudo labels; and
(4) Policy-based system interface techniques for real-time autonomous systems.

System Overview

Figure 1:
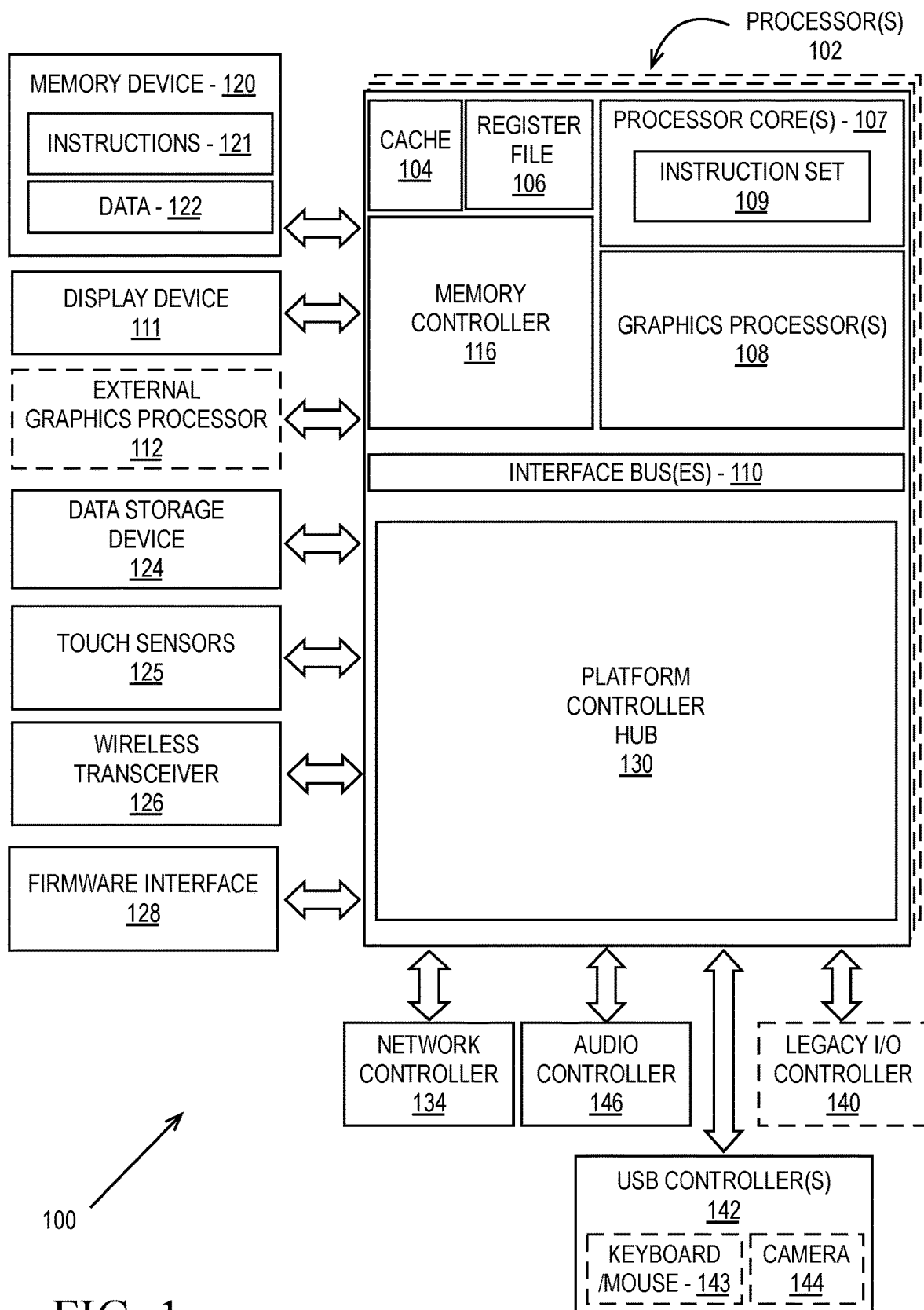
FIG. 1 is a block diagram of a processing system, according to some embodiments.

FIG. 1 is a block diagram of a processing system 100, according to an embodiment. In various embodiments, the system 100 includes one or more processors 102 and one or more graphics processors 108, and may be a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices.

In one embodiment the system 100 can include, or be incorporated within a server-based gaming platform, a game console, including a game and media console, a mobile gaming console, a handheld game console, or an online game console. In some embodiments the system 100 is a mobile phone, smart phone, tablet computing device or mobile Internet device. The processing system 100 can also include, couple with, or be integrated within a wearable device, such as a smart watch wearable device, smart eyewear device, augmented reality device, or virtual reality device. In some embodiments, the processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 112, which may communicate with the one or more graphics processors 108 in processors 102 to perform graphics and media operations. In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., hard disk drive, flash memory, etc.). The data storage device 124 can connect via a storage interface (e.g., SATA) or via a peripheral bus, such as a Peripheral Component Interconnect bus (e.g., PCI, PCI Express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, or Long Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 112. In one embodiment the platform controller hub 130 and/or memory controller 160 may be external to the one or more processor(s) 102. For example, the system 100 can include an external memory controller 116 and platform controller hub 130, which may be configured as a memory controller hub and peripheral controller hub within a system chipset that is in communication with the processor (s) 102.

Figure 2:
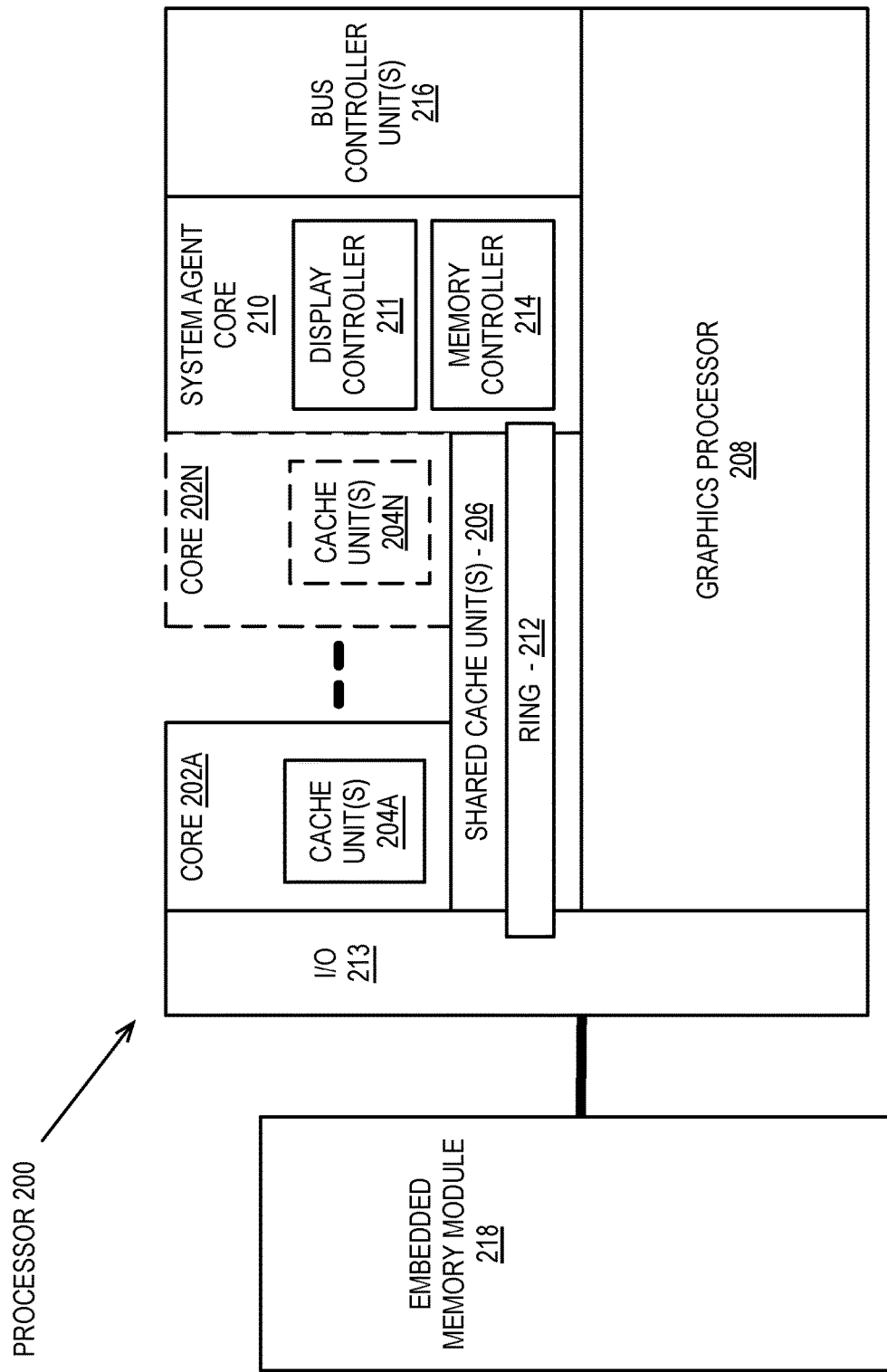
FIG. 2 is a block diagram of an embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
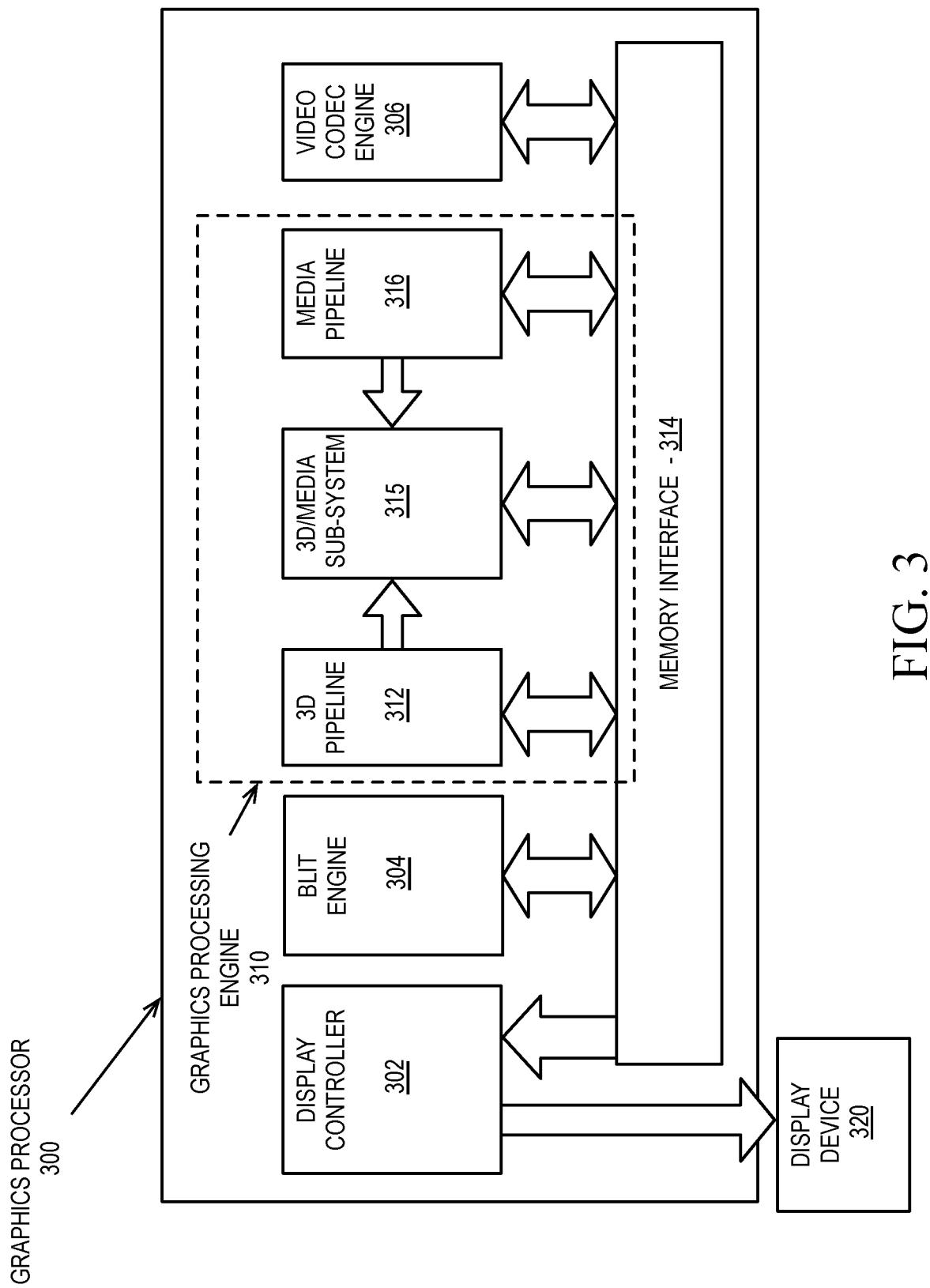
FIG. 3 is a block diagram of a graphics processor according to some embodiments.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. The display device 320 can be an internal or external display device. In one embodiment the display device 320 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

Graphics Processing Engine

Figure 4:
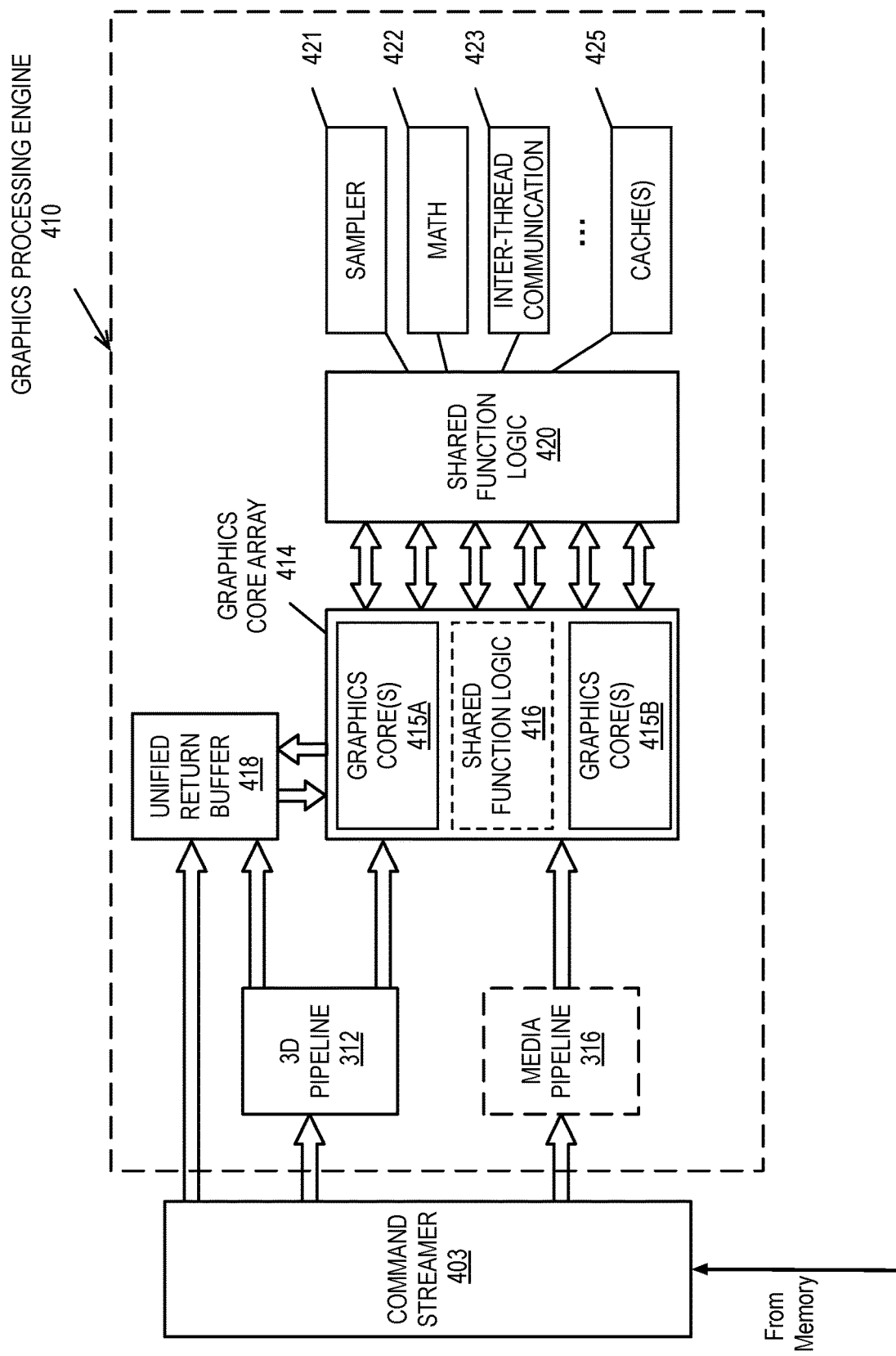
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3 are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 includes fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments the graphics core array 414 also includes execution logic to perform media functions, such as video and/or image processing. In one embodiment, the execution units additionally include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Figure 5:
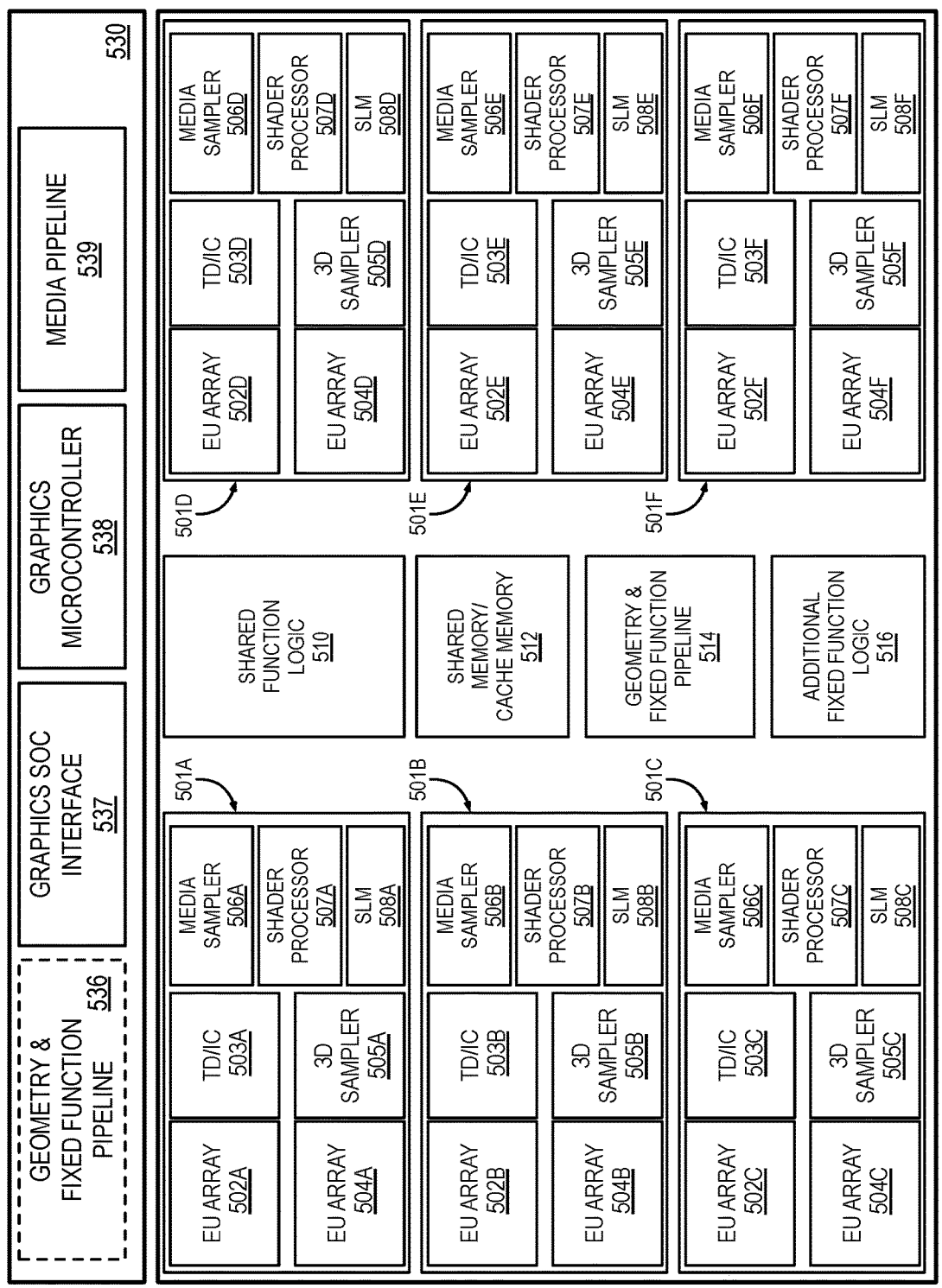
FIG. 5 is a block diagram of hardware logic of a graphics processor core 500, according to some embodiments.

FIG. 5 is a block diagram of hardware logic of a graphics processor core 500, according to some embodiments described herein. Elements of FIG. 5 having the same reference numbers (or names) as the elements of any other figure herein can operate or function in any manner similar to that described elsewhere herein, but are not limited to such. The illustrated graphics processor core 500, in some embodiments, is included within the graphics core array 414 of FIG. 4. The graphics processor core 500, sometimes referred to as a core slice, can be one or multiple graphics cores within a modular graphics processor. The graphics processor core 500 is exemplary of one graphics core slice, and a graphics processor as described herein may include multiple graphics core slices based on target power and performance envelopes. Each graphics core 500 can include a fixed function block 530 coupled with multiple sub-cores 501A-501F, also referred to as sub-slices, that include modular blocks of general-purpose and fixed function logic.

In some embodiments the fixed function block 530 includes a geometry/fixed function pipeline 536 that can be shared by all sub-cores in the graphics processor 500, for example, in lower performance and/or lower power graphics processor implementations. In various embodiments, the geometry/fixed function pipeline 536 includes a 3D fixed function pipeline (e.g., 3D pipeline 312 as in FIG. 3 and FIG. 4) a video front-end unit, a thread spawner and thread dispatcher, and a unified return buffer manager, which manages unified return buffers, such as the unified return buffer 418 of FIG. 4.

In one embodiment the fixed function block 530 also includes a graphics SoC interface 537, a graphics microcontroller 538, and a media pipeline 539. The graphics SoC interface 537 provides an interface between the graphics core 500 and other processor cores within a system on a chip integrated circuit. The graphics microcontroller 538 is a programmable sub-processor that is configurable to manage various functions of the graphics processor 500, including thread dispatch, scheduling, and pre-emption. The media pipeline 539 (e.g., media pipeline 316 of FIG. 3 and FIG. 4) includes logic to facilitate the decoding, encoding, pre-processing, and/or post-processing of multimedia data, including image and video data. The media pipeline 539 implement media operations via requests to compute or sampling logic within the sub-cores 501-501F.

In one embodiment the SoC interface 537 enables the graphics core 500 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 537 can also enable communication with fixed function devices within the SoC, such as camera imaging pipelines, and enables the use of and/or implements global memory atomics that may be shared between the graphics core 500 and CPUs within the SoC. The SoC interface 537 can also implement power management controls for the graphics core 500 and enable an interface between a clock domain of the graphic core 500 and other clock domains within the SoC. In one embodiment the SoC interface 537 enables receipt of command buffers from a command streamer and global thread dispatcher that are configured to provide commands and instructions to each of one or more graphics cores within a graphics processor. The commands and instructions can be dispatched to the media pipeline 539, when media operations are to be performed, or a geometry and fixed function pipeline (e.g., geometry and fixed function pipeline 536, geometry and fixed function pipeline 514) when graphics processing operations are to be performed.

The graphics microcontroller 538 can be configured to perform various scheduling and management tasks for the graphics core 500. In one embodiment the graphics microcontroller 538 can perform graphics and/or compute workload scheduling on the various graphics parallel engines within execution unit (EU) arrays 502A-502F, 504A-504F within the sub-cores 501A-501F. In this scheduling model, host software executing on a CPU core of an SoC including the graphics core 500 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 538 can also facilitate low-power or idle states for the graphics core 500, providing the graphics core 500 with the ability to save and restore registers within the graphics core 500 across low-power state transitions independently from the operating system and/or graphics driver software on the system.

The graphics core 500 may have greater than or fewer than the illustrated sub-cores 501A-501F, up to N modular sub-cores. For each set of N sub-cores, the graphics core 500 can also include shared function logic 510, shared and/or cache memory 512, a geometry/fixed function pipeline 514, as well as additional fixed function logic 516 to accelerate various graphics and compute processing operations. The shared function logic 510 can include logic units associated with the shared function logic 420 of FIG. 4 (e.g., sampler, math, and/or inter-thread communication logic) that can be shared by each N sub-cores within the graphics core 500. The shared and/or cache memory 512 can be a last-level cache for the set of N sub-cores 501A-501F within the graphics core 500, and can also serve as shared memory that is accessible by multiple sub-cores. The geometry/fixed function pipeline 514 can be included instead of the geometry/fixed function pipeline 536 within the fixed function block 530 and can include the same or similar logic units.

In one embodiment the graphics core 500 includes additional fixed function logic 516 that can include various fixed function acceleration logic for use by the graphics core 500. In one embodiment the additional fixed function logic 516 includes an additional geometry pipeline for use in position only shading. In position-only shading, two geometry pipelines exist, the full geometry pipeline within the geometry/fixed function pipeline 516, 536, and a cull pipeline, which is an additional geometry pipeline which may be included within the additional fixed function logic 516. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 516 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 516 can also include machine-learning acceleration logic, such as fixed function matrix multiplication logic, for implementations including optimizations for machine learning training or inferencing.

Within each graphics sub-core 501A-501F includes a set of execution resources that may be used to perform graphics, media, and compute operations in response to requests by graphics pipeline, media pipeline, or shader programs. The graphics sub-cores 501A-501F include multiple EU arrays 502A-502F, 504A-504F, thread dispatch and inter-thread communication (TD/IC) logic 503A-503F, a 3D (e.g., texture) sampler 505A-505F, a media sampler 506A-506F, a shader processor 507A-507F, and shared local memory (SLM) 508A-508F. The EU arrays 502A-502F, 504A-504F each include multiple execution units, which are general-purpose graphics processing units capable of performing floating-point and integer/fixed-point logic operations in service of a graphics, media, or compute operation, including graphics, media, or compute shader programs. The TD/IC logic 503A-503F performs local thread dispatch and thread control operations for the execution units within a sub-core and facilitate communication between threads executing on the execution units of the sub-core. The 3D sampler 505A-505F can read texture or other 3D graphics related data into memory. The 3D sampler can read texture data differently based on a configured sample state and the texture format associated with a given texture. The media sampler 506A-506F can perform similar read operations based on the type and format associated with media data. In one embodiment, each graphics sub-core 501A-501F can alternately include a unified 3D and media sampler. Threads executing on the execution units within each of the sub-cores 501A-501F can make use of shared local memory 508A-508F within each sub-core, to enable threads executing within a thread group to execute using a common pool of on-chip memory.

Execution Units

Figure 6A:
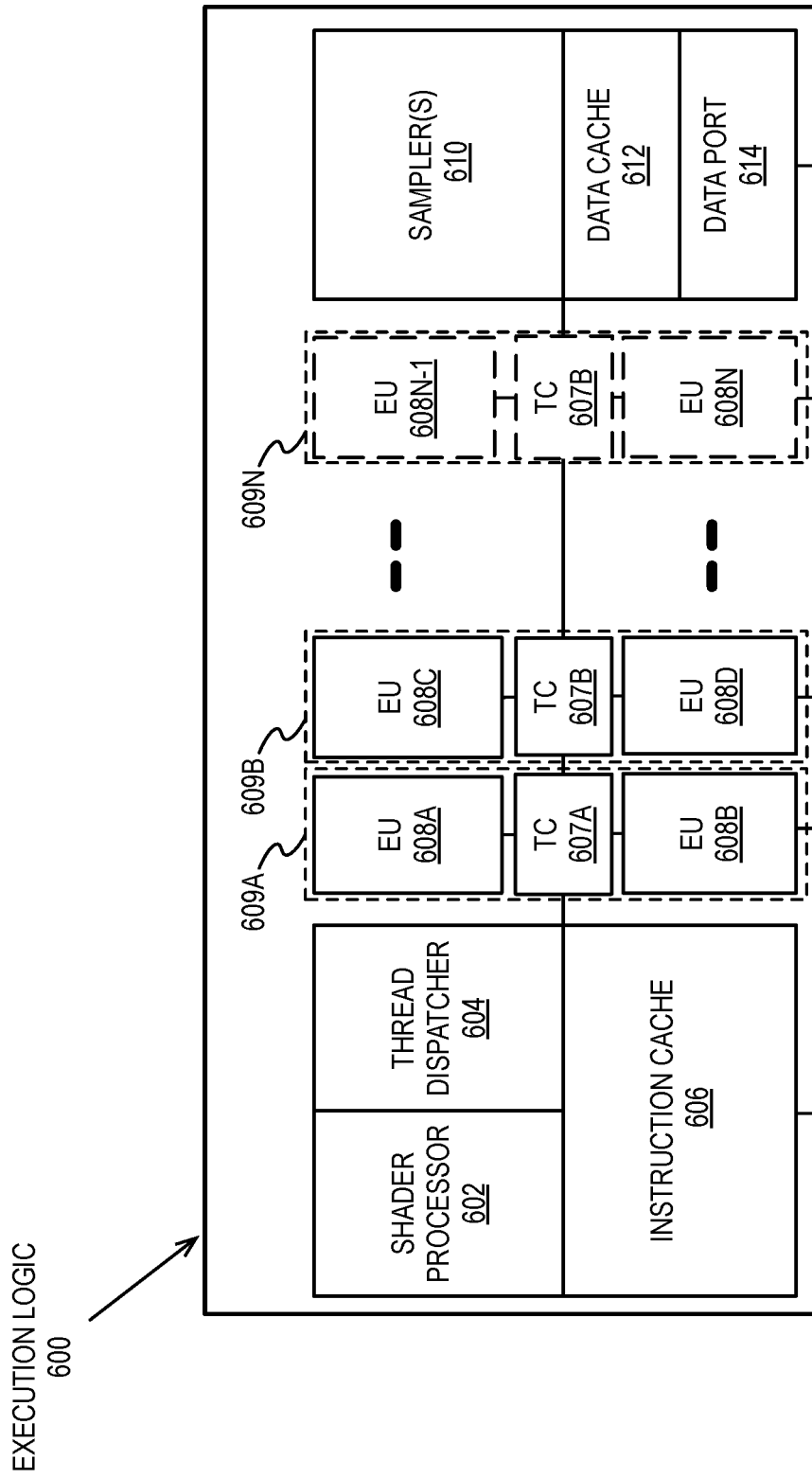
FIGS. 6A-6B illustrate thread execution logic including an array of processing elements employed in a graphics processor core according to some embodiments.
Figure 6B:
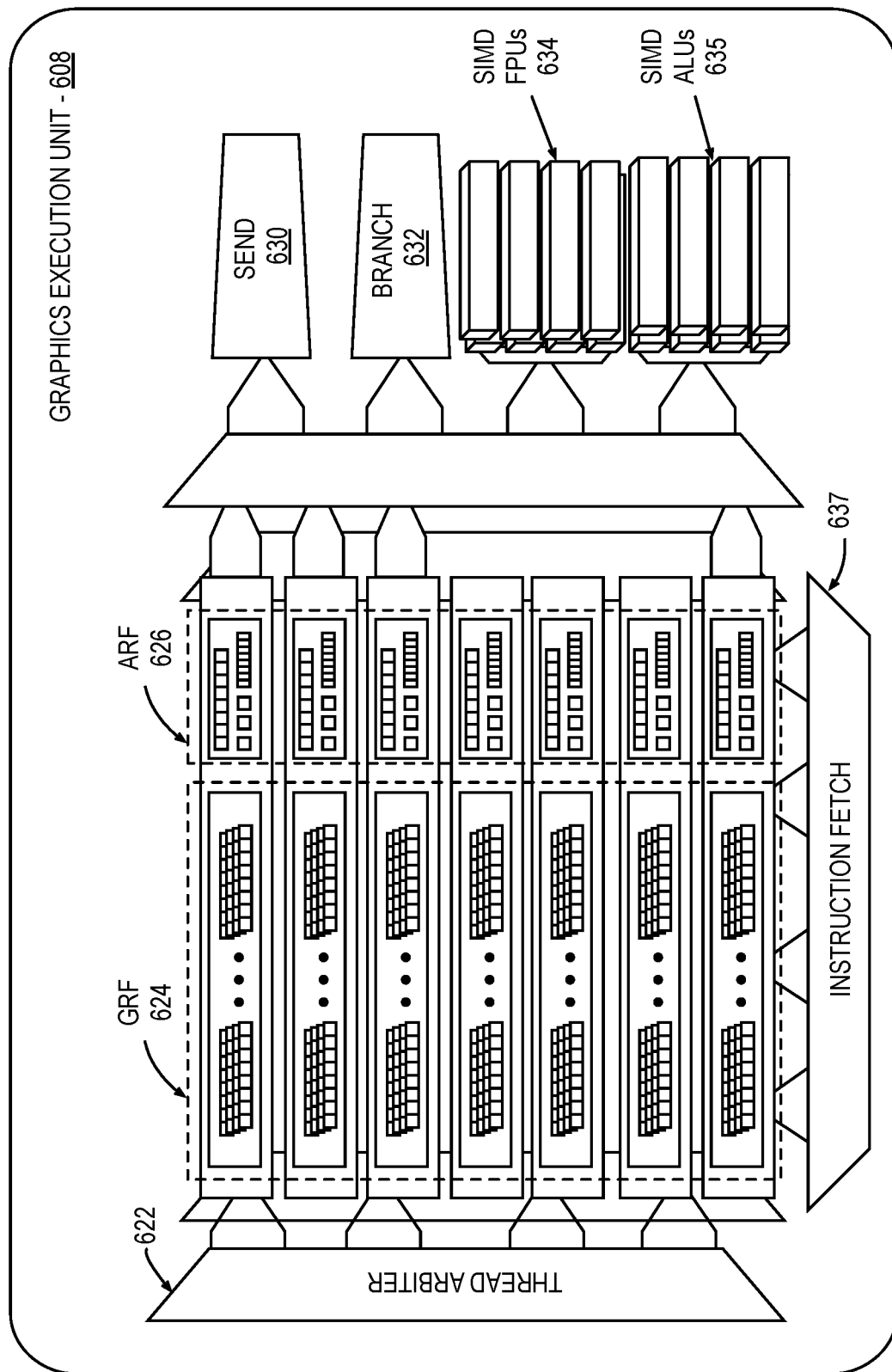

FIGS. 6A-6B illustrate thread execution logic 600 including an array of processing elements employed in a graphics processor core according to embodiments described herein. Elements of FIGS. 6A-6B having the same reference numbers (or names) as the elements of any other figure herein can operate or function in any manner similar to that described elsewhere herein, but are not limited to such. FIG. 6A illustrates an overview of thread execution logic 600, which can include a variant of the hardware logic illustrated with each sub-core 501A-501F of FIG. 5. FIG. 6B illustrates exemplary internal details of an execution unit.

As illustrated in FIG. 6A, in some embodiments thread execution logic 600 includes a shader processor 602, a thread dispatcher 604, instruction cache 606, a scalable execution unit array including a plurality of execution units 608A-608N, a sampler 610, a data cache 612, and a data port 614. In one embodiment the scalable execution unit array can dynamically scale by enabling or disabling one or more execution units (e.g., any of execution unit 608A, 608B, 608C, 608D, through 608N-1 and 608N) based on the computational requirements of a workload. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution units 608A-608N. In some embodiments, each execution unit (e.g. 608A) is a stand-alone programmable general-purpose computational unit that is capable of executing multiple simultaneous hardware threads while processing multiple data elements in parallel for each thread. In various embodiments, the array of execution units 608A-608N is scalable to include any number individual execution units.

In some embodiments, the execution units 608A-608N are primarily used to execute shader programs. A shader processor 602 can process the various shader programs and dispatch execution threads associated with the shader programs via a thread dispatcher 604. In one embodiment the thread dispatcher includes logic to arbitrate thread initiation requests from the graphics and media pipelines and instantiate the requested threads on one or more execution unit in the execution units 608A-608N. For example, a geometry pipeline can dispatch vertex, tessellation, or geometry shaders to the thread execution logic for processing. In some embodiments, thread dispatcher 604 can also process runtime thread spawning requests from the executing shader programs.

In some embodiments, the execution units 608A-608N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 608A-608N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 608A-608N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader.

Each execution unit in execution units 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 609A-609N having thread control logic (607A-607N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 609A-609N includes at least two execution units. For example, fused execution unit 609A includes a first EU 608A, second EU 608B, and thread control logic 607A that is common to the first EU 608A and the second EU 608B. The thread control logic 607A controls threads executed on the fused graphics execution unit 609A, allowing each EU within the fused execution units 609A-609N to execute using a common instruction pointer register.

One or more internal instruction caches (e.g., 606) are included in the thread execution logic 600 to cache thread instructions for the execution units. In some embodiments, one or more data caches (e.g., 612) are included to cache thread data during thread execution. In some embodiments, a sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. Once a group of geometric objects has been processed and rasterized into pixel data, pixel processor logic (e.g., pixel shader logic, fragment shader logic, etc.) within the shader processor 602 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 602 then executes an application programming interface (API)-supplied pixel or fragment shader program. To execute the shader program, the shader processor 602 dispatches threads to an execution unit (e.g., 608A) via thread dispatcher 604. In some embodiments, shader processor 602 uses texture sampling logic in the sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 to output processed data to memory for further processing on a graphics processor output pipeline. In some embodiments, the data port 614 includes or couples to one or more cache memories (e.g., data cache 612) to cache data for memory access via the data port.

As illustrated in FIG. 6B, a graphics execution unit 608 can include an instruction fetch unit 637, a general register file array (GRF) 624, an architectural register file array (ARF) 626, a thread arbiter 622, a send unit 630, a branch unit 632, a set of SIMD floating point units (FPUs) 634, and in one embodiment a set of dedicated integer SIMD ALUs 635. The GRF 624 and ARF 626 includes the set of general register files and architecture register files associated with each simultaneous hardware thread that may be active in the graphics execution unit 608. In one embodiment, per thread architectural state is maintained in the ARF 626, while data used during thread execution is stored in the GRF 624. The execution state of each thread, including the instruction pointers for each thread, can be held in thread-specific registers in the ARF 626.

In one embodiment the graphics execution unit 608 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads.

In one embodiment, the graphics execution unit 608 can co-issue multiple instructions, which may each be different instructions. The thread arbiter 622 of the graphics execution unit thread 608 can dispatch the instructions to one of the send unit 630, branch unit 642, or SIMD FPU(s) 634 for execution. Each execution thread can access 128 general-purpose registers within the GRF 624, where each register can store 32 bytes, accessible as a SIMD 8-element vector of 32-bit data elements. In one embodiment, each execution unit thread has access to 4 Kbytes within the GRF 624, although embodiments are not so limited, and greater or fewer register resources may be provided in other embodiments. In one embodiment up to seven threads can execute simultaneously, although the number of threads per execution unit can also vary according to embodiments. In an embodiment in which seven threads may access 4 Kbytes, the GRF 624 can store a total of 28 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 630. In one embodiment, branch instructions are dispatched to a dedicated branch unit 632 to facilitate SIMD divergence and eventual convergence.

In one embodiment the graphics execution unit 608 includes one or more SIMD floating point units (FPU(s)) 634 to perform floating-point operations. In one embodiment, the FPU(s) 634 also support integer computation. In one embodiment the FPU(s) 634 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 64-bit floating-point. In some embodiments, a set of 8-bit integer SIMD ALUs 635 are also present, and may be specifically optimized to perform operations associated with machine learning computations.

In one embodiment, arrays of multiple instances of the graphics execution unit 608 can be instantiated in a graphics sub-core grouping (e.g., a sub-slice). For scalability, product architects can choose the exact number of execution units per sub-core grouping. In one embodiment the execution unit 608 can execute instructions across a plurality of execution channels. In a further embodiment, each thread executed on the graphics execution unit 608 is executed on a different channel.

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
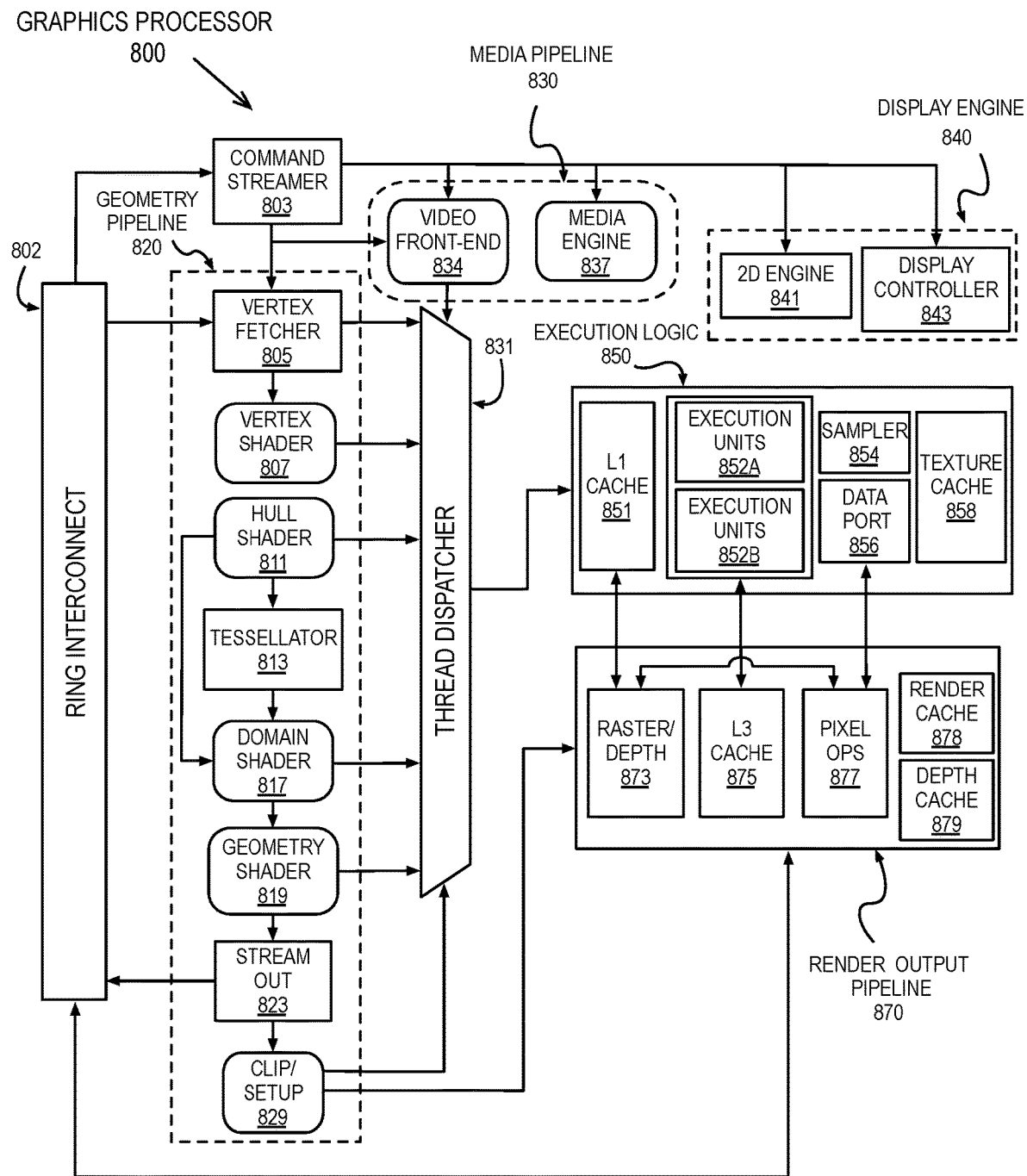
FIG. 8 is a block diagram of another embodiment of a graphics processor.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
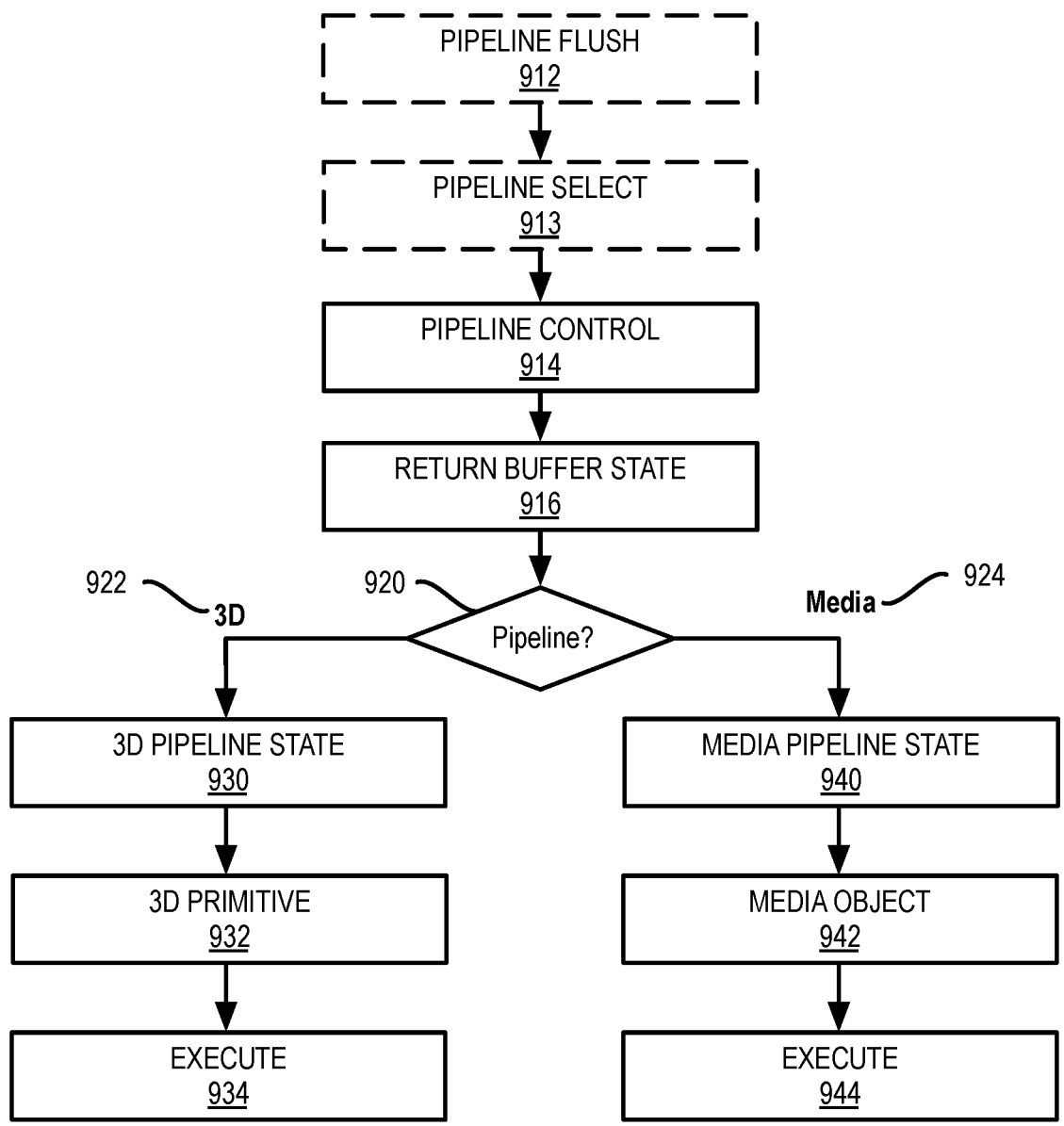
FIG. 9A is a block diagram illustrating a graphics processor command format according to some embodiments.
FIG. 9B is a block diagram illustrating a graphics processor command sequence according to an embodiment.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
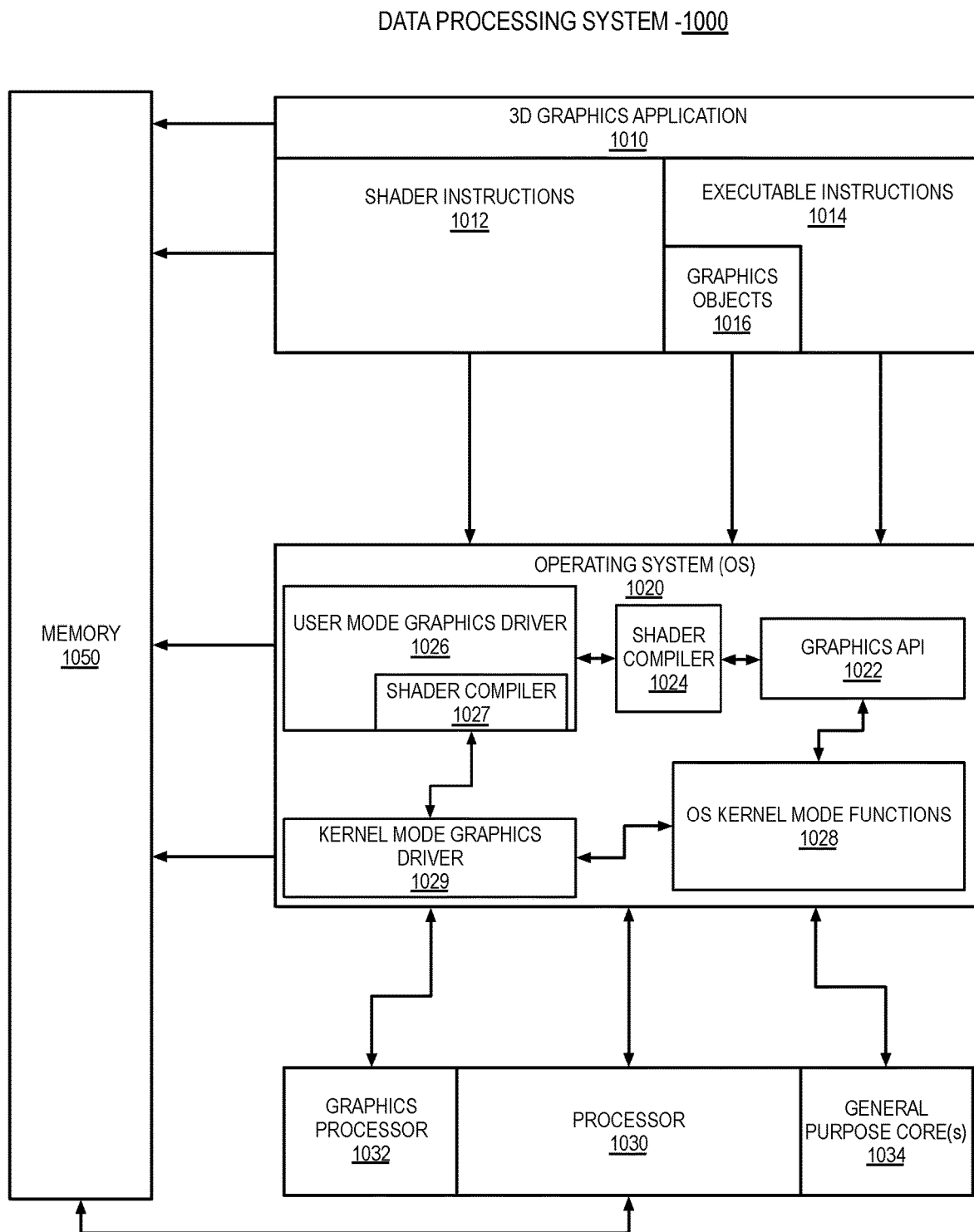
FIG. 10 illustrates exemplary graphics software architecture for a data processing system according to some embodiments.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
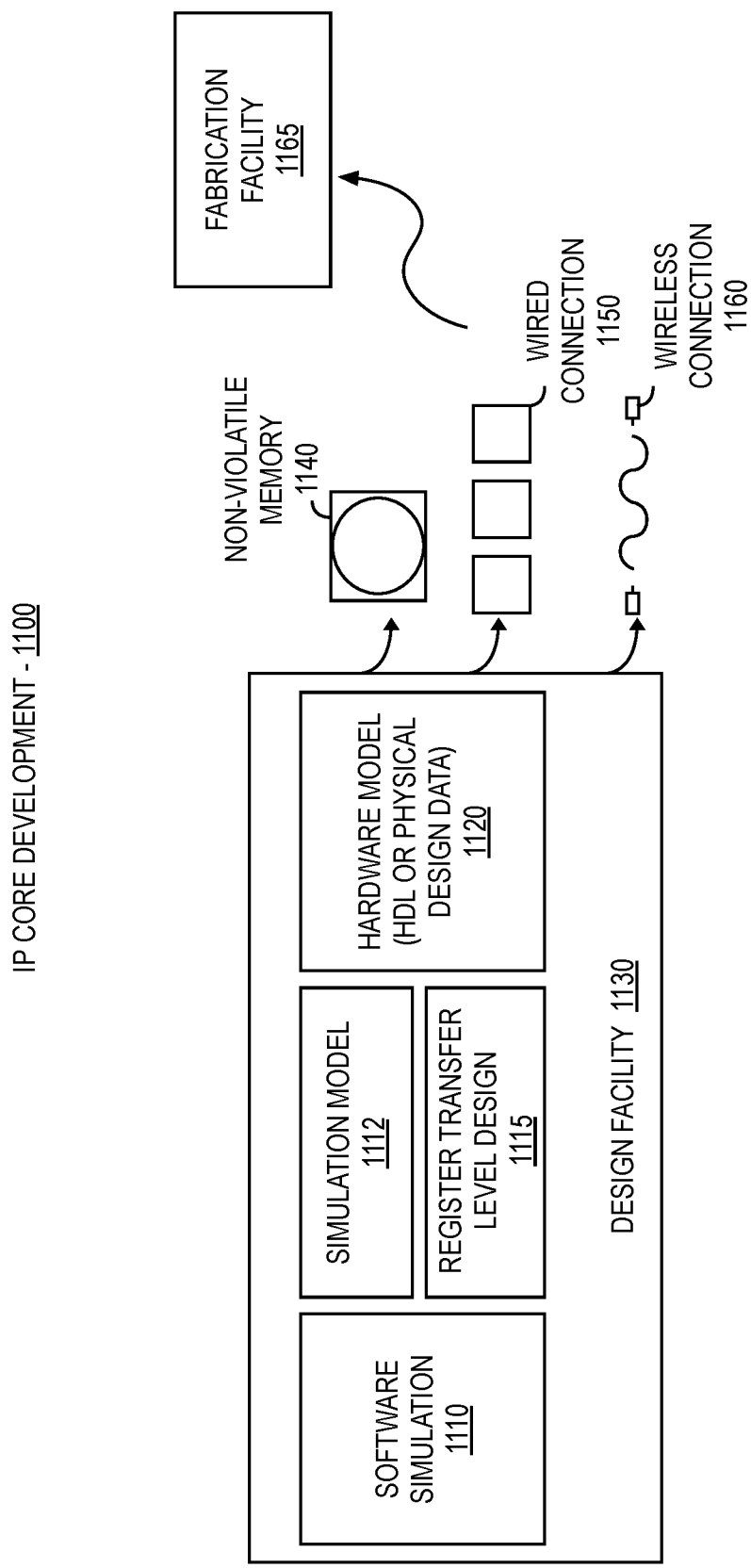
FIG. 11A is a block diagram illustrating an IP core development system 1100 that may be used to manufacture an integrated circuit to perform operations according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a $3^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
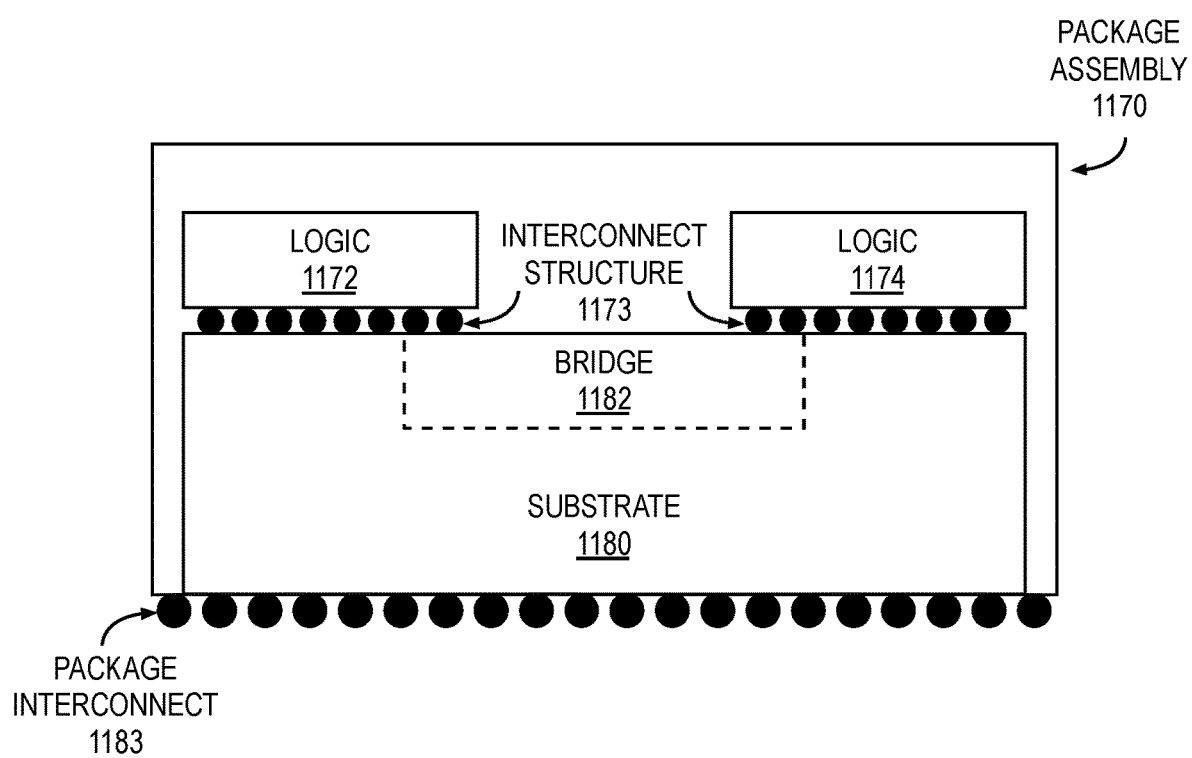
FIG. 11B illustrates a cross-section side view of an integrated circuit package assembly according to some embodiments.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The package substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Exemplary System on a Chip Integrated Circuit

Figure 12:
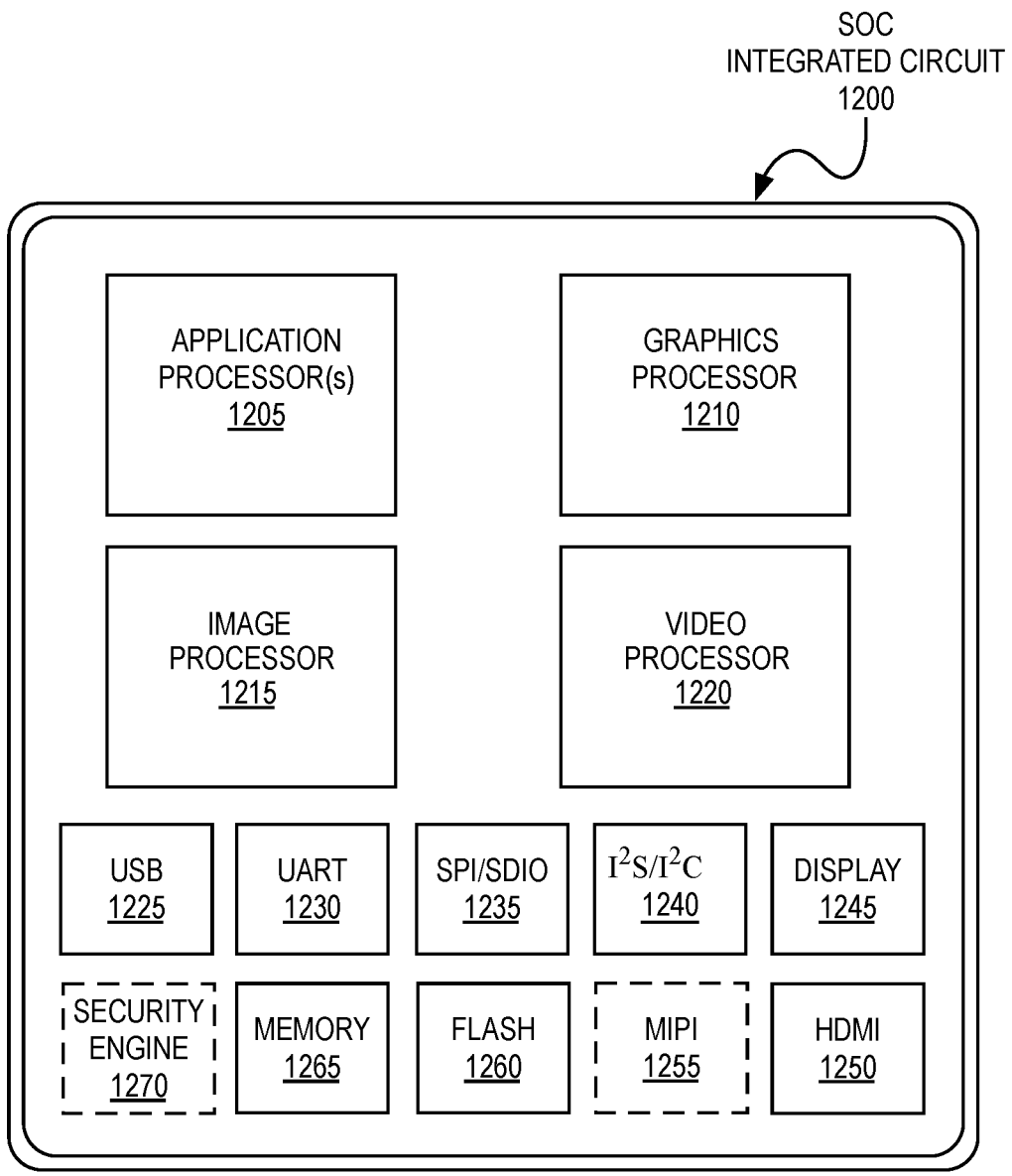
FIG. 12 is a block diagram illustrating an exemplary system on a chip integrated circuit 1200 that may be fabricated using one or more IP cores, according to an embodiment.

FIGS. 12-14 illustrated exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an $I^2S/I^2C$ controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Figure 13A:
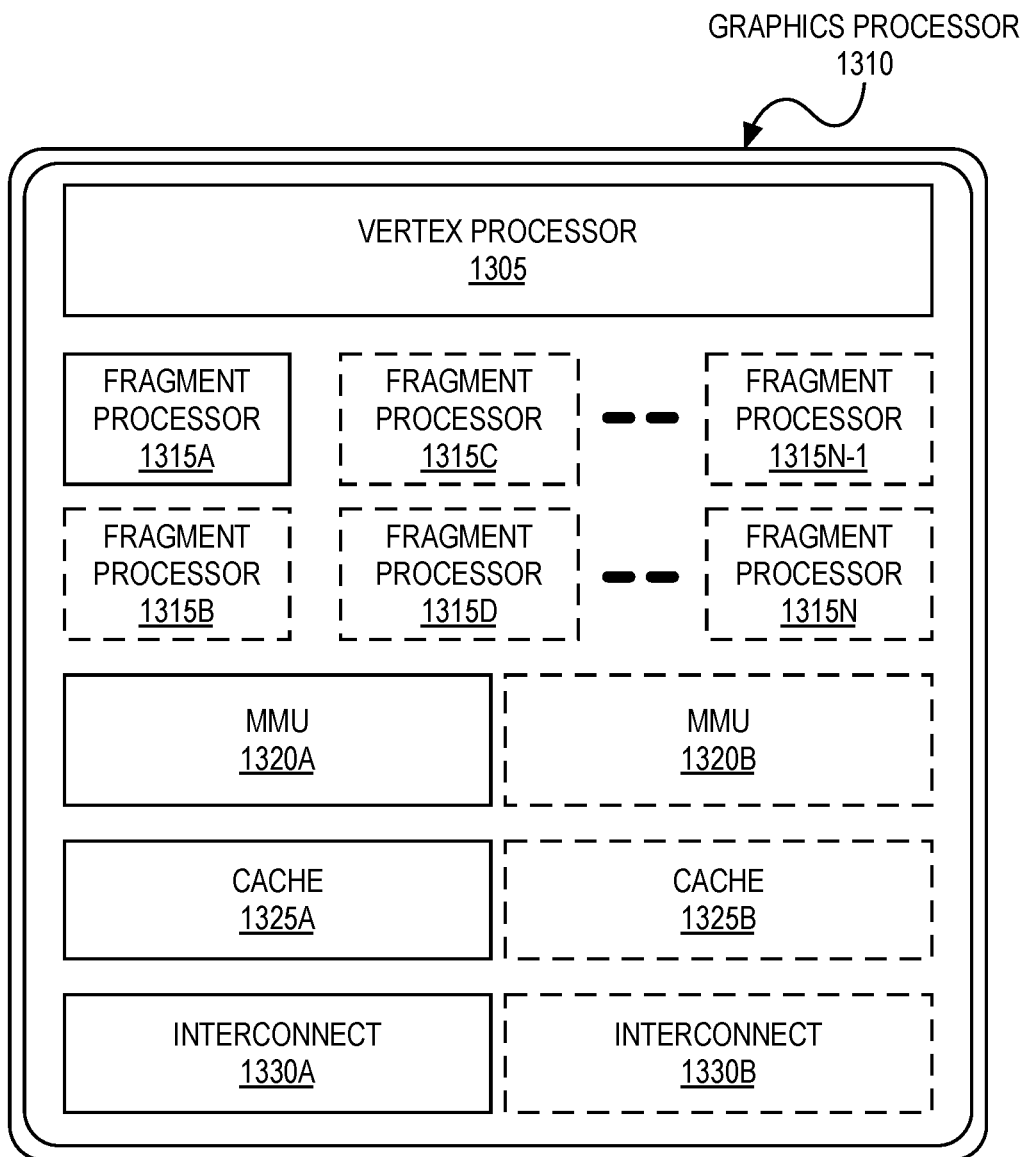
FIG. 13A illustrates an exemplary graphics processor of a system on a chip integrated circuit that may be fabricated using one or more IP cores, according to an embodiment.
Figure 13B:
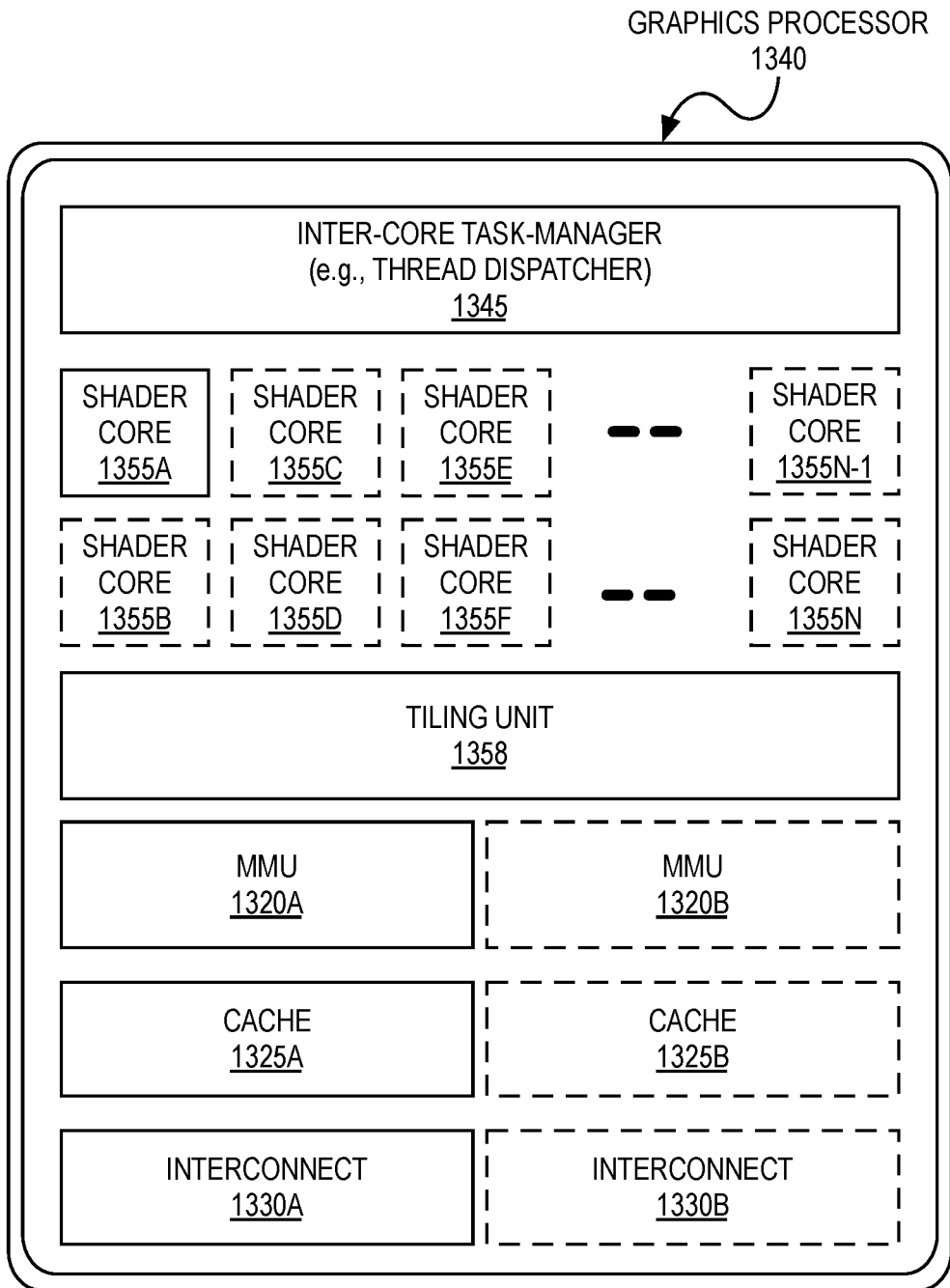
FIG. 13B illustrates an additional exemplary graphics processor of a system on a chip integrated circuit that may be fabricated using one or more IP cores, according to an embodiment.

FIGS. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, caches 1325A-1325B, and circuit interconnects 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Figure 14A:
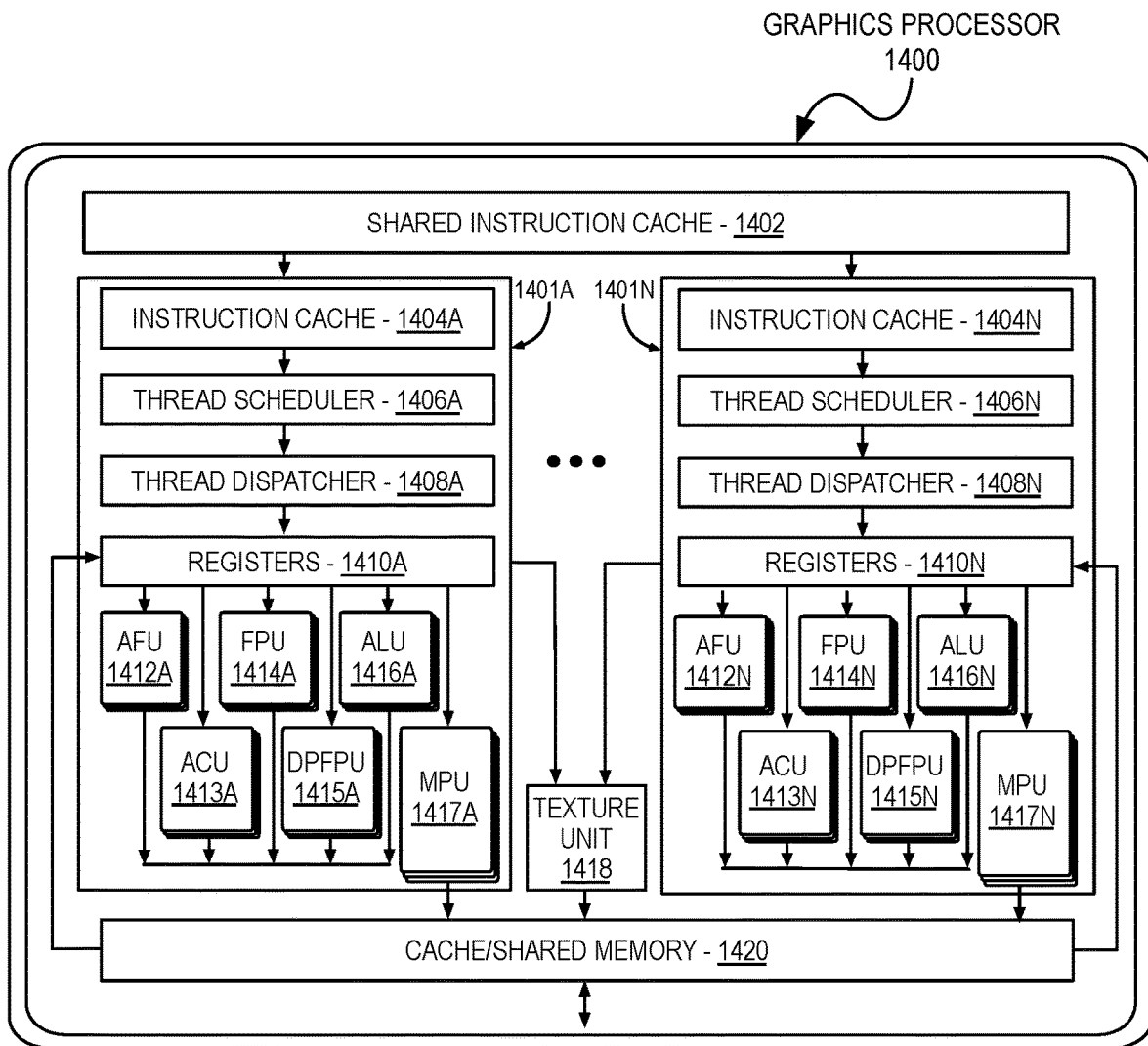
FIG. 14A illustrates a graphics core that may be included within a graphics processor according to some embodiments.
Figure 14B:
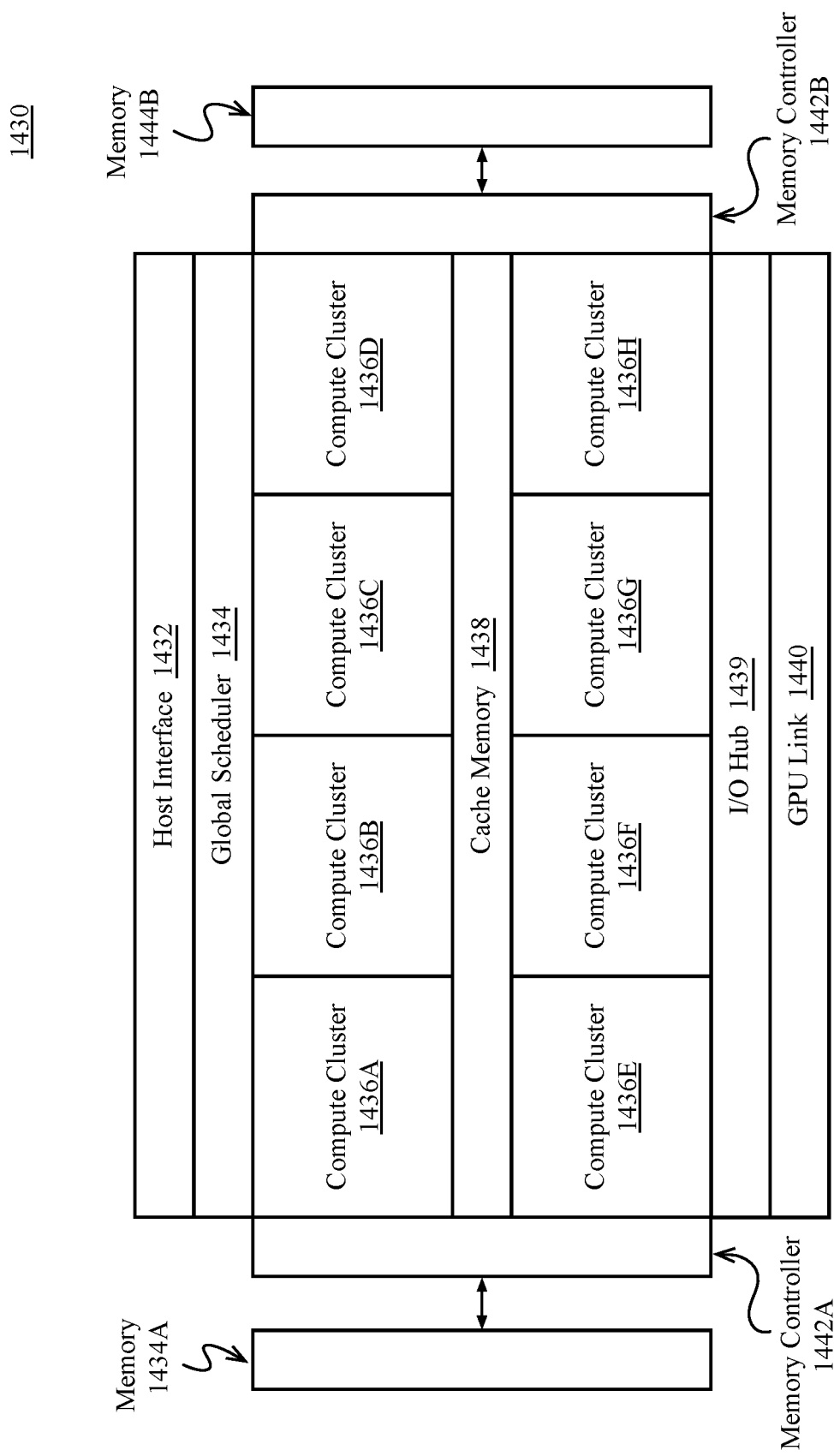
FIG. 14B illustrates a highly-parallel general-purpose graphics processing unit suitable for deployment on a multi-chip module according to some embodiments.

FIGS. 14A-14B illustrate additional exemplary graphics processor logic according to embodiments described herein. FIG. 14A illustrates a graphics core 1400 that may be included within the graphics processor 1210 of FIG. 12, and may be a unified shader core 1355A-1355N as in FIG. 13B. FIG. 14B illustrates a highly-parallel general-purpose graphics processing unit 1430 suitable for deployment on a multi-chip module.

As shown in FIG. 14A, the graphics core 1400 includes a shared instruction cache 1402, a texture unit 1418, and a cache/shared memory 1420 that are common to the execution resources within the graphics core 1400. The graphics core 1400 can include multiple slices 1401A-1401N or partition for each core, and a graphics processor can include multiple instances of the graphics core 1400. The slices 1401A-1401N can include support logic including a local instruction cache 1404A-1404N, a thread scheduler 1406A-1406N, a thread dispatcher 1408A-1408N, and a set of registers 1410A. To perform logic operations, the slices 1401A-1401N can include a set of additional function units (AFUs 1412A-1412N), floating-point units (FPU 1414A-1414N), integer arithmetic logic units (ALUs 1416-1416N), address computational units (ACU 1413A-1413N), double-precision floating-point units (DPFPU 1415A-1415N), and matrix processing units (MPU 1417A-1417N).

Some of the computational units operate at a specific precision. For example, the FPUs 1414A-1414N can perform single-precision (32-bit) and half-precision (16-bit) floating point operations, while the DPFPUs 1415A-1415N perform double precision (64-bit) floating point operations. The ALUs 1416A-1416N can perform variable precision integer operations at 8-bit, 16-bit, and 32-bit precision, and can be configured for mixed precision operations. The MPUs 1417A-1417N can also be configured for mixed precision matrix operations, including half-precision floating point and 8-bit integer operations. The MPUs 1417-1417N can perform a variety of matrix operations to accelerate machine learning application frameworks, including enabling support for accelerated general matrix to matrix multiplication (GEMM). The AFUs 1412A-1412N can perform additional logic operations not supported by the floating-point or integer units, including trigonometric operations (e.g., Sine, Cosine, etc.).

As shown in FIG. 14B, a general-purpose processing unit (GPGPU) 1430 can be configured to enable highly-parallel compute operations to be performed by an array of graphics processing units. Additionally, the GPGPU 1430 can be linked directly to other instances of the GPGPU to create a multi-GPU cluster to improve training speed for particularly deep neural networks. The GPGPU 1430 includes a host interface 1432 to enable a connection with a host processor. In one embodiment the host interface 1432 is a PCI Express interface. However, the host interface can also be a vendor specific communications interface or communications fabric. The GPGPU 1430 receives commands from the host processor and uses a global scheduler 1434 to distribute execution threads associated with those commands to a set of compute clusters 1436A-1436H. The compute clusters 1436A-1436H share a cache memory 1438. The cache memory 1438 can serve as a higher-level cache for cache memories within the compute clusters 1436A-1436H.

The GPGPU 1430 includes memory 1434A-1434B coupled with the compute clusters 1436A-1436H via a set of memory controllers 1442A-1442B. In various embodiments, the memory 1434A-1434B can include various types of memory devices including dynamic random access memory (DRAM) or graphics random access memory, such as synchronous graphics random access memory (SGRAM), including graphics double data rate (GDDR) memory.

In one embodiment the compute clusters 1436A-1436H each include a set of graphics cores, such as the graphics core 1400 of FIG. 14A, which can include multiple types of integer and floating point logic units that can perform computational operations at a range of precisions including suited for machine learning computations. For example and in one embodiment at least a subset of the floating point units in each of the compute clusters 1436A-1436H can be configured to perform 16-bit or 32-bit floating point operations, while a different subset of the floating point units can be configured to perform 64-bit floating point operations.

Multiple instances of the GPGPU 1430 can be configured to operate as a compute cluster. The communication mechanism used by the compute cluster for synchronization and data exchange varies across embodiments. In one embodiment the multiple instances of the GPGPU 1430 communicate over the host interface 1432. In one embodiment the GPGPU 1430 includes an I/O hub 1439 that couples the GPGPU 1430 with a GPU link 1440 that enables a direct connection to other instances of the GPGPU. In one embodiment the GPU link 1440 is coupled to a dedicated GPU-to-GPU bridge that enables communication and synchronization between multiple instances of the GPGPU 1430. In one embodiment the GPU link 1440 couples with a high speed interconnect to transmit and receive data to other GPGPUs or parallel processors. In one embodiment the multiple instances of the GPGPU 1430 are located in separate data processing systems and communicate via a network device that is accessible via the host interface 1432. In one embodiment the GPU link 1440 can be configured to enable a connection to a host processor in addition to or as an alternative to the host interface 1432.

While the illustrated configuration of the GPGPU 1430 can be configured to train neural networks, one embodiment provides alternate configuration of the GPGPU 1430 that can be configured for deployment within a high performance or low power inferencing platform. In an inferencing configuration the GPGPU 1430 includes fewer of the compute clusters 1436A-1436H relative to the training configuration. Additionally, the memory technology associated with the memory 1434A-1434B may differ between inferencing and training configurations, with higher bandwidth memory technologies devoted to training configurations. In one embodiment the inferencing configuration of the GPGPU 1430 can support inferencing specific instructions. For example, an inferencing configuration can provide support for one or more 8-bit integer dot product instructions, which are commonly used during inferencing operations for deployed neural networks.

Machine Learning Overview

A machine learning algorithm is an algorithm that can learn based on a set of data. Embodiments of machine learning algorithms can be designed to model high-level abstractions within a data set. For example, image recognition algorithms can be used to determine which of several categories to which a given input belong; regression algorithms can output a numerical value given an input; and pattern recognition algorithms can be used to generate translated text or perform text to speech and/or speech recognition.

An exemplary type of machine learning algorithm is a neural network. There are many types of neural networks; a simple type of neural network is a feedforward network. A feedforward network may be implemented as an acyclic graph in which the nodes are arranged in layers. Typically, a feedforward network topology includes an input layer and an output layer that are separated by at least one hidden layer. The hidden layer transforms input received by the input layer into a representation that is useful for generating output in the output layer. The network nodes are fully connected via edges to the nodes in adjacent layers, but there are no edges between nodes within each layer. Data received at the nodes of an input layer of a feedforward network are propagated (i.e., "fed forward") to the nodes of the output layer via an activation function that calculates the states of the nodes of each successive layer in the network based on coefficients ("weights") respectively associated with each of the edges connecting the layers. Depending on the specific model being represented by the algorithm being executed, the output from the neural network algorithm can take various forms.

Before a machine learning algorithm can be used to model a particular problem, the algorithm is trained using a training data set. Training a neural network involves selecting a network topology, using a set of training data representing a problem being modeled by the network, and adjusting the weights until the network model performs with a minimal error for all instances of the training data set. For example, during a supervised learning training process for a neural network, the output produced by the network in response to the input representing an instance in a training data set is compared to the "correct" labeled output for that instance, an error signal representing the difference between the output and the labeled output is calculated, and the weights associated with the connections are adjusted to minimize that error as the error signal is backward propagated through the layers of the network. The network is considered "trained" when the errors for each of the outputs generated from the instances of the training data set are minimized.

The accuracy of a machine learning algorithm can be affected significantly by the quality of the data set used to train the algorithm. The training process can be computationally intensive and may require a significant amount of time on a conventional general-purpose processor. Accordingly, parallel processing hardware is used to train many types of machine learning algorithms. This is particularly useful for optimizing the training of neural networks, as the computations performed in adjusting the coefficients in neural networks lend themselves naturally to parallel implementations. Specifically, many machine learning algorithms and software applications have been adapted to make use of the parallel processing hardware within general-purpose graphics processing devices.

Figure 15:
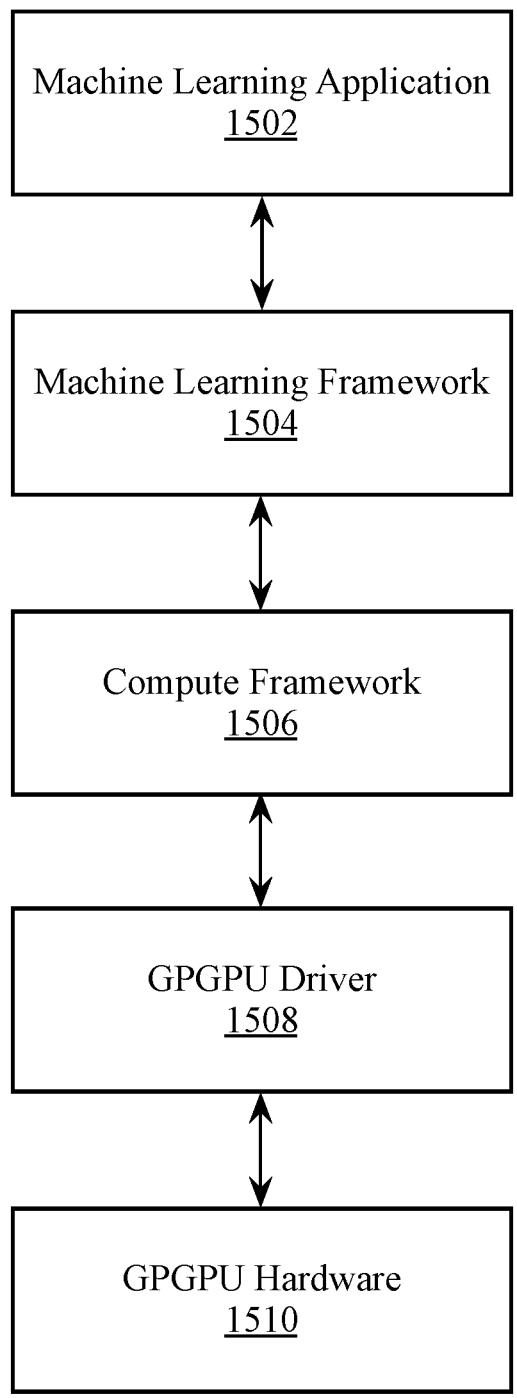
FIG. 15 illustrates a machine learning software stack, according to an embodiment.

FIG. 15 is a generalized diagram of a machine learning software stack 1500. A machine learning application 1502 can be configured to train a neural network using a training dataset or to use a trained deep neural network to implement machine intelligence. The machine learning application 1502 can include training and inference functionality for a neural network and/or specialized software that can be used to train a neural network before deployment. The machine learning application 1502 can implement any type of machine intelligence including but not limited to image recognition, mapping and localization, autonomous navigation, speech synthesis, medical imaging, or language translation.

Hardware acceleration for the machine learning application 1502 can be enabled via a machine learning framework 1504. The machine learning framework 1504 can provide a library of machine learning primitives. Machine learning primitives are basic operations that are commonly performed by machine learning algorithms. Without the machine learning framework 1504, developers of machine learning algorithms would be required to create and optimize the main computational logic associated with the machine learning algorithm, then re-optimize the computational logic as new parallel processors are developed. Instead, the machine learning application can be configured to perform the necessary computations using the primitives provided by the machine learning framework 1504. Exemplary primitives include tensor convolutions, activation functions, and pooling, which are computational operations that are performed while training a convolutional neural network (CNN). The machine learning framework 1504 can also provide primitives to implement basic linear algebra subprograms performed by many machine-learning algorithms, such as matrix and vector operations.

The machine learning framework 1504 can process input data received from the machine learning application 1502 and generate the appropriate input to a compute framework 1506. The compute framework 1506 can abstract the underlying instructions provided to the GPGPU driver 1508 to enable the machine learning framework 1504 to take advantage of hardware acceleration via the GPGPU hardware 1510 without requiring the machine learning framework 1504 to have intimate knowledge of the architecture of the GPGPU hardware 1510. Additionally, the compute framework 1506 can enable hardware acceleration for the machine learning framework 1504 across a variety of types and generations of the GPGPU hardware 1510.

Machine Learning Neural Network Implementations

The computing architecture provided by embodiments described herein can be configured to perform the types of parallel processing that is particularly suited for training and deploying neural networks for machine learning. A neural network can be generalized as a network of functions having a graph relationship. As is known in the art, there are a variety of types of neural network implementations used in machine learning. One exemplary type of neural network is the feedforward network, as previously described.

A second exemplary type of neural network is the Convolutional Neural Network (CNN). A CNN is a specialized feedforward neural network for processing data having a known, grid-like topology, such as image data. Accordingly, CNNs are commonly used for compute vision and image recognition applications, but they also may be used for other types of pattern recognition such as speech and language processing. The nodes in the CNN input layer are organized into a set of "filters" (feature detectors inspired by the receptive fields found in the retina), and the output of each set of filters is propagated to nodes in successive layers of the network. The computations for a CNN include applying the convolution mathematical operation to each filter to produce the output of that filter. Convolution is a specialized kind of mathematical operation performed by two functions to produce a third function that is a modified version of one of the two original functions. In convolutional network terminology, the first function to the convolution can be referred to as the input, while the second function can be referred to as the convolution kernel. The output may be referred to as the feature map. For example, the input to a convolution layer can be a multidimensional array of data that defines the various color components of an input image. The convolution kernel can be a multidimensional array of parameters, where the parameters are adapted by the training process for the neural network.

Recurrent neural networks (RNNs) are a family of feedforward neural networks that include feedback connections between layers. RNNs enable modeling of sequential data by sharing parameter data across different parts of the neural network. The architecture for a RNN includes cycles. The cycles represent the influence of a present value of a variable on its own value at a future time, as at least a portion of the output data from the RNN is used as feedback for processing subsequent input in a sequence. This feature makes RNNs particularly useful for language processing due to the variable nature in which language data can be composed.

The figures described below present exemplary feedforward, CNN, and RNN networks, as well as describe a general process for respectively training and deploying each of those types of networks. It will be understood that these descriptions are exemplary and non-limiting as to any specific embodiment described herein and the concepts illustrated can be applied generally to deep neural networks and machine learning techniques in general.

The exemplary neural networks described above can be used to perform deep learning. Deep learning is machine learning using deep neural networks. The deep neural networks used in deep learning are artificial neural networks composed of multiple hidden layers, as opposed to shallow neural networks that include only a single hidden layer. Deeper neural networks are generally more computationally intensive to train. However, the additional hidden layers of the network enable multistep pattern recognition that results in reduced output error relative to shallow machine learning techniques.

Deep neural networks used in deep learning typically include a front-end network to perform feature recognition coupled to a back-end network which represents a mathematical model that can perform operations (e.g., object classification, speech recognition, etc.) based on the feature representation provided to the model. Deep learning enables machine learning to be performed without requiring hand crafted feature engineering to be performed for the model. Instead, deep neural networks can learn features based on statistical structure or correlation within the input data. The learned features can be provided to a mathematical model that can map detected features to an output. The mathematical model used by the network is generally specialized for the specific task to be performed, and different models will be used to perform different task.

Once the neural network is structured, a learning model can be applied to the network to train the network to perform specific tasks. The learning model describes how to adjust the weights within the model to reduce the output error of the network. Backpropagation of errors is a common method used to train neural networks. An input vector is presented to the network for processing. The output of the network is compared to the desired output using a loss function and an error value is calculated for each of the neurons in the output layer. The error values are then propagated backwards until each neuron has an associated error value which roughly represents its contribution to the original output. The network can then learn from those errors using an algorithm, such as the stochastic gradient descent algorithm, to update the weights of the of the neural network.

Figure 16A:
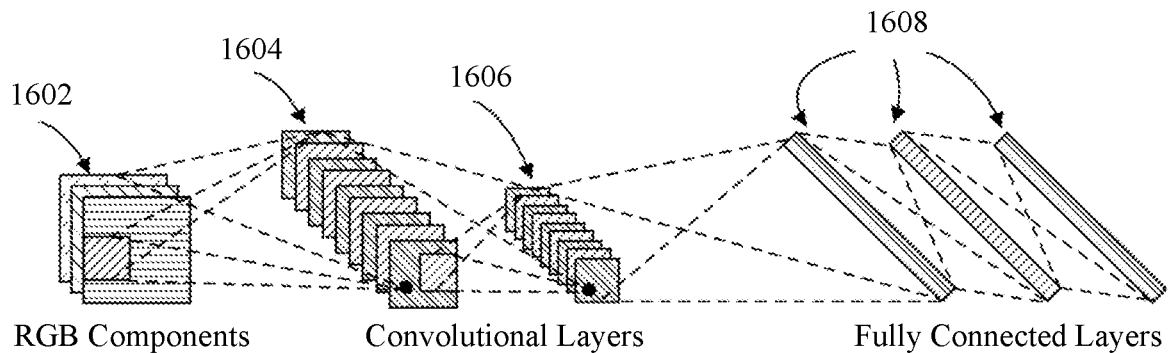
FIG. 16A-16B illustrate layers of exemplary deep neural networks.
Figure 16B:
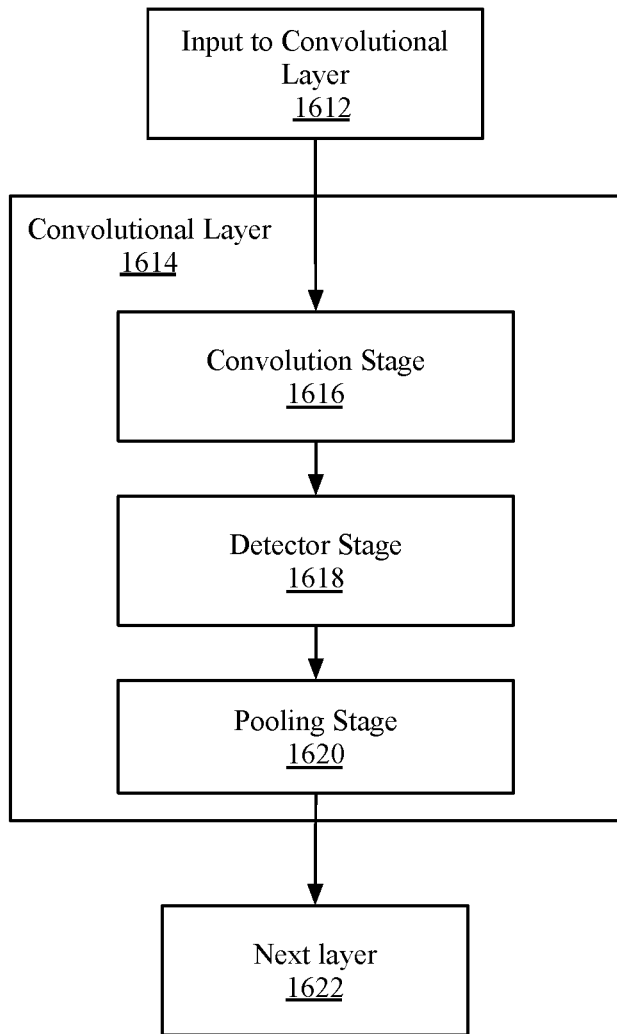

FIG. 16A-16B illustrate an exemplary convolutional neural network. FIG. 16A illustrates various layers within a CNN. As shown in FIG. 16A, an exemplary CNN used to model image processing can receive input 1602 describing the red, green, and blue (RGB) components of an input image. The input 1602 can be processed by multiple convolutional layers (e.g., first convolutional layer 1604, second convolutional layer 1606). The output from the multiple convolutional layers may optionally be processed by a set of fully connected layers 1608. Neurons in a fully connected layer have full connections to all activations in the previous layer, as previously described for a feedforward network. The output from the fully connected layers 1608 can be used to generate an output result from the network. The activations within the fully connected layers 1608 can be computed using matrix multiplication instead of convolution. Not all CNN implementations are make use of fully connected layers 1608. For example, in some implementations the second convolutional layer 1606 can generate output for the CNN.

The convolutional layers are sparsely connected, which differs from traditional neural network configuration found in the fully connected layers 1608. Traditional neural network layers are fully connected, such that every output unit interacts with every input unit. However, the convolutional layers are sparsely connected because the output of the convolution of a field is input (instead of the respective state value of each of the nodes in the field) to the nodes of the subsequent layer, as illustrated. The kernels associated with the convolutional layers perform convolution operations, the output of which is sent to the next layer. The dimensionality reduction performed within the convolutional layers is one aspect that enables the CNN to scale to process large images.

FIG. 16B illustrates exemplary computation stages within a convolutional layer of a CNN. Input to a convolutional layer 1612 of a CNN can be processed in three stages of a convolutional layer 1614. The three stages can include a convolution stage 1616, a detector stage 1618, and a pooling stage 1620. The convolution layer 1614 can then output data to a successive convolutional layer. The final convolutional layer of the network can generate output feature map data or provide input to a fully connected layer, for example, to generate a classification value for the input to the CNN.

In the convolution stage 1616 performs several convolutions in parallel to produce a set of linear activations. The convolution stage 1616 can include an affine transformation, which is any transformation that can be specified as a linear transformation plus a translation. Affine transformations include rotations, translations, scaling, and combinations of these transformations. The convolution stage computes the output of functions (e.g., neurons) that are connected to specific regions in the input, which can be determined as the local region associated with the neuron. The neurons compute a dot product between the weights of the neurons and the region in the local input to which the neurons are connected. The output from the convolution stage 1616 defines a set of linear activations that are processed by successive stages of the convolutional layer 1614.

The linear activations can be processed by a detector stage 1618. In the detector stage 1618, each linear activation is processed by a non-linear activation function. The non-linear activation function increases the nonlinear properties of the overall network without affecting the receptive fields of the convolution layer. Several types of non-linear activation functions may be used. One particular type is the rectified linear unit (ReLU), which uses an activation function defined as $f(x)=\max(0, x)$, such that the activation is thresholded at zero.

The pooling stage 1620 uses a pooling function that replaces the output of the second convolutional layer 1606 with a summary statistic of the nearby outputs. The pooling function can be used to introduce translation invariance into the neural network, such that small translations to the input do not change the pooled outputs. Invariance to local translation can be useful in scenarios where the presence of a feature in the input data is more important than the precise location of the feature. Various types of pooling functions can be used during the pooling stage 1620, including max pooling, average pooling, and l2-norm pooling. Additionally, some CNN implementations do not include a pooling stage. Instead, such implementations substitute and additional convolution stage having an increased stride relative to previous convolution stages.

The output from the convolutional layer 1614 can then be processed by the next layer 1622. The next layer 1622 can be an additional convolutional layer or one of the fully connected layers 1608. For example, the first convolutional layer 1604 of FIG. 16A can output to the second convolutional layer 1606, while the second convolutional layer can output to a first layer of the fully connected layers 1608.

Figure 17:
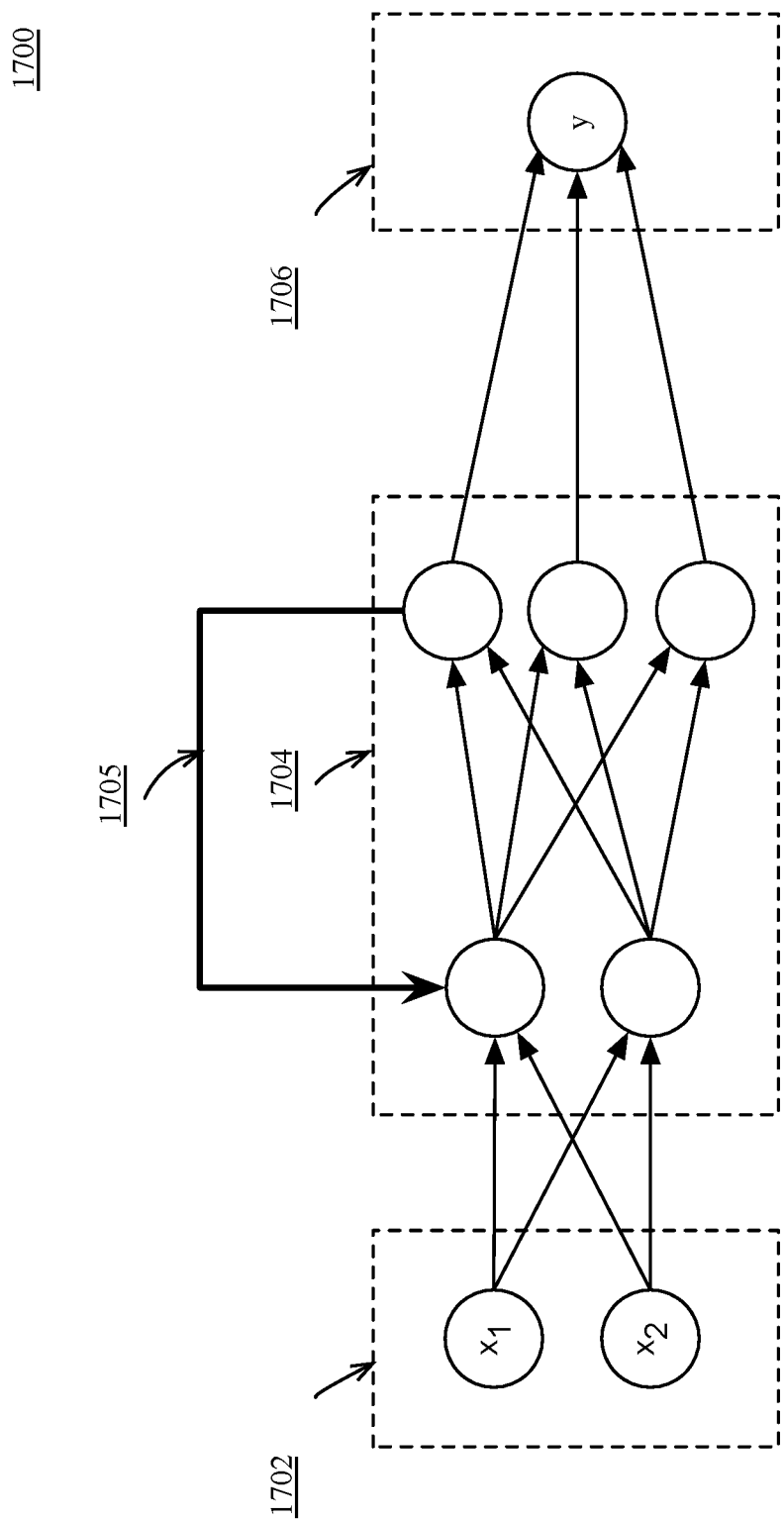
FIG. 17 illustrates an exemplary recurrent neural network.

FIG. 17 illustrates an exemplary recurrent neural network. In a recurrent neural network (RNN), the previous state of the network influences the output of the current state of the network. RNNs can be built in a variety of ways using a variety of functions. The use of RNNs generally revolves around using mathematical models to predict the future based on a prior sequence of inputs. For example, an RNN may be used to perform statistical language modeling to predict an upcoming word given a previous sequence of words. The illustrated RNN 1700 can be described as having an input layer 1702 that receives an input vector, hidden layers 1704 to implement a recurrent function, a feedback mechanism 1705 to enable a 'memory' of previous states, and an output layer 1706 to output a result. The RNN 1700 operates based on time-steps. The state of the RNN at a given time step is influenced based on the previous time step via the feedback mechanism 1705. For a given time step, the state of the hidden layers 1704 is defined by the previous state and the input at the current time step. An initial input (x1) at a first time step can be processed by the hidden layer 1704. A second input (x2) can be processed by the hidden layer 1704 using state information that is determined during the processing of the initial input (x1). A given state can be computed as $s_t = f(U_{x_t} + W s_{t-1})$, where U and W are parameter matrices. The function $f$ is generally a nonlinearity, such as the hyperbolic tangent function (Tan h) or a variant of the rectifier function $f(x)=\max(0, x)$. However, the specific mathematical function used in the hidden layers 1704 can vary depending on the specific implementation details of the RNN 1700.

In addition to the basic CNN and RNN networks described, variations on those networks may be enabled. One example RNN variant is the long short-term memory (LSTM) RNN. LSTM RNNs are capable of learning long-term dependencies that may be necessary for processing longer sequences of language. A variant on the CNN is a convolutional deep belief network, which has a structure similar to a CNN and is trained in a manner similar to a deep belief network. A deep belief network (DBN) is a generative neural network that is composed of multiple layers of stochastic (random) variables. DBNs can be trained layer-by-layer using greedy unsupervised learning. The learned weights of the DBN can then be used to provide pre-train neural networks by determining an optimal initial set of weights for the neural network.

Figure 18:
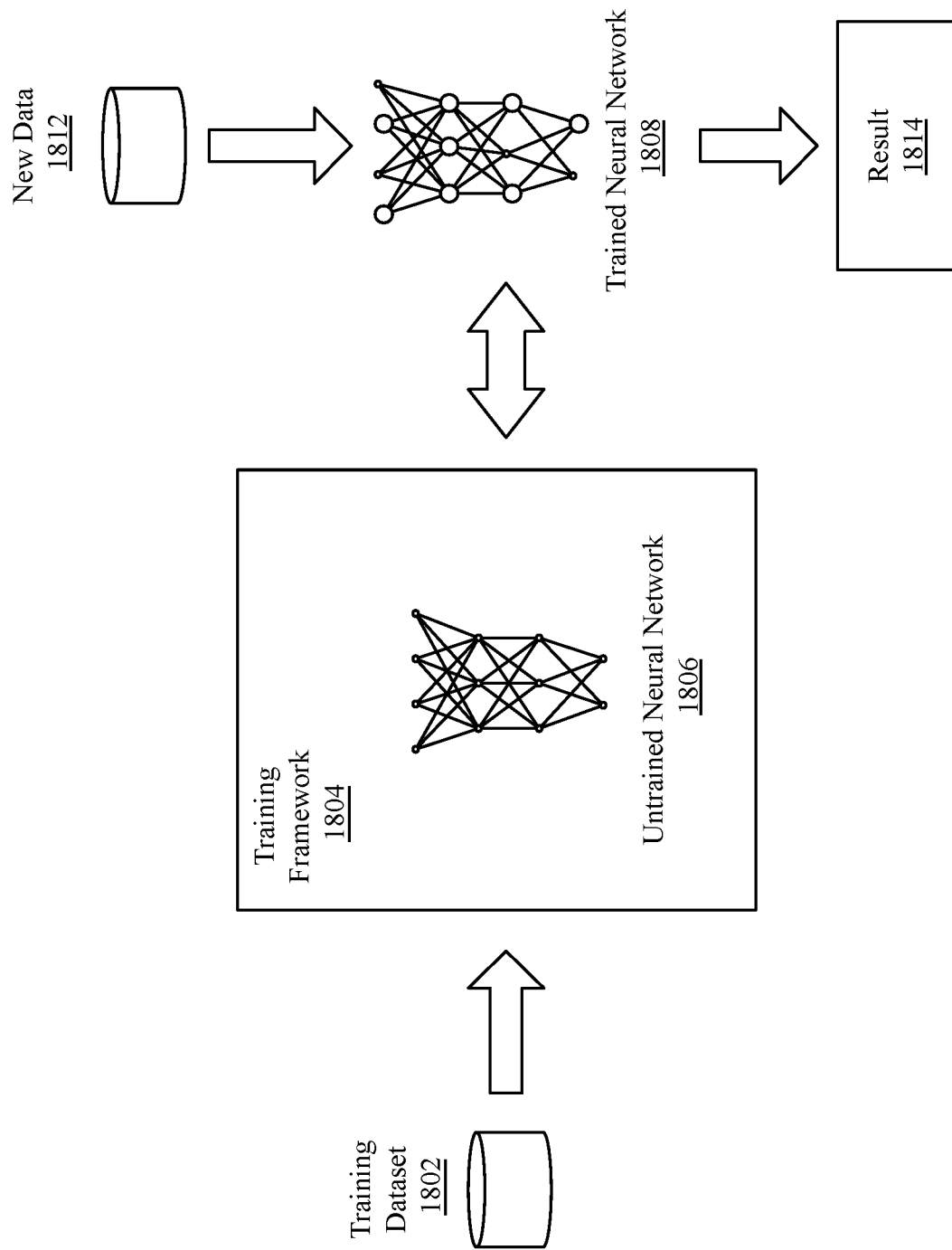
FIG. 18 illustrates training and deployment of a deep neural network.

FIG. 18 illustrates training and deployment of a deep neural network. Once a given network has been structured for a task the neural network is trained using a training dataset 1802. Various training frameworks have been developed to enable hardware acceleration of the training process. For example, the machine learning framework 1504 of FIG. 15 may be configured as a training framework 1804. The training framework 1804 can hook into an untrained neural network 1806 and enable the untrained neural net to be trained using the parallel processing resources described herein to generate a trained neural network 1808. To start the training process the initial weights may be chosen randomly or by pre-training using a deep belief network. The training cycle then be performed in either a supervised or unsupervised manner.

Supervised learning is a learning method in which training is performed as a mediated operation, such as when the training dataset 1802 includes input paired with the desired output for the input, or where the training dataset includes input having known output and the output of the neural network is manually graded. The network processes the inputs and compares the resulting outputs against a set of expected or desired outputs. Errors are then propagated back through the system. The training framework 1804 can adjust to adjust the weights that control the untrained neural network 1806. The training framework 1804 can provide tools to monitor how well the untrained neural network 1806 is converging towards a model suitable to generating correct answers based on known input data. The training process occurs repeatedly as the weights of the network are adjusted to refine the output generated by the neural network. The training process can continue until the neural network reaches a statistically desired accuracy associated with a trained neural network 1808. The trained neural network 1808 can then be deployed to implement any number of machine learning operations.

Unsupervised learning is a learning method in which the network attempts to train itself using unlabeled data. Thus, for unsupervised learning the training dataset 1802 will include input data without any associated output data. The untrained neural network 1806 can learn groupings within the unlabeled input and can determine how individual inputs are related to the overall dataset. Unsupervised training can be used to generate a self-organizing map, which is a type of trained neural network 1807 capable of performing operations useful in reducing the dimensionality of data. Unsupervised training can also be used to perform anomaly detection, which allows the identification of data points in an input dataset that deviate from the normal patterns of the data.

Variations on supervised and unsupervised training may also be employed. Semi-supervised learning is a technique in which in the training dataset 1802 includes a mix of labeled and unlabeled data of the same distribution. Incremental learning is a variant of supervised learning in which input data is continuously used to further train the model. Incremental learning enables the trained neural network 1808 to adapt to the new data 1812 without forgetting the knowledge instilled within the network during initial training.

Whether supervised or unsupervised, the training process for particularly deep neural networks may be too computationally intensive for a single compute node. Instead of using a single compute node, a distributed network of computational nodes can be used to accelerate the training process.

Figure 19:
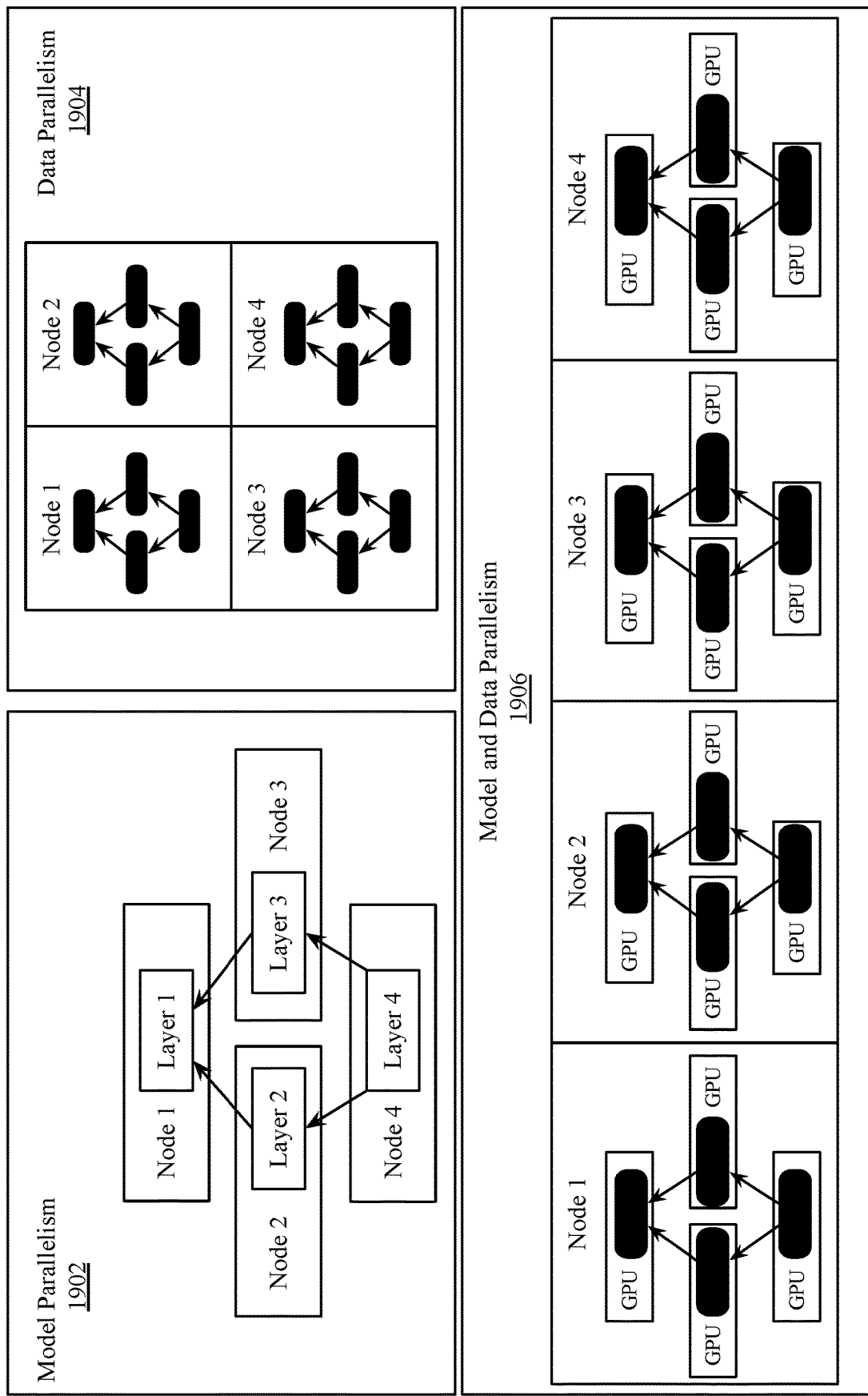
FIG. 19 is a block diagram illustrating distributed learning.

FIG. 19 is a block diagram illustrating distributed learning. Distributed learning is a training model that uses multiple distributed computing nodes to perform supervised or unsupervised training of a neural network. The distributed computational nodes can each include one or more host processors and one or more of the general-purpose processing nodes. As illustrated, distributed learning can be performed model parallelism 1902, data parallelism 1904, or a combination of model and data parallelism 1904.

In model parallelism 1902, different computational nodes in a distributed system can perform training computations for different parts of a single network. For example, each layer of a neural network can be trained by a different processing node of the distributed system. The benefits of model parallelism include the ability to scale to particularly large models. Splitting the computations associated with different layers of the neural network enables the training of very large neural networks in which the weights of all layers would not fit into the memory of a single computational node. In some instances, model parallelism can be particularly useful in performing unsupervised training of large neural networks.

In data parallelism 1904, the different nodes of the distributed network have a complete instance of the model and each node receives a different portion of the data. The results from the different nodes are then combined. While different approaches to data parallelism are possible, data parallel training approaches all require a technique of combining results and synchronizing the model parameters between each node. Exemplary approaches to combining data include parameter averaging and update based data parallelism. Parameter averaging trains each node on a subset of the training data and sets the global parameters (e.g., weights, biases) to the average of the parameters from each node. Parameter averaging uses a central parameter server that maintains the parameter data. Update based data parallelism is similar to parameter averaging except that instead of transferring parameters from the nodes to the parameter server, the updates to the model are transferred. Additionally, update based data parallelism can be performed in a decentralized manner, where the updates are compressed and transferred between nodes.

Combined model and data parallelism 1906 can be implemented, for example, in a distributed system in which each computational node includes multiple GPUs. Each node can have a complete instance of the model with separate GPUs within each node are used to train different portions of the model.

Distributed training has increased overhead relative to training on a single machine. However, the parallel processors and GPGPUs described herein can each implement various techniques to reduce the overhead of distributed training, including techniques to enable high bandwidth GPU-to-GPU data transfer and accelerated remote data synchronization.

Exemplary Machine Learning Applications

Machine learning can be applied to solve a variety of technological problems, including but not limited to computer vision, autonomous driving and navigation, speech recognition, and language processing. Computer vision has traditionally been one of the most active research areas for machine learning applications. Applications of computer vision range from reproducing human visual abilities, such as recognizing faces, to creating new categories of visual abilities. For example, computer vision applications can be configured to recognize sound waves from the vibrations induced in objects visible in a video. Parallel processor accelerated machine learning enables computer vision applications to be trained using significantly larger training dataset than previously feasible and enables inferencing systems to be deployed using low power parallel processors.

Parallel processor accelerated machine learning has autonomous driving applications including lane and road sign recognition, obstacle avoidance, navigation, and driving control. Accelerated machine learning techniques can be used to train driving models based on datasets that define the appropriate responses to specific training input. The parallel processors described herein can enable rapid training of the increasingly complex neural networks used for autonomous driving solutions and enables the deployment of low power inferencing processors in a mobile platform suitable for integration into autonomous vehicles.

Parallel processor accelerated deep neural networks have enabled machine learning approaches to automatic speech recognition (ASR). ASR includes the creation of a function that computes the most probable linguistic sequence given an input acoustic sequence. Accelerated machine learning using deep neural networks have enabled the replacement of the hidden Markov models (HMMs) and Gaussian mixture models (GMMs) previously used for ASR.

Parallel processor accelerated machine learning can also be used to accelerate natural language processing. Automatic learning procedures can make use of statistical inference algorithms to produce models that are robust to erroneous or unfamiliar input. Exemplary natural language processor applications include automatic machine translation between human languages.

The parallel processing platforms used for machine learning can be divided into training platforms and deployment platforms. Training platforms are generally highly parallel and include optimizations to accelerate multi-GPU single node training and multi-node, multi-GPU training, while deployed machine learning (e.g., inferencing) platforms generally include lower power parallel processors suitable for use in products such as cameras, autonomous robots, and autonomous vehicles.

Utilizing 3D Compression Blocks for Compression of Untyped Graphics Data

In conventional operation, GPU data compression is provided for color data, and is used by typed data (3D and media applications). Thus, the data compression pipeline in a graphics processing system is available for compression operations.

However, GPU compute data, such as data for machine learning and deep learning operation, is untyped data, and thus the conventional compression operation is not applicable to such data.

In some embodiments, the 3D compression blocks that are conventionally utilized for typed data are applied to untyped compute data. In some embodiments, current Graphics assets are utilized for compression of machine Learning (ML) data, using a current pipeline for 3D data.

A current system addresses typed data, utilizing a system layout for data, wherein the data is not sequentially stored. However, machine learning and deep learning data is generally untyped data, and is generally sequentially stored. In some embodiments, a system utilizes the sequential storage of untyped data in the compression operation.

For 3D data, there is a state, wherein the state determines how the data is laid out, etc. In some embodiments, in order to reuse the 3D compression hardware for compression of untyped data, an apparatus, system, or process is to detect the memory allocation of the untyped data by software, with the driver determining whether data is to be compressed.

In some embodiments, there is a further a conversion to a stateful buffer, with allocation of data in buffer being indicated in the state. Thus, the system understands that compression is to be done, and provides structure for the buffer to specify the parameters for compression. The state includes a pointer to point to the data, and may include elements such as the size of the buffer, the compression type, and a pointer to the auxiliary surface. In some embodiments, a small auxiliary buffer is created to hold compression metadata for compression of untyped data.

In some embodiments, for the layout of the buffer, the buffer is linear in format, which is how data is packed in memory.

In some embodiments, a driver can match the data format that is used as an aid to the algorithm. However, this is not required. If the determined data distribution is incorrect, this can be handled by the algorithm. In some embodiments, for optimal operation, a system may provide a hint for compression regarding data, but there are other ways to handle this for the data in compression.

In some embodiments, a data port allows for transmission of DL/ML data without format conversion. For 3D data format, there is a conversion to shader format for pixel data. However, a different process is used for machine learning and deep learning data, wherein there is no format conversion of the data. In some embodiments, the data port is modified to allow transmission without format conversion. In some embodiments, software will instead address the DL/ML data.

With regard to a compression block and cachelines, for 3D data this depends on how the pixels are hashed, which is known upfront for operation. But for GPGPU operation this normally cannot be known upfront. Rather, the hardware is required to understand the sequential block pattern. In some embodiments, an apparatus, system, or process addresses the issue utilizing fixed blocks that are always sequential. This works as the data is generally sequential.

For data resolve, it is sometimes necessary to send data back to the CPU, where data back to the CPU needs to be uncompressed format. For 3D data, there is special hardware to handle the data transfer back to the CPU. In some embodiments, for compute data, the GPU kernel is used, and a process includes submitting a new kernel. The data write that is required is uncompressed data. However, the process does not make a copy of the data. Instead, the decompression is done in place. In some embodiments, a process includes submitting the kernel to the pipeline, and changing the description/pointer to the same buffer with the now uncompressed data. For machine learning, the data is mapped to the GPU, and returned to be mapped to the CPU.

In some embodiments, the GPGPU programming API (e.g. OpenCL, DX, Metal) can be extended to pass a hint from application to the Graphics driver regarding data compression. This may be done at data allocation time (e.g. OpenCL function clCreateBuffer( ) call). The hints regarding compression may include, but are not limited to, the following:

(1) Whether compression should be enabled for the buffer. For example, a buffer that maps/unmaps too frequently, or is accessed rarely, will not be a good candidate for compression.

(2) The native data type size that maps to the buffer (e.g. 8-bit integer, 16-bit float, 32-bit float). This information may be used to tune the data compression algorithm.

Figure 20:
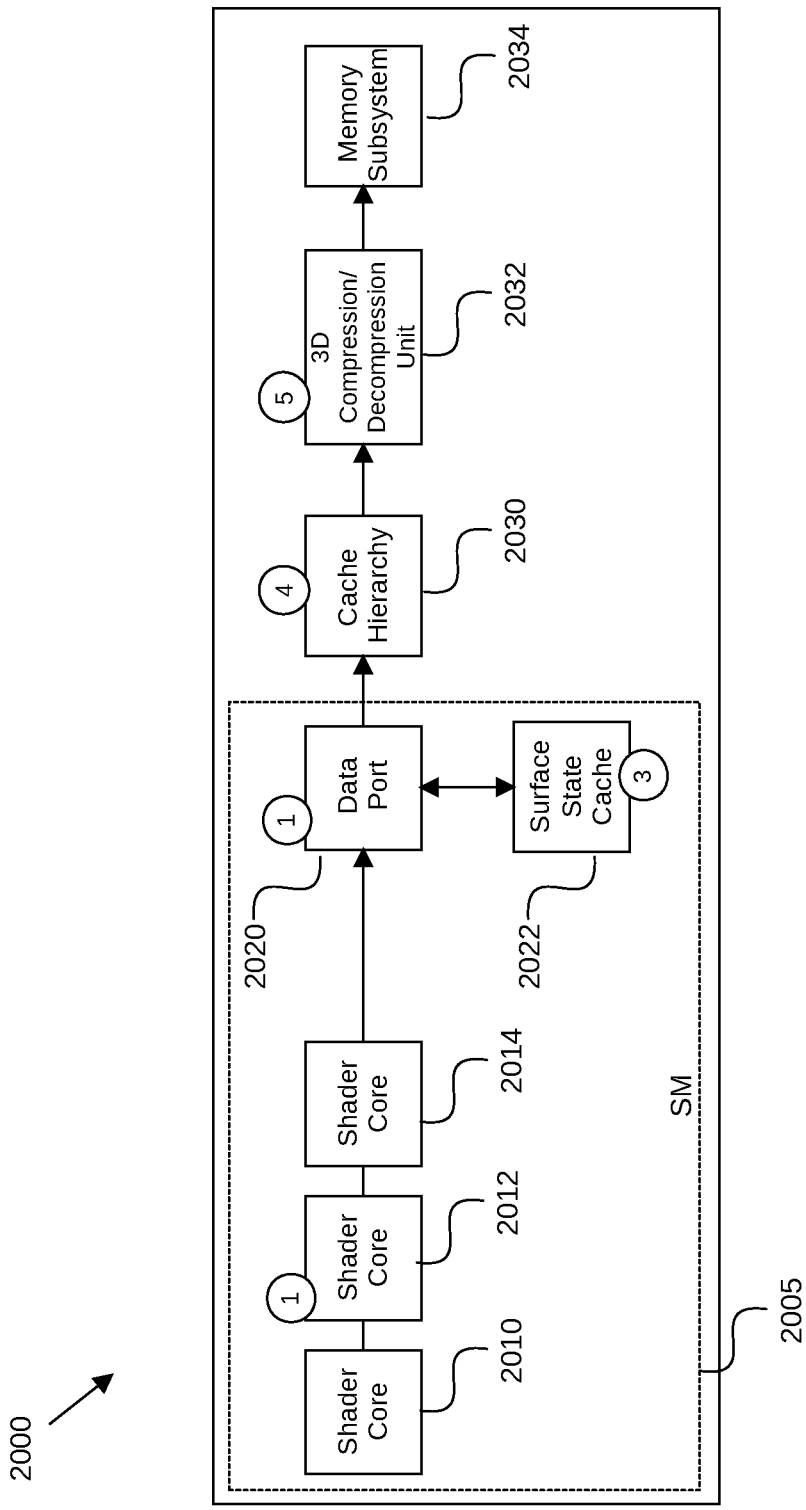
FIG. 20 is an illustration of a data compression pipeline in a graphics processing system according to some embodiments.

FIG. 20 is an illustration of a data compression pipeline in a graphics processing system according to some embodiments. In some embodiments, a data compression pipeline is expanded to enable use for data compression of untyped compute data in addition to 3D data. FIG. 20 illustrates a memory data compression pipeline 2000 utilized by the 3D shaders of the graphics system, the 3D shaders illustrated as running on shader cores 2010, 2012, and 2014 in SM 2005. The 3D shaders running on the shader cores 2010-2014 send memory read/write messages to the Data Port in the SM 2005. The SM 2005 further includes a data port 2020 and surface state cache 2022.

The memory data compression pipeline 2000 further includes a cache hierarchy 2030 and 3D compression/decompression unit 2032, which provides for compression of untyped data to be stored to the memory subsystem 2034 and decompression of data from the memory subsystem 2034.

The shader memory surfaces are associated with a surface state that is stored in the surface state cache 2022. The surface state has information about the surface such as bits per pixel, tiling mode, etc. This information is used by the 3D compression/decompression unit 2032 downstream, to compress the data before sending to the memory subsystem.

For GPGPU programs running on GPU (such as deep learning and machine learning), the data is typically "untyped" (i.e. no hardware data format is used) and not tiled (i.e. laid out linearly in memory). In some embodiments, the 3D compression pipeline 2000 existing in the GPU may be utilized by GPGPU kernels with minimal changes to the hardware, and without requiring changes in the software application.

In some embodiments, during memory allocation by the software, the GPU driver will apply heuristics to determine whether or not data compression will be enabled for a buffer. If data compression is enabled, the driver will allocate an auxiliary buffer to store the compression metadata, and will also allocate a surface state. In some embodiments, the compiler is to ensure that all accesses to the buffer from the kernel is done with the proper surface-state pointer. This process is known as "promotion" of the buffer from a stateless buffer to stateful buffer. The promotion of the buffer is performed by the driver/compiler and is transparent to the application.

In some embodiments, for GPGPU applications, the surface state will indicate a buffer memory layout (i.e., not tiled, or structured in to 2D/3D). The data format for these surfaces will depend on the buffer type. For example, for Deep Learning inference, the data type used is usually 8-bit, hence the format will be 8-bit integer. For Deep Learning training, the format will typically be 16-bit floats.

In some embodiments, even though the compute data surfaces have a "format" specified, the data port 2020 will not perform any format conversion during accesses, because this is not required by these applications, unlike the requirements for 3D shaders. Instead, the format information is only used for driving the compression/decompression algorithm heuristics.

A compression data "block" is a block of cachelines (typically 2 or 4 cachelines) that are compressed together by the compression unit. For a 3D application, which cacheline addresses form a single "block" changes depending on which 3D data is being compressed (e.g. color vs. Z), how pixels are hashed across shader kernels and the bits-per-pixel for that surface. In some embodiments, for GPGPU compression, a simple method is employed to determine the compression block, wherein the cacheline addresses in a block are always sequential. Deep learning programs typically have good sequential locality in accesses and this provides good performance while keeping the hardware very simple.

A resolve operation means a surface that is compressed in memory should be decompressed so that it can be consumed by the CPU (or any other agent which does not support hardware decompression). For a 3D application, there is a 3D GPU command that resolves a surface by the GPU hardware. However, no such hardware exists for the compute command pipeline that GPGPU uses.

Figure 21:
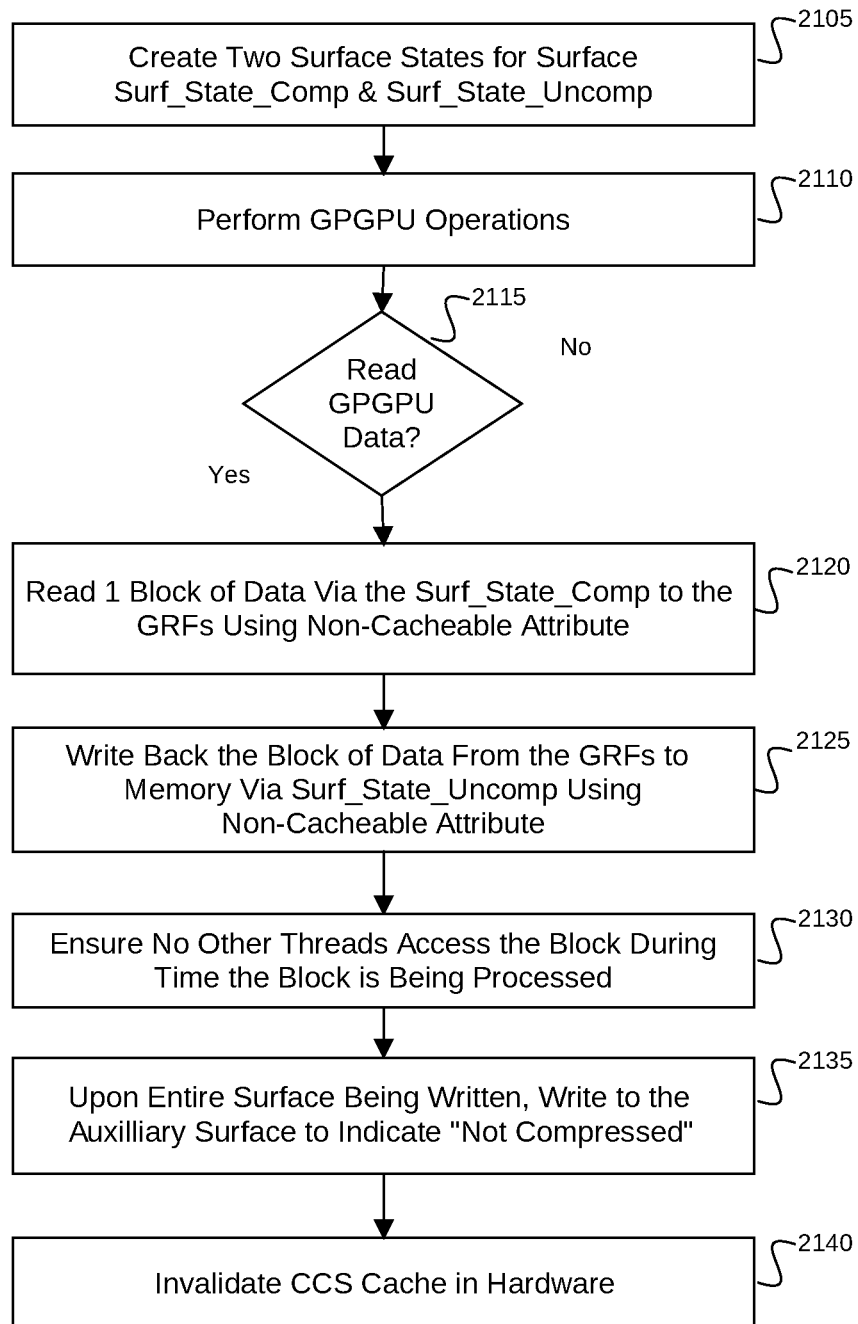
FIG. 21 is a flowchart to illustrate an algorithm for resolving a memory surface in place according to some embodiments.

FIG. 21 is a flowchart to illustrate an algorithm for resolving a memory surface in place according to some embodiments. In some embodiments, the following algorithm is applied to resolve a surface "in-place" (i.e., with no copy) by the driver for GPGPU applications:

2105: Driver creates 2 different surface states for a same memory surface. A first surface state has compression enabled, and a second surface state has compression disabled. The surface states may be referred to respectively as Surf_State_Comp (for compression enabled) and Surf_State_Uncomp. (for compression disabled).

2110: Perform GPGPU operations by the GPU. The GPGPU may include processing of machine learning or deep learning data.

2115: Determine if a request to read untyped GPGPU data from system memory is received.

2120: If so, read by the GPU one block of data (2 or 4 Cachelines) via the Surf_State_Comp to memory arrays (general register file arrays (GRFs), using a non-cacheable attribute.

2125: Write back the block of data as uncompressed data from GRFs to memory via Surf_State_Uncomp, using a non-cacheable attribute.

2130: Ensure no threads other than a current thread are to access this block during time the block is being processed, such as by marking the block as unavailable during processing or otherwise preventing access to such block.

2135: After the entire surface is written, write to the surface (CCS state) to indicate "not-compressed".

2140: Invalidate the applicable CCS cache element in hardware.

Evaluating Sensor Data Streams and Intelligently Down-Sampling Data Sets for Learning Algorithms In some embodiments, an apparatus, system, or process provides for evaluating sensor data streams and intelligently down sampling data sets for learning algorithms. In some embodiments, the intelligent down sampling may be utilized to provide for efficient data handling for machine learning and deep learning in a Graphics processing system.

In some embodiments, the techniques may relate to Internet of Things (IoT) devices and learning applications at the edge of compute and networking subsystems. Embodiments may relate to sensor devices and their related application layers.

Data compression for machine learning and deep learning applications may be applied to reduce the compute, memory and storage footprint requirements of the system. Interval driven down sampling is a standard approach wherein static intervals are identified and applied, resulting in reduced data sets. However, this conventional approach results in a clear loss in accuracy and information.

Current down sampling techniques have preset polling/filter intervals. The interval determination is a trial and error based and is manual with potential loss of information resulting in suboptimal data samples that cab severely compromise the analytics engine that uses this data.

Further, the use of static intervals does not take advantage of changes in the data set that might assist in improving the sampling process. Rather, a static interval essentially requires a guess as to the best interval to use in down sampling, even as the data stream changes over time.

In some embodiments, intelligent down samplers allow the consuming applications to choose between data sets at dynamically set intervals that have the most accurate contextual relevance. A feedback loop is incorporated from within the output of the analytics algorithm that is implemented.

In some embodiments, an optimizer is to dynamically assign a down sampling interval (or frequency/rate) by identifying a homogeneity and parameter relationship score for a data set. In some embodiments, the optimizer is to minimize this score while determining the down sampling frequency interval, thus enabling the interval to be established based on the nature of the signal.

In a machine learning or deep learning system, there may be multiple data sets, such as multiple sensor streams. The data in such streams may vary over time with regard to activity, with certain streams being less active and thus homogeneous in value. In some embodiments, a feedback loop allows for adjustment in the scoring for a data set, resulting in active change in the interval.

In some embodiments, a down sampling process thus assists with very large data sets, the process extracting (sampling) the most informative data values from the set. The technique may be utilized to reduce execution time, storage, and memory, while reducing loss of accuracy caused by down sampling. In some embodiments, the process is tunable or switchable to allow a developer to choose how and whether to apply the active down sampling, depending on the nature of the machine learning or deep learning process.

Figure 22:
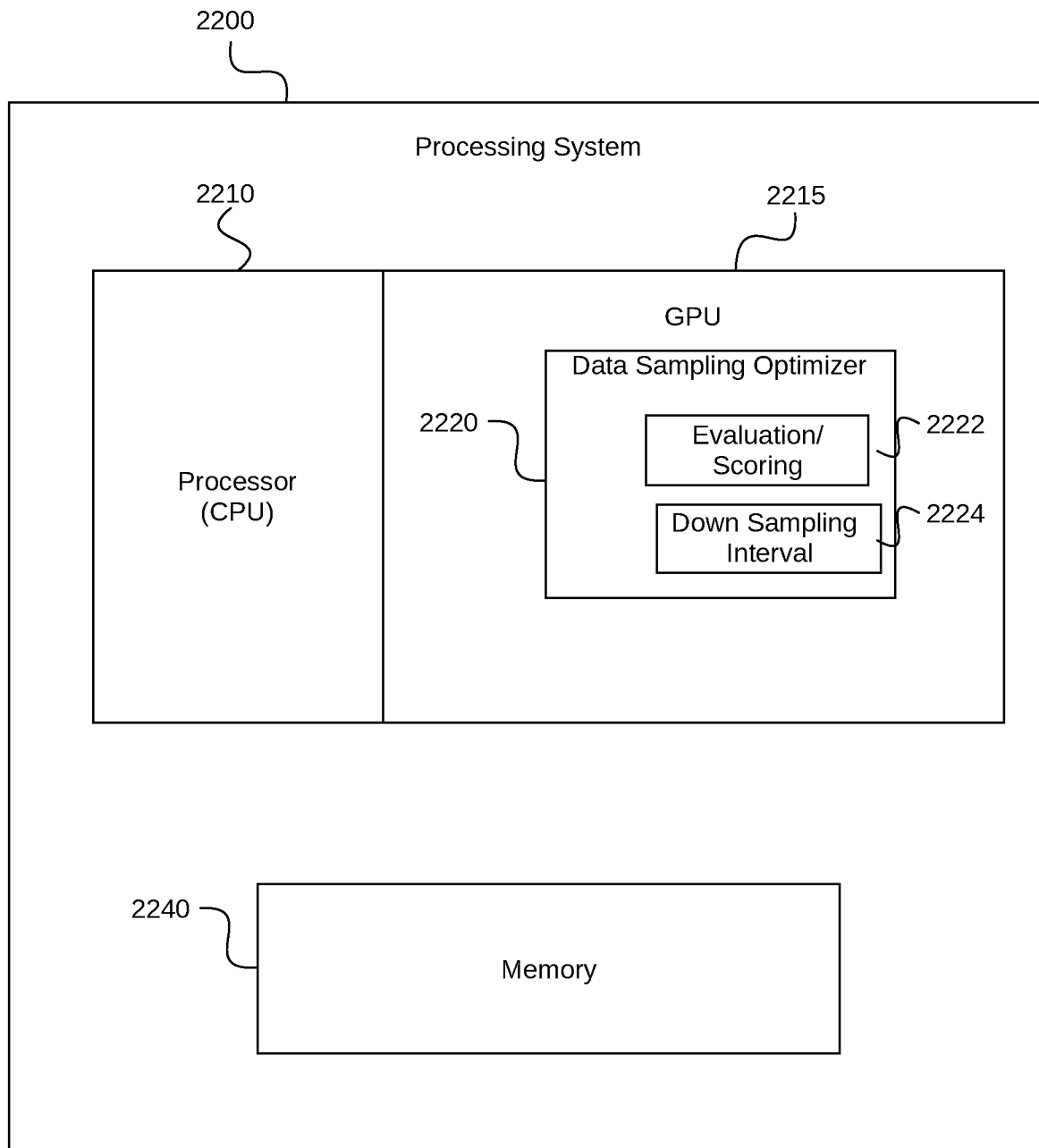
FIG. 22 is an illustration of a system including an intelligent down sampling of data sets according to some embodiments.

FIG. 22 is an illustration of a system including an intelligent down sampling of data sets according to some embodiments. As illustrated in FIG. 22, a processing system 2200 includes one or processors such as the illustrated CPU 2210 (such as one of processors 102 illustrated in FIG. 1) and one more GPUs such as the illustrated GPU 2215 (such as graphics processor 208 illustrated in FIG. 2 or graphics processor 300 illustrated in FIG. 3). The processing system further includes a memory 2240, wherein the memory may include storage of data for machine learning and deep learning processing by the GPU 2215, wherein the data may include large amounts of sampled data from multiple data streams.

In some embodiments, each sensor stream may be subject to a change notification daemon (CND) that encompasses a rolling window with their calculated distribution index, e.g. standard deviation. A CND is a metric that captures the changes in direction. For instance, during a 10 second interval, a signal that transitions from trending +ve to -ve and vice versa, will have a transition index of 2.

Optimal window size is determined via a binary search derived from the distribution index min and max values. Changes that exceed the distribution index tolerance levels triggers an MCN (ML Change Notification). Such a notification results in the re-computation of the rolling window size by evaluating data twice the current window size.

In some embodiments, a GPU 2215 includes a data sampling optimizer 2220 to provide for the intelligent down sampling of the data sets by the GPU 2215. In some embodiments, the optimizer may include a first component 2222 to provide for evaluation and scoring of data sets regarding the homogeneity and parameter relationship for the data, and a second component 2224 to dynamically establish a down sampling interval for each data set based on the homogeneity and parameter relationship score for the data sets. In some embodiments, the optimizer 2220 provides a feedback loop to adjust the down sampling intervals as the data is sampled to provide intelligent modification in the down sampling process. In some embodiments, the operation of the optimizer 2220 may be tuned for performance, or may be switched on or off as required for a particular application.

Figure 23:
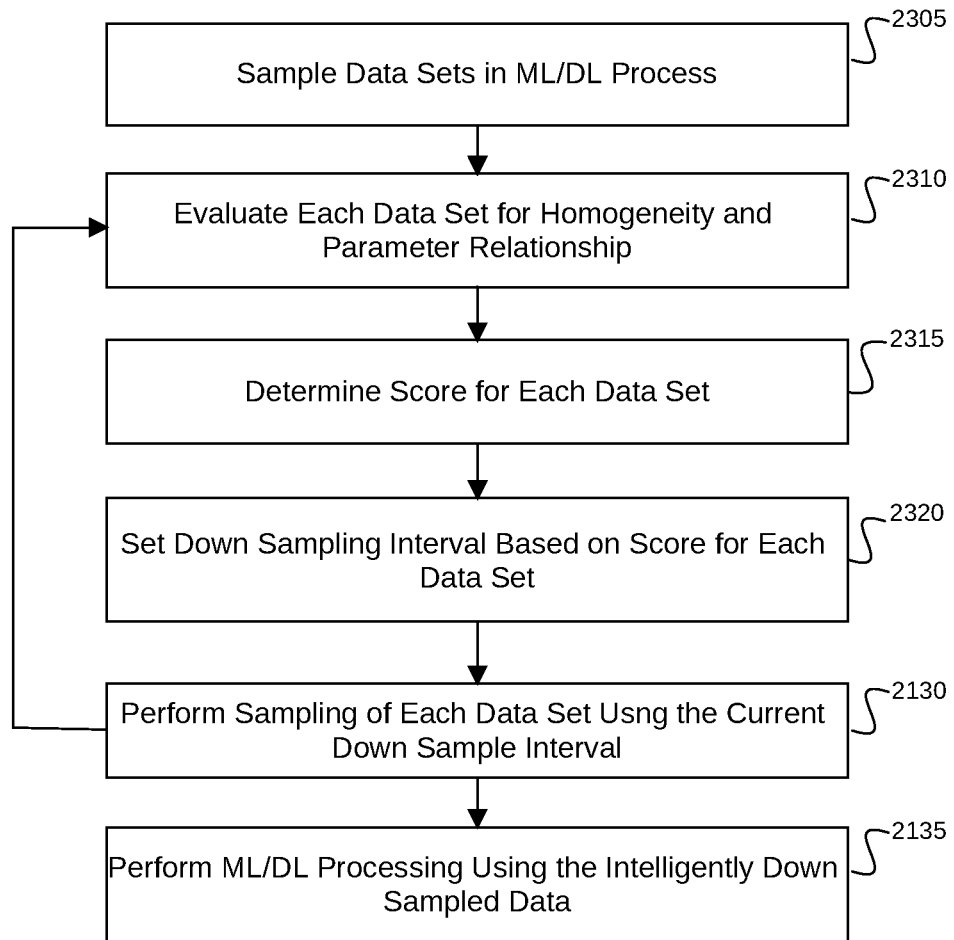
FIG. 23 is a flowchart to illustrate a process for intelligent down sampling of data sets according to some embodiments.

FIG. 23 is a flowchart to illustrate a process for intelligent down sampling of data sets according to some embodiments. In some embodiments, a process includes:

2305: Sample one or more data sets in a machine learning or deep learning system. The data sets, which may include multiple sensor data streams or other types of data streams, may be very large, and thus require down sampling to handle the volumes of data.

2310: Evaluate each data set for homogeneity and parameter relationship, such as by comparing the sampled data in each data set periodically.

2315: Determine a homogeneity and parameter relationship score for each data set, wherein the homogeneity and parameter relationship score may measure how much the data set is varying and thus how active a sensor stream or data set is at any point in time.

2320: Set a down sampling interval for each data set based on the score for such data set. For example, a first data set having a score indicating a high level of homogeneity in data is to be assigned a relatively longer sampling interval because the data set is less active, and a second data set having a score indicating a low level of homogeneity is to be assigned a relatively shorter sampling interval because the data set is more active.

2325: Perform sampling of data sets using the established down sampling intervals. In some embodiments, the process returns to continue evaluating each data set for homogeneity and parameter relationship 2310 to allow for dynamic modification of the down sampling intervals as the data sets change over time, becoming more or less active depending on what the data sets are measuring or are representing.

2330: Perform machine learning or deep learning processing utilizing the intelligently down sampled data.

Compressing Models into Reduced Precision Values by Re-Training with Pseudo Labels When trained machine learning or deep learning models are deployed on, for example, edge devices (an edge device being a device providing an entry point into a system), it sometimes becomes necessary to compress (shrink) the machine learning or deep learning models such that the models take up less resources (such as memory and compute resources).

In order to deploy trained deep learning models on edge devices such as smartphones, cameras and drones, it is sometimes necessary to compress the models to a more compact representation. This is due to the lower amount of memory and compute capabilities available on such devices. One possible way to achieve compression is to use a lower precision data type for the model parameters. However, merely quantizing the parameters to a lower precision data type (such as converting 32-bit values to 8-bit values) leads to loss of accuracy when the model is used for inference.

In some embodiments, low precision versions of a high precision model are trained using a novel training protocol. The goal of this training process is to enable the compressed model to mimic the original model faithfully. In this process, unlabeled data is first fed to the original model to determine its response. The responses thus obtained are used to train the compressed model, thereby allowing the compressed model to learn to approximate the original model. As unlabeled data is abundant, the compressed model can be trained until the approximations are very close to the responses of the original model.

Neural networks are typically trained with learnable parameters represented with single precision floating point numbers. Though it is desirable to have parameters represented with lower precision data types, training with lower precision parameters often results in a model that does not perform as well as a high precision model, in terms of accuracy. In some embodiments, an apparatus, system, or process makes it possible to transfer the knowledge contained in a high precision model to a lower precision model.

In some embodiments, transfer of knowledge is achieved using the following processes:

(1) Feed unlabeled examples to the original model and perform inference to obtain pseudo labels for each example, and generate a pseudo-labeled data set.

(2) Quantize the parameters to lower precision and retrain the model at lower precision using the pseudo-labeled dataset constructed in process (1).

The second process may be repeated to reduce the precision even further, leading to higher compression levels.

Figure 24:
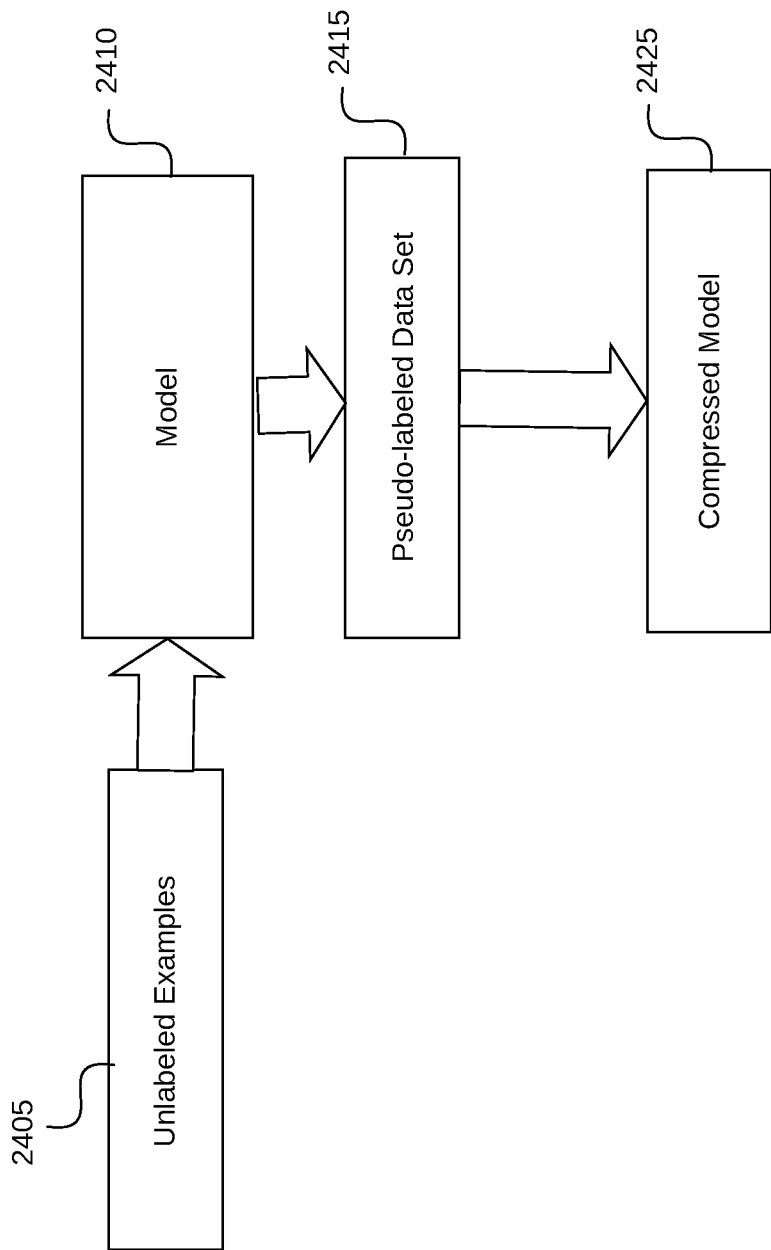
FIG. 24 is an illustration of application of compression models with the aid of randomized data and fake labels according to some embodiments.

FIG. 24 is an illustration of compressing models into reduced precision values by re-training with pseudo labels according to some embodiments. In some embodiments, unlabeled data examples 2405 are provided to an original model 2410, wherein inference is performed to obtain pseudo labels and generate a pseudo-labeled data set 2415. In some embodiments, the network model 2410 is then compressed as desired (either by reducing the number of layers or making layers less wide) to generate a compressed model 2425. Training the compressed model 2425 with the original training set is likely to produce a model that exhibits less accuracy than the original model. However, the pseudo-labeled data set 2415 may be utilized to recapture some of this loss in accuracy. In some embodiments, the compressed model 2425 is trained on the pseudo-labeled data set 2415. Training on the larger pseudo-labeled data set 2415 assists the compressed network in mirroring the original network more faithfully.

While the unlabeled examples must be of the same type that the original model was trained with (e.g. images or audio), these need not have the same labels. For example, to transfer knowledge from an image classifier, any image dataset could be labeled and used. It is also possible to construct a new dataset from the original training set simply by distorting the images. This is different from the typical augmentation technique used in neural network training because the distortions do not have to be constrained to keep the labels intact. This allows the samples to vary widely. Even introducing a large amount of noise is acceptable as a distortion method. If the degree of distortion is so great that the sample is no longer recognizable and could be mistaken for another class, the pseudo-labeling process will assign it a new label. This new label will be used in the re-training during transfer of knowledge.

In some embodiments, instead of using just the pseudo-labels for training the compressed model, it is possible to train the compressed model to reproduce the entire output layer activations of the original network. In this case, the unlabeled examples are passed through the original network to collect its eventual outputs (for example, in the case of a classifier, this could be the probability values of each class) as a vector of values. The transfer process would involve teaching the compressed model to produce the same vector of values at its output layer. This constraint can be made more strict by encouraging equality at multiple layers instead of just the output layer.

In some embodiments, a same technique may be used to transfer knowledge to a smaller model that uses the same data type as that of the original model. In this case, the compressed model may have fewer number of layers or fewer units in each layer, leading to fewer number of parameters.

In some embodiments, a validation set can be used to check the accuracy of the model after knowledge transfer. This is especially useful to find out the maximum amount of compression a model will tolerate while maintaining acceptable accuracy.

Figure 25:
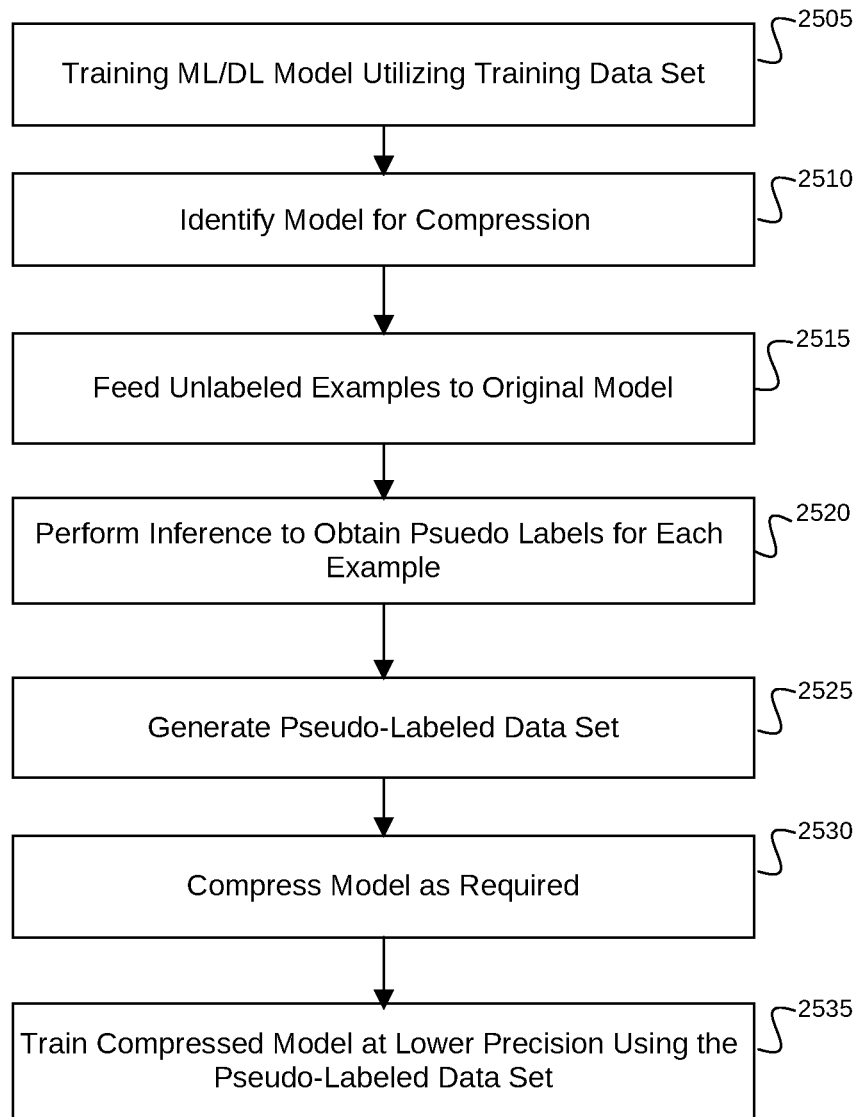
FIG. 25 is a flowchart to illustrate a process for improving operation of a reduced network according to some embodiments.

FIG. 25 is a flowchart to illustrate a process for improving operation of a reduced network according to some embodiments. In some embodiments, a process includes:

2505: Train an original machine learning/deep learning model using an original training data set.

2510: Identify the model for compression, which may be done to reduce required resources for the model, such as memory and compute resources. The compression of the model may include reducing precision.

2515: Feed unlabeled data examples to the original model.

2520: Perform inference with the original model using the unlabeled data examples to obtain pseudo labels for each example.

2525: Generate pseudo-labeled data set with the data examples and generated pseudo labels.

2530: Compress the original model as required to generate a compressed model, such as by reducing the number of layers or making layers less wide in the original model.

2535: Train the compressed model at the lower precision using the pseudo-labeled data set, thereby providing knowledge transfer to the compressed model. In some embodiments, the training may be evaluated using a validation set to check the accuracy of the compressed model after knowledge transfer. In some embodiments, the model may be further compressed 2530 and trained 2535.

Policy-Based System Interface for Real-Time Autonomous System

In some embodiments, an apparatus, system, process provides a policy based system interface and definitions to handle resource constraints and unexpected fault condition environments for autonomous systems utilizing machine learning or deep learning. In some embodiments, a policy based system interface operates to assist the autonomous system to drive or otherwise continue operating instead of proceeding to total shutdown by adopting safety, security, and important services policy management and handling situations as appropriate. In some embodiments, a policy based system interface is to handle scenarios related to bandwidth availability and detour cases, such as assisting unit for guidance navigation etc., based on a well-defined container model.

Current system implementations are programmed and static logic driven. Providing a policy based system resource scheduling and allocation is a key challenge for autonomous system operation. In the operation of a real-time autonomous system, including, but not limited to, an autonomous (self-driving) vehicle, the autonomous system is connected with a server for multiple services, such as navigation, content streaming, and trained data inputs. However, accesses to networks for data may be interrupted periodically because of unreliable network conditions and unforeseen changes. In a particular example of an autonomous vehicle, the autonomous vehicle may follow a detour that could not be foreseen and may result in significant changes in network data availability such as such as fluctuating bandwidth. Conditions along a known route may result in resource constraints and connectivity that may be addressable, but an unexpected detour can in particular result in significant and unexpected changes. However, the autonomous system is required to continue operating, such as in the case of an autonomous vehicle that is required to continue navigating and driving as the network conditions change.

With an unreliable network, there may be deterioration in the bandwidth and possible losses of connection, resulting in a question of how to address the network issues while continuing system operation.

In some embodiments, an apparatus, system, or process provides a policy-based system interface for a real-time autonomous system to enable continued operation in changing conditions, and avoiding shut down of the most important functions of the autonomous system. In some embodiments, the policy based system interface allows smooth system operation during unexpected slow response in server, low network bandwidth, sudden detours, reaching out new re-routing techniques, and other similar conditions.

In some embodiments, a policy based system interface provides for the following tasks on a real-time basis:

(1) Prioritizing work based on bandwidth and compute constraints.

(2) Applying compression based on the bandwidth and compute constraints.

For example, a system may utilize lower quality/more lossy compression in a faster rate, such as in a burst of data, if this works in a constrained environment to take advantage of the communication capabilities.

(3) Scaling of the hardware for the autonomous system on a real-time basis.

In some embodiments, the overarching issue regards a network that is not reliable, and thus how to back up operation. The network is providing training data, and the system should intelligently handle bad situations that are not fully foreseeable.

Figure 26:
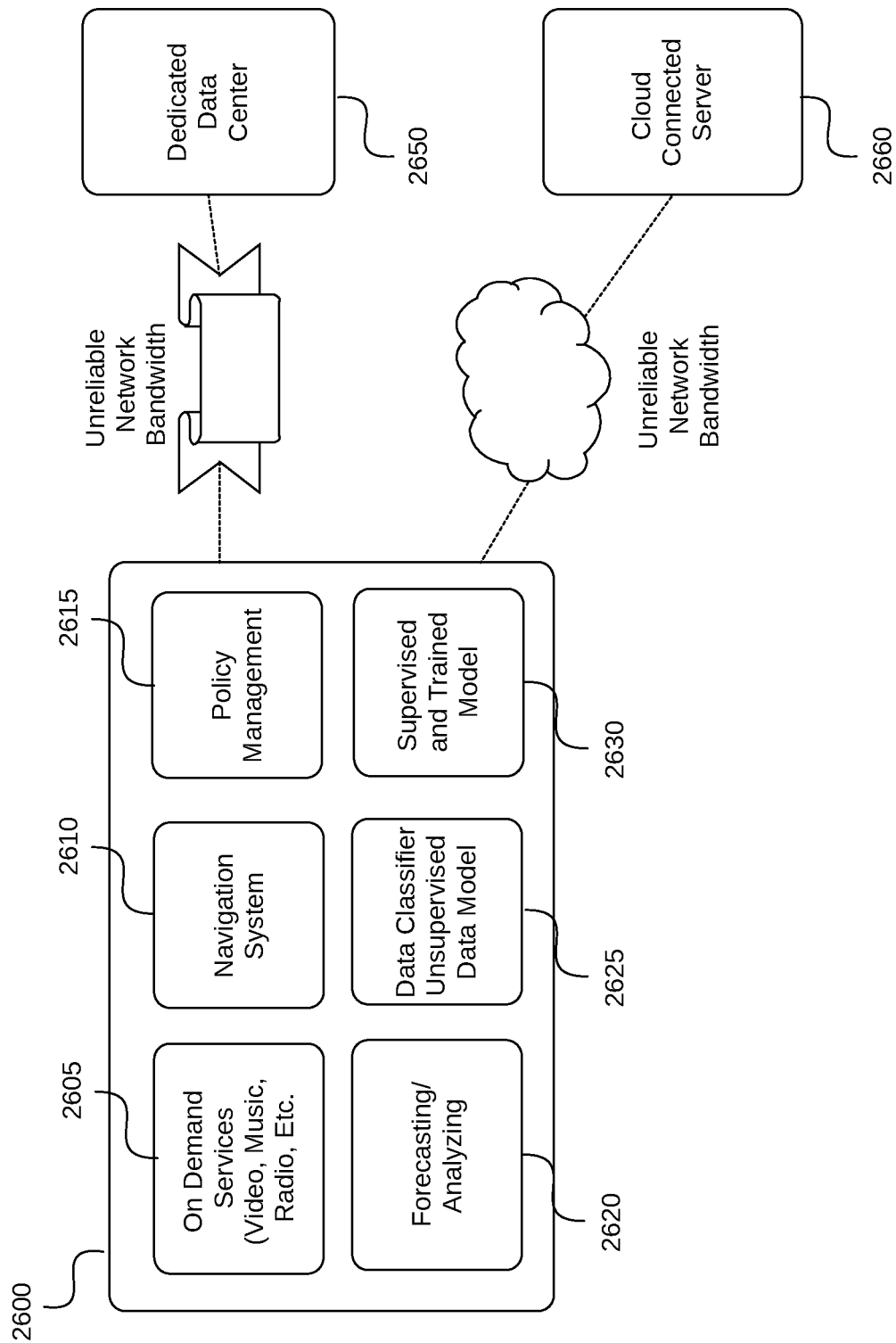
FIG. 26 is an illustration of an autonomous system providing policy management for addressing unreliable network conditions according to some embodiments.

FIG. 26 is an illustration of an autonomous system providing policy management for addressing unreliable network conditions according to some embodiments. In some embodiments, an autonomous system 2600, including, but not limited to, an autonomous vehicle, is connected to one or more networks, such as a dedicated data center 2650 and a cloud connected server 2660, wherein the network connections have unreliable network bandwidth because of issues including changes in locations and environmental conditions.

In some embodiments, the autonomous system 2600 may include on demand services 2605 such as video, music, radio, and other services (such as services of an In-Vehicle Infotainment (IVI) system, wherein such services are generally not essential to vehicle operation. As illustrated, the autonomous system 2600 further includes a navigation system 2610 (which is required for operation), policy management 2615, forecasting and analyzing 2620 (including forecasting network conditions and analyzing current network bandwidth), a data classifier for a supervised data model 2625, and a supervised and trained model 2630. In some embodiments, a training set may include, but is not limited to, data that is specifically directed to Graphics, such as mapping or placing other item on a screen. In some embodiments, Graphics data may include 3D processing and GPGPU compute.

As illustrated in FIG. 26, there are unreliable network connections to backend data in the dedicated data center 2650 and to the cloud connected server 2660 along the route of the autonomous system. In some embodiments, the automated system 2600 includes GPU compute operation, including the use of the GPU for parallel operation in analysis, and the need to transfer the training set via the unreliable network bandwidth.

An autonomous system requires the supervised training data and model to train the system to make decision making. It is important to have dedicated connectivity and resource access. However, outside system reliability cannot be guaranteed due to various reasons, including sudden system failures. Autonomous systems like self-driving car cannot afford system or data delay.

In some embodiments, the autonomous system 2600 includes a policy-based system to provide the best overall user experience. With the cloud to autonomous system connection, the autonomous system 2600 has machine learning capability to perform real-time analysis for navigation, LIDAR (Light Detection and Ranging), and other functions. However, there are bandwidth constraints related to the cloud connection, with limited bandwidth in unreliable network, potential for loss of data, large amounts of training data to be received, and data transfers in both directions. In particular, there is visual/graphics data to address, with transfer to the cloud being limited.

In general, the cases to be addressed are:

(1) Limited bandwidth in the network connections, but with good compute capability.

(2) Limited bandwidth together with compute constraints because of multiple compute requirements.

In some embodiments, the GPU hardware of the autonomous vehicle is to identify which items are requested or needed in operation of the autonomous system 2600, and to determine which are the critical items that need to be transferred within the constraints. In some embodiments, the autonomous system 2600 and the server 2650/2660 are to utilize smart compression, which may be in both directions between the client and server, based on an understanding of the requested tasks and the existing constraints.

In some embodiments, the operation of the autonomous system 2600 may further include a crowd-sourced capability utilizing the cloud-connected server 2660. In a particular implementation, the autonomous system 2600 may be an autonomous vehicle including a crowd sourced capability across many ADAS (Advanced Driver Assistance Systems) systems with one or more cloud servers that can assist with analytics on the cloud, thus providing assistance for efficient compression decisions and enabling future improvements in system operations in limited bandwidth and compute conditions.

In some embodiments, policy management for a real-time autonomous system includes:

(1) Policy decisions based at least in part on network bandwidth, which may include use of a communication channel for important data.

(2) Preparing a service order list and usage model for the autonomous system.

(3) Supervised and unsupervised data model and training set availability.

(4) Performing compression model and bandwidth requirement estimation when there is new data set availability.

(5) Categorizing the container of the data set, compressing the data model, and estimating the bandwidth requirement.

(6) Generating service and model set based on availability and server network access.

(7) Applying a local data resource when unexpected scenarios such as detours and low bandwidth data (wherein the local data resource may include navigation and route prediction, cloud based information prior model retrieval, support for live real time analysis support, etc.)

(8) Apply security and data bandwidth efficiency with quality of service (QoS) and quality of experience (QoE) in mind.

Figure 27:
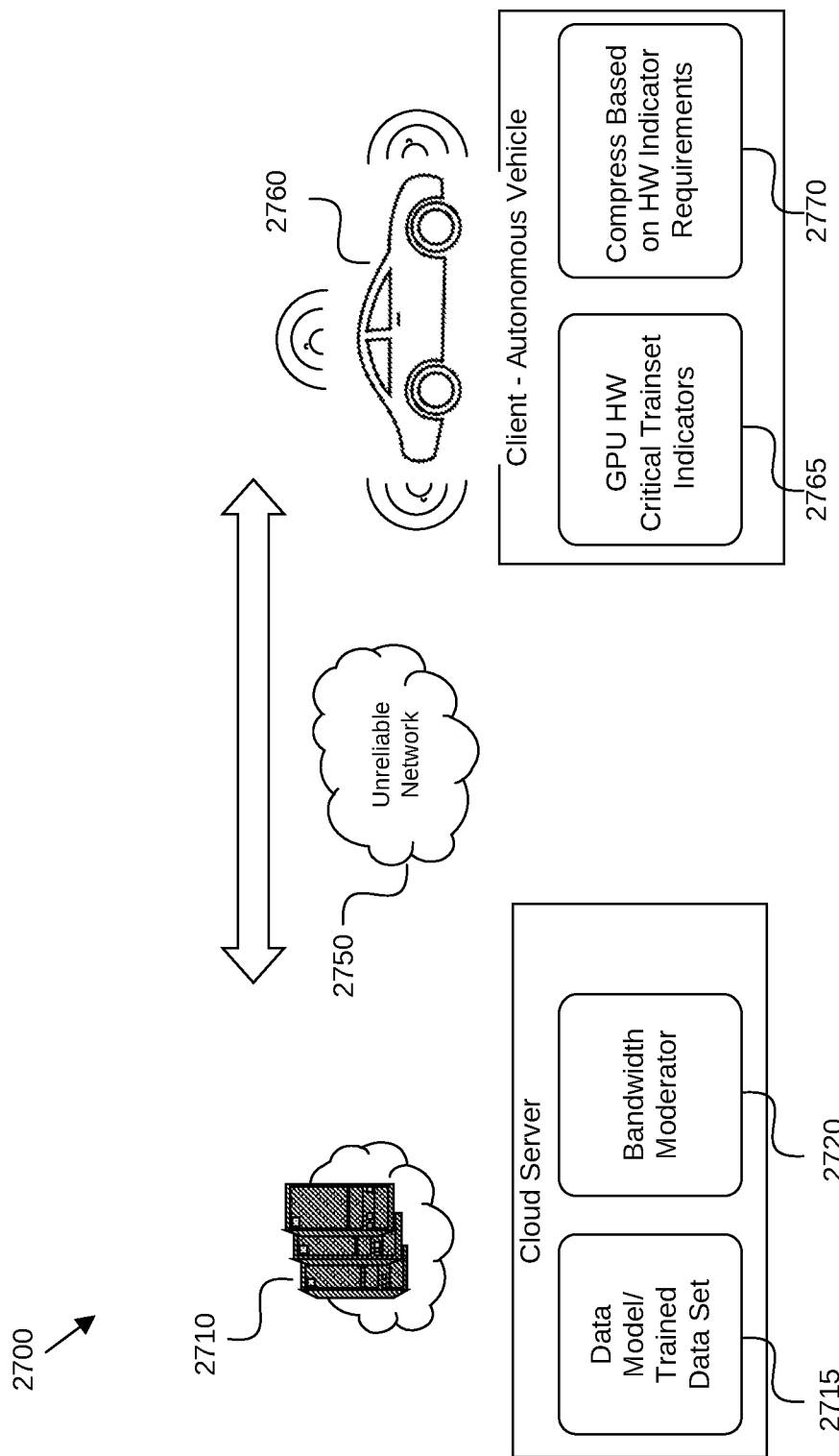
FIG. 27 is an illustration of policy-based system interface techniques for real-time autonomous systems according to some embodiments.

FIG. 27 is an illustration of policy-based system interface techniques for real-time autonomous systems according to some embodiments. In some embodiments, a system 2700 includes a client such as an autonomous vehicle 2760 in communication with a cloud server 2710 over an unreliable network 2750. As illustrated in FIG. 27, the cloud server 2710 includes a data model and trained data set 2715, and a bandwidth moderator 2720 to control the relative usage of the network bandwidth. The cloud capability may result in throttling what tasks can be performed. In some embodiments, the client 2760 includes GPU hardware critical trainset indicators 2765, and compression based on the hardware indicator requirements.

In some embodiments, efficient compression is provided in network operations for an autonomous system based on the constraints in bandwidth and/or compute capability. In some embodiments, the operation may include a reward based algorithm providing more weight to a correct solution, moving in this direction in operation.

In some embodiments, compression is applied in container-based operation of the autonomous vehicle or other client 2760. In machine learning, there may be multiple containers with multiple applications in each container (for example color, GPUPU, other). Each container is used in the cloud as a work element run in isolation from the other containers.

In some embodiments, the containers are based on the client's needs, with each set of operations running in different containers separately from each other. For a system such as an autonomous vehicle 2760, the containers may be safety, vehicle operation, user data, and others. In some embodiments, with limitations in bandwidth and/or compute capability, the system may modify the type of compression for the containers based on policies for the system. In some embodiments, the containers for an autonomous system may be dynamically spawned and scaled up or down as needed. Containers can be separate trusted environments.

In some embodiments, a proposed algorithm may consider feedback control based on the GPU or utilize machine learning hardware indicators to determine the data compression under various resource availability (such as network bandwidth) at different segmentation levels. The feedback indicators from hardware may include whether the training set requires any input training set at the hardware level. Typical machine learning hardware can compress at various graphics levels, such as 3D buffer level, color component level, etc. The data compression may be determined based on network and reliable network cases.

Figure 28:
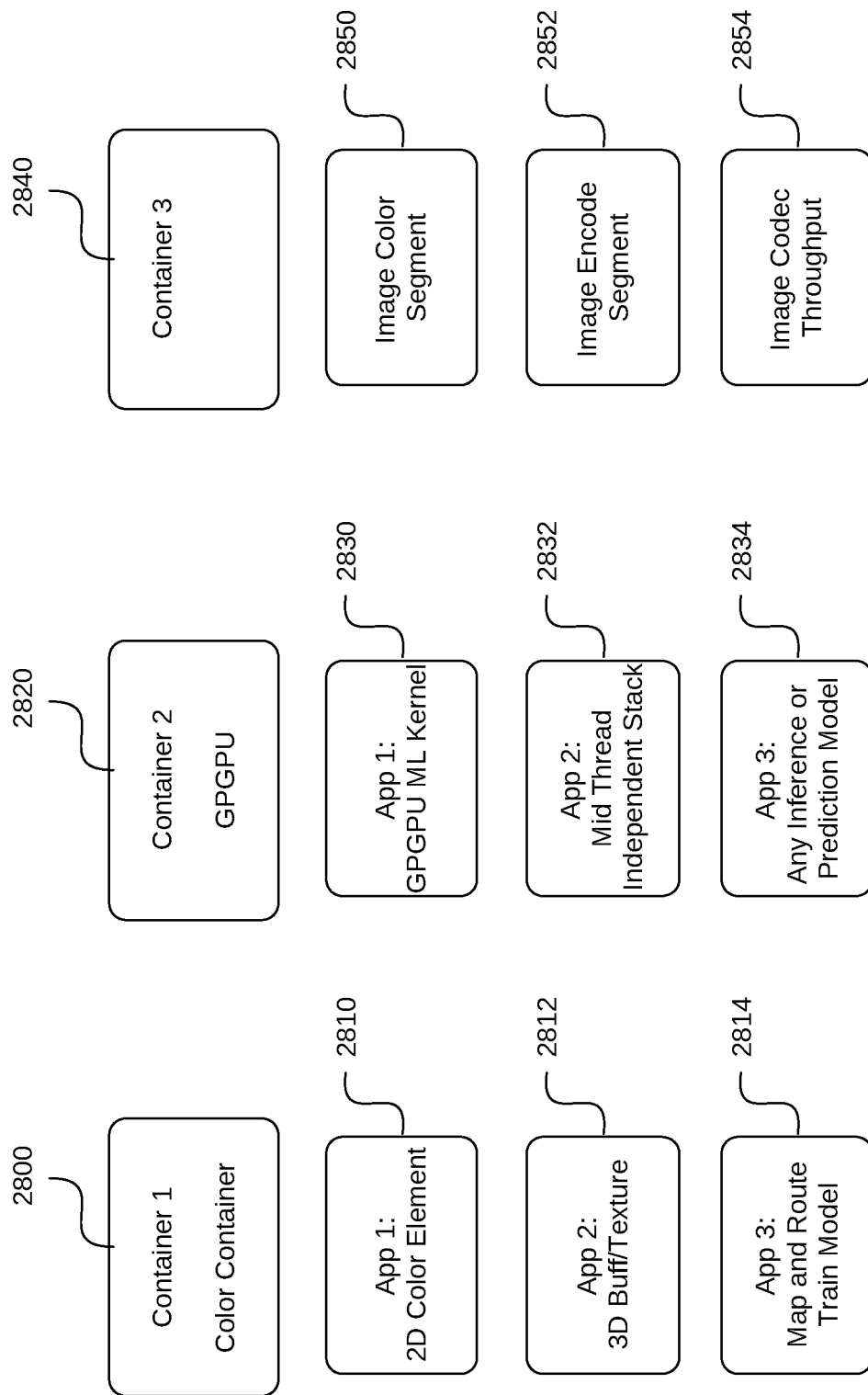
FIG. 28 is an illustration of containers for a policy-based system interface for real-time autonomous system according to some embodiments.

FIG. 28 is an illustration of containers for a policy-based system interface for real-time autonomous system according to some embodiments. Container based compression is a technique to utilize the hardware level feature set or requirements to be put as a model where it can fit and then compress them in single to-level container to cover various use cases. As illustrated in FIG. 28, containers in a particular system may include the following:

Container 1 Color container 2800 including first application 2D color element 2810; second application 3D buffer/texture 2812; and third application map and route train model 2814.

Container 2 GPGPU 2820 including first application GPGPU machine learning kernel 2830; second application mid thread independent stack 2832; and third application any inference or prediction model 2834.

Container 3 2840 including image color segment 2850; image encode segment 2852; and image codec throughput 2854.

In some embodiments, container based compression technique is applied using the control feedback from hardware based on its mandatory input requirement for training set, and recovering pointers. Color component hardware requirements for a training set can be put together into any other color component involved in the use case such as streaming video element or map or stream photo. Putting them as single container and use those to compress at server and decompress at client based on scenarios and usability.

The top level container set brings multiple combinations or similar sets of hardware specific data in certain unreliable resource scenarios and avoid any disconnection between the servers and client in those scenarios. In some embodiments, any of the container elements are based on machine learning hardware (GPGPU) and specialized ASIC (Application-Specific Integrated Circuit).

Figure 29:
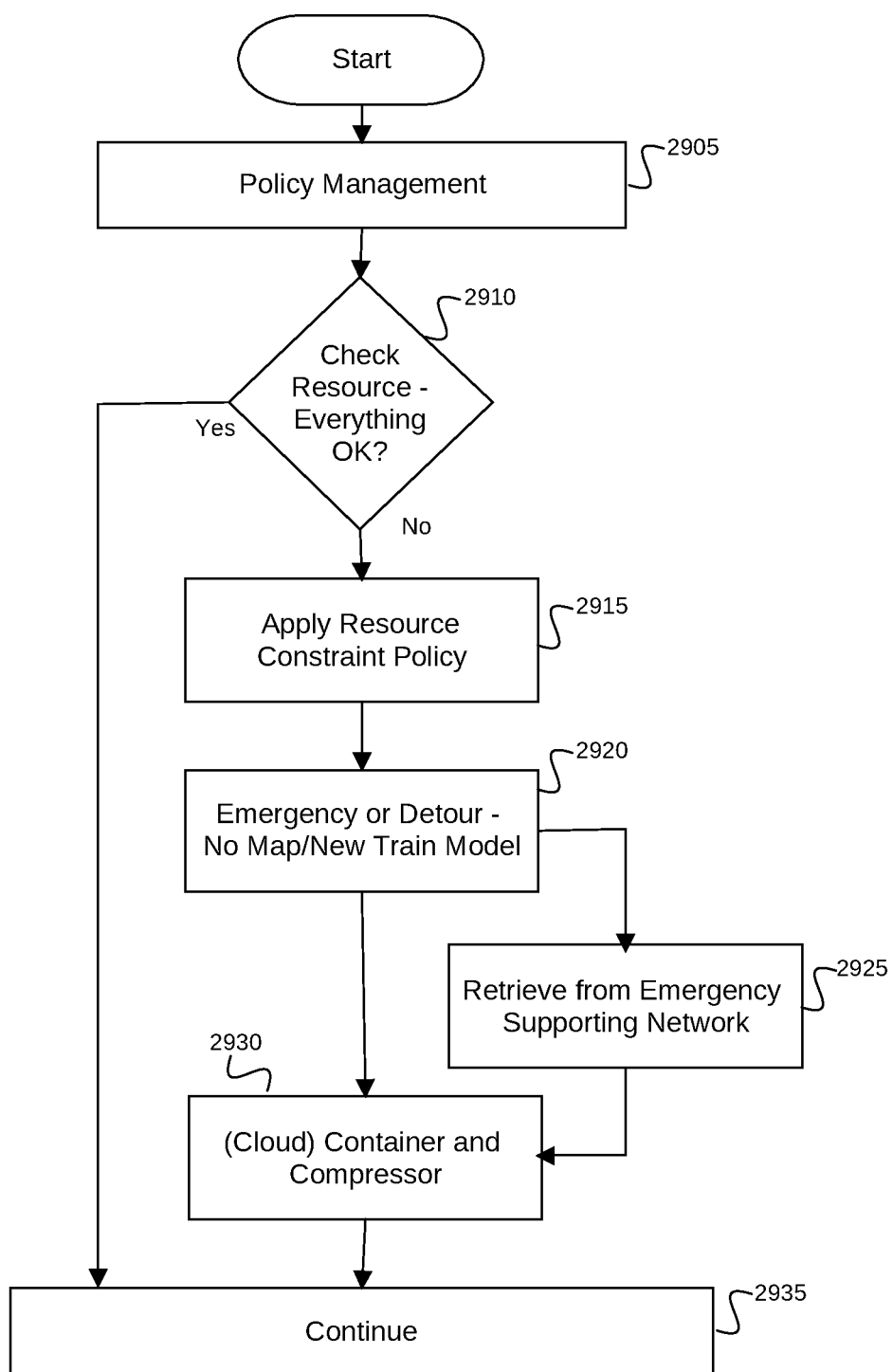
FIG. 29 is a flowchart to illustrate a process for a policy-based system interface according to some embodiments.

FIG. 29 is a flowchart to illustrate a process for a policy-based system interface according to some embodiments. In some embodiments, a process includes:

2905: Perform policy management in an autonomous system. The autonomous system may include but is not limited to an autonomous vehicle. The policy management may include processing with one or more GPUs.

2910: Check each resource of the autonomous system and determine if everything is acceptable for the resource. The resources of the autonomous system depend on the nature of the system, wherein an autonomous vehicle may include resources such as navigation, safety, and entertainment services. Each resource may involve or include usage of an unreliable network connection, which may result in reduced bandwidth and/or connection issues. If resource operations are acceptable, the process continues with normal operations 2935.

2915: If resource operations are not acceptable, the autonomous system may apply a resource constraint policy to reduce the unnecessary usage of any resource. For example, applying a resource constraint policy may include reducing lower priority resource operations (such as entertainment) to maintain network bandwidth or compute capability for higher priority resources (such as safety and navigation).

2920: Identify any emergency or detour, wherein there is no map or new train model. For example, an autonomous vehicle may be required to follow an unexpected detour path for which there is no current data.

2925: If applicable, the process may include retrieving data from an emergency supporting network.

2930: Utilize container (such as container for cloud network) and compressor to apply compression based on the bandwidth and compute constraints for the system. In a first example, a container for lower priority applications may be subjected to more compression to reduce data traffic. In a second example, to address bandwidth limitations that may, for example, allow bursts of data in when there is network availability, a lossy compression of safety data may be applied to enable the transfer of data bursts when there is sufficient bandwidth for transmission or reception of data.

In some embodiments, an autonomous system may further include the following elements to assist in addressing limitations in resources:

- Dynamically scaling of hardware to address the needs and constraints in a system. The dynamic scaling of hardware may include the GPU to scale execution units that are directed to certain data processing, an FPGA (Field Programmable Gate Array) or other reprogrammable unit to dynamically scale the hardware as required for needed processing, or other hardware scaling.
- Dynamically scaling the number of containers (such as the containers illustrated in FIG. 28) up or down as required to provide more effective operation. For example, in certain operations one or more additional containers may be created to allow transfer of applications, such as applications for essential resources, and thus to allow modification in the compression applied in each container to address the current resource limitations.
- User prioritization and right scaling on both the server side and the client side, such as in utilizing burst communication as available if, for example, network bandwidth is only available for limited time periods during which bursts of data may be transmitted or received. In some embodiments, handshake communication between client and server may be utilized to determine the specific communications to be provided, such as what bandwidth will available to each client.
- Vary server operation between different clients, with multiple sessions depending on each client's constraints.
- With minimal bandwidth and compute, generate crowd source solution using reward based weighting. The crowd sourcing may include, for example, the operation of multiple autonomous vehicles in limited network bandwidth conditions.
- Apply auditing to chosen solutions. Certain functional elements, such as safety for an autonomous vehicle, may be auditable. Compression is lossy generally, but with functional safety requirements, making the data auditable and public (such as using blockchain or other secure record technology) to allow audit trails collected in the autonomous vehicle and in the cloud to then analyze and use to improve operation. Accuracy is important in operations such as safety, and lossy compression can result in accuracy loss. For this reason, maintaining records for auditing may allow further avoidance of issues that arise because of certain responses to limited resources.
- Provide hints regarding data to affect compression operation, and thus compress efficiently based on prioritization. In an example, a system may identify a particular region of interest in a screen display for an autonomous system (such as a portion of the screen display that contains a safety element) and provide optimization based on this region of interest. For example, a large 4K screen display may be provided in an autonomous vehicle, but only certain portions of the screen display are highly important for issues such as safety. In some embodiments, the system may compress the rest of the screen (directed to less important information) based on the provided hint regarding regions of interest.

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple thread (SIMT) architectures are designed to maximize the amount of parallel processing in the graphics pipeline. In an SIMT architecture, groups of parallel threads attempt to execute program instructions synchronously together as often as possible to increase processing efficiency. A general overview of software and hardware for SIMT architectures can be found in Shane Cook, CUDA Programming Chapter 3, pages 37-51 (2013).

In some embodiments, a graphics processing unit (GPU) is communicatively coupled to host/processor cores to accelerate graphics operations, machine-learning operations, pattern analysis operations, and various general-purpose GPU (GPGPU) functions. The GPU may be communicatively coupled to the host processor/cores over a bus or another interconnect (e.g., a high-speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 30:
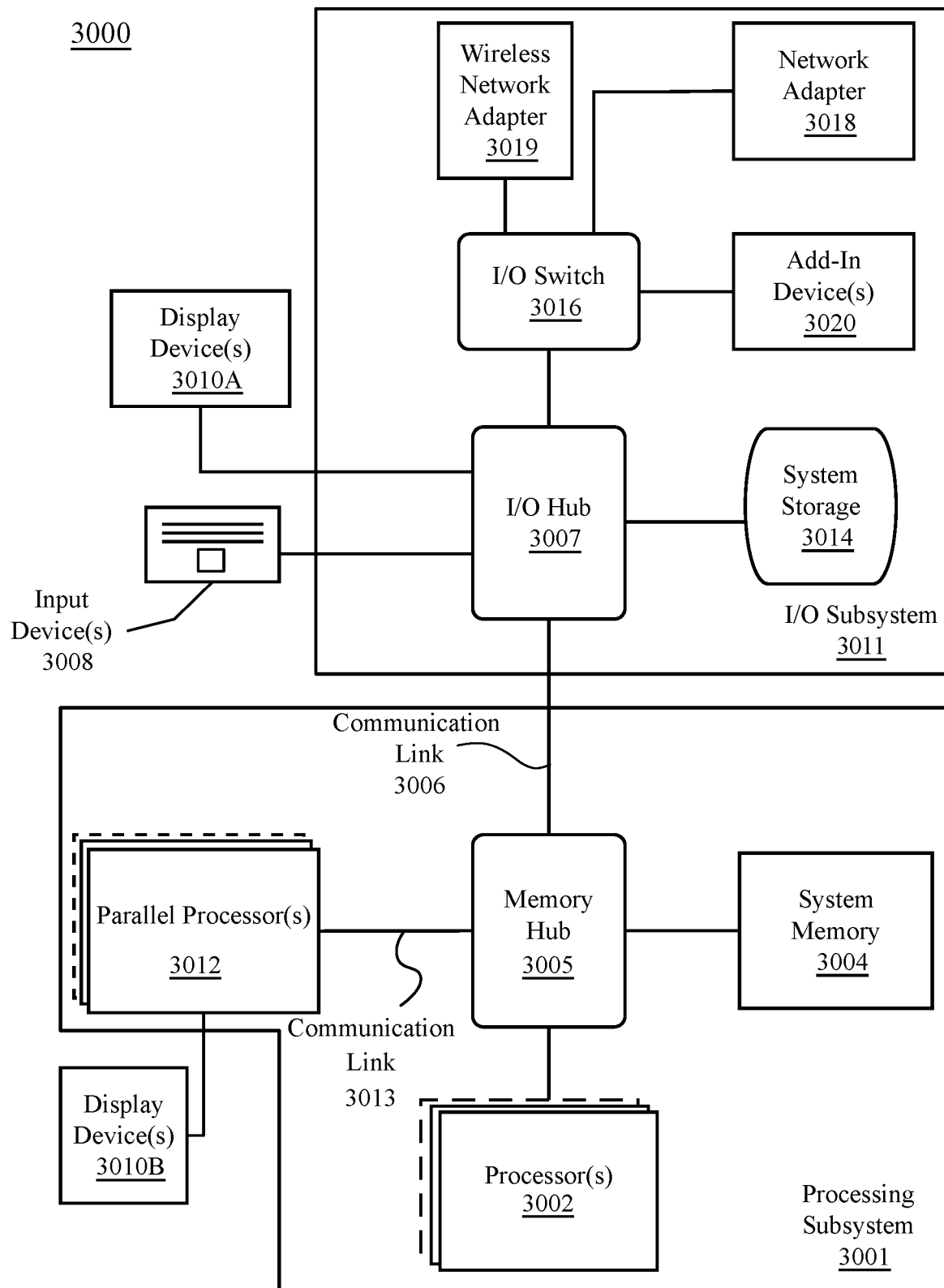
FIG. 30 is a block diagram illustrating a computer system configured to implement one or more aspects of the embodiments described herein.

FIG. 30 is a block diagram illustrating a computing system 3000 configured to implement one or more aspects of the embodiments described herein. The computing system 3000 includes a processing subsystem 3001 having one or more processor(s) 3002 and a system memory 3004 communicating via an interconnection path that may include a memory hub 3005. The memory hub 3005 may be a separate component within a chipset component or may be integrated within the one or more processor(s) 3002. The memory hub 3005 couples with an I/O subsystem 3011 via a communication link 3006. The I/O subsystem 3011 includes an I/O hub 3007 that can enable the computing system 3000 to receive input from one or more input device(s) 3008. Additionally, the I/O hub 3007 can enable a display controller, which may be included in the one or more processor(s) 3002, to provide outputs to one or more display device(s) 3010A. In one embodiment the one or more display device(s) 3010A coupled with the I/O hub 3007 can include a local, internal, or embedded display device.

In one embodiment the processing subsystem 3001 includes one or more parallel processor(s) 3012 coupled to memory hub 3005 via a bus or other communication link 3013. The communication link 3013 may be one of any number of standards based communication link technologies or protocols, such as, but not limited to PCI Express, or may be a vendor specific communications interface or communications fabric. In one embodiment the one or more parallel processor(s) 3012 form a computationally focused parallel or vector processing system that an include a large number of processing cores and/or processing clusters, such as a many integrated core (MIC) processor. In one embodiment the one or more parallel processor(s) 3012 form a graphics processing subsystem that can output pixels to one of the one or more display device(s) 3010A coupled via the I/O Hub 3007. The one or more parallel processor(s) 3012 can also include a display controller and display interface (not shown) to enable a direct connection to one or more display device(s) 3010B.

Within the I/O subsystem 3011, a system storage unit 3014 can connect to the I/O hub 3007 to provide a storage mechanism for the computing system 3000. An I/O switch 3016 can be used to provide an interface mechanism to enable connections between the I/O hub 3007 and other components, such as a network adapter 3018 and/or wireless network adapter 3019 that may be integrated into the platform, and various other devices that can be added via one or more add-in device(s) 3020. The network adapter 3018 can be an Ethernet adapter or another wired network adapter. The wireless network adapter 3019 can include one or more of a Wi-Fi, Bluetooth, near field communication (NFC), or other network device that includes one or more wireless radios.

The computing system 3000 can include other components not explicitly shown, including USB or other port connections, optical storage drives, video capture devices, and the like, may also be connected to the I/O hub 3007. Communication paths interconnecting the various components in FIG. 30 may be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 3012 incorporate circuitry optimized for graphics and video processing, including, for example, video output circuitry, and constitutes a graphics processing unit (GPU). In another embodiment, the one or more parallel processor(s) 3012 incorporate circuitry optimized for general purpose processing, while preserving the underlying computational architecture, described in greater detail herein. In yet another embodiment, components of the computing system 3000 may be integrated with one or more other system elements on a single integrated circuit. For example, the one or more parallel processor(s), 3012 memory hub 3005, processor(s) 3002, and I/O hub 3007 can be integrated into a system on chip (SoC) integrated circuit. Alternatively, the components of the computing system 3000 can be integrated into a single package to form a system in package (SIP) configuration. In one embodiment at least a portion of the components of the computing system 3000 can be integrated into a multi-chip module (MCM), which can be interconnected with other multi-chip modules into a modular computing system.

It will be appreciated that the computing system 3000 shown herein is illustrative and that variations and modifications are possible. The connection topology, including the number and arrangement of bridges, the number of processor(s) 3002, and the number of parallel processor(s) 3012, may be modified as desired. For instance, in some embodiments, system memory 3004 is connected to the processor(s) 3002 directly rather than through a bridge, while other devices communicate with system memory 3004 via the memory hub 3005 and the processor(s) 3002. In other alternative topologies, the parallel processor(s) 3012 are connected to the I/O hub 3007 or directly to one of the one or more processor(s) 3002, rather than to the memory hub 3005. In other embodiments, the I/O hub 3007 and memory hub 3005 may be integrated into a single chip. Some embodiments may include two or more sets of processor(s) 3002 attached via multiple sockets, which can couple with two or more instances of the parallel processor(s) 3012.

Some of the particular components shown herein are optional and may not be included in all implementations of the computing system 3000. For example, any number of add-in cards or peripherals may be supported, or some components may be eliminated. Furthermore, some architectures may use different terminology for components similar to those illustrated in FIG. 30. For example, the memory hub 3005 may be referred to as a Northbridge in some architectures, while the I/O hub 3007 may be referred to as a Southbridge.

Figure 31A:
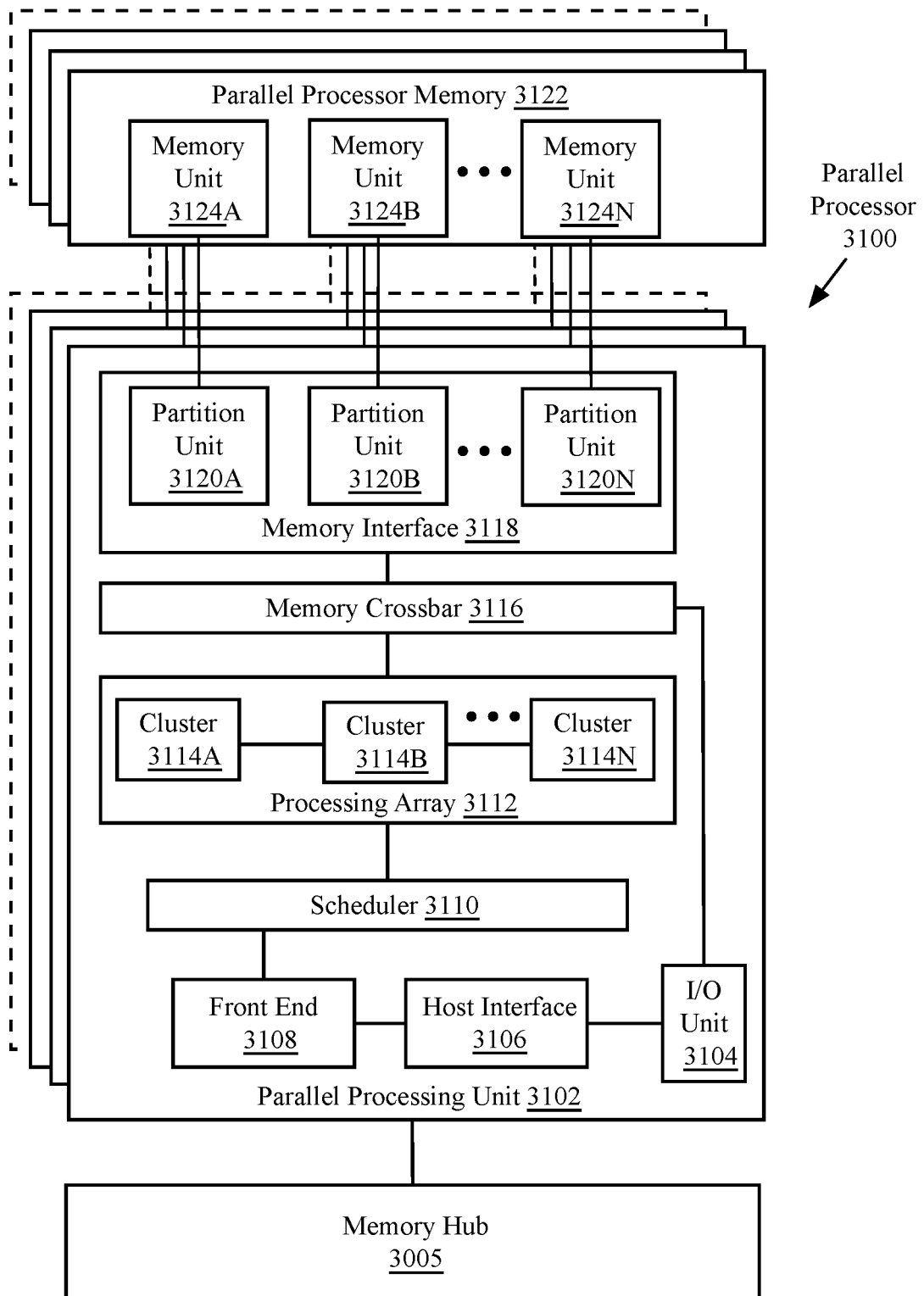
FIGS. 31A-31D illustrate parallel processor components, according to an embodiment.

FIG. 31A illustrates a parallel processor 3100, according to an embodiment. The various components of the parallel processor 3100 may be implemented using one or more integrated circuit devices, such as programmable processors, application specific integrated circuits (ASICs), or field programmable gate arrays (FPGA). The illustrated parallel processor 3100 is a variant of the one or more parallel processor(s) 3012 shown in FIG. 30, according to an embodiment.

In one embodiment the parallel processor 3100 includes a parallel processing unit 3102. The parallel processing unit includes an I/O unit 3104 that enables communication with other devices, including other instances of the parallel processing unit 3102. The I/O unit 3104 may be directly connected to other devices. In one embodiment the I/O unit 3104 connects with other devices via the use of a hub or switch interface, such as memory hub 3005. The connections between the memory hub 3005 and the I/O unit 3104 form a communication link 3013. Within the parallel processing unit 3102, the I/O unit 3104 connects with a host interface 3106 and a memory crossbar 3116, where the host interface 3106 receives commands directed to performing processing operations and the memory crossbar 3116 receives commands directed to performing memory operations.

When the host interface 3106 receives a command buffer via the I/O unit 3104, the host interface 3106 can direct work operations to perform those commands to a front end 3108. In one embodiment the front end 3108 couples with a scheduler 3110, which is configured to distribute commands or other work items to a processing cluster array 3112. In one embodiment the scheduler 3110 ensures that the processing cluster array 3112 is properly configured and in a valid state before tasks are distributed to the processing clusters of the processing cluster array 3112. In one embodiment the scheduler 3110 is implemented via firmware logic executing on a microcontroller. The microcontroller implemented scheduler 3110 is configurable to perform complex scheduling and work distribution operations at coarse and fine granularity, enabling rapid preemption and context switching of threads executing on the processing array 3112. In one embodiment, the host software can prove workloads for scheduling on the processing array 3112 via one of multiple graphics processing doorbells. The workloads can then be automatically distributed across the processing array 3112 by the scheduler 3110 logic within the scheduler microcontroller.

The processing cluster array 3112 can include up to "N" processing clusters (e.g., cluster 3114A, cluster 3114B, through cluster 3114N). Each cluster 3114A-3114N of the processing cluster array 3112 can execute a large number of concurrent threads. The scheduler 3110 can allocate work to the clusters 3114A-3114N of the processing cluster array 3112 using various scheduling and/or work distribution algorithms, which may vary depending on the workload arising for each type of program or computation. The scheduling can be handled dynamically by the scheduler 3110, or can be assisted in part by compiler logic during compilation of program logic configured for execution by the processing cluster array 3112. In one embodiment, different clusters 3114A-3114N of the processing cluster array 3112 can be allocated for processing different types of programs or for performing different types of computations.

The processing cluster array 3112 can be configured to perform various types of parallel processing operations. In one embodiment the processing cluster array 3112 is configured to perform general-purpose parallel compute operations. For example, the processing cluster array 3112 can include logic to execute processing tasks including filtering of video and/or audio data, performing modeling operations, including physics operations, and performing data transformations.

In one embodiment the processing cluster array 3112 is configured to perform parallel graphics processing operations. In embodiments in which the parallel processor 3100 is configured to perform graphics processing operations, the processing cluster array 3112 can include additional logic to support the execution of such graphics processing operations, including, but not limited to texture sampling logic to perform texture operations, as well as tessellation logic and other vertex processing logic. Additionally, the processing cluster array 3112 can be configured to execute graphics processing related shader programs such as, but not limited to vertex shaders, tessellation shaders, geometry shaders, and pixel shaders. The parallel processing unit 3102 can transfer data from system memory via the I/O unit 3104 for processing. During processing the transferred data can be stored to on-chip memory (e.g., parallel processor memory 3122) during processing, then written back to system memory.

In one embodiment, when the parallel processing unit 3102 is used to perform graphics processing, the scheduler 3110 can be configured to divide the processing workload into approximately equal sized tasks, to better enable distribution of the graphics processing operations to multiple clusters 3114A-3114N of the processing cluster array 3112. In some embodiments, portions of the processing cluster array 3112 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 3114A-3114N may be stored in buffers to allow the intermediate data to be transmitted between clusters 3114A-3114N for further processing.

During operation, the processing cluster array 3112 can receive processing tasks to be executed via the scheduler 3110, which receives commands defining processing tasks from front end 3108. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 3110 may be configured to fetch the indices corresponding to the tasks or may receive the indices from the front end 3108. The front end 3108 can be configured to ensure the processing cluster array 3112 is configured to a valid state before the workload specified by incoming command buffers (e.g., batch-buffers, push buffers, etc.) is initiated.

Each of the one or more instances of the parallel processing unit 3102 can couple with parallel processor memory 3122. The parallel processor memory 3122 can be accessed via the memory crossbar 3116, which can receive memory requests from the processing cluster array 3112 as well as the I/O unit 3104. The memory crossbar 3116 can access the parallel processor memory 3122 via a memory interface 3118. The memory interface 3118 can include multiple partition units (e.g., partition unit 3120A, partition unit 3120B, through partition unit 3120N) that can each couple to a portion (e.g., memory unit) of parallel processor memory 3122. In one implementation, the number of partition units 3120A-3120N is configured to be equal to the number of memory units, such that a first partition unit 3120A has a corresponding first memory unit 3124A, a second partition unit 3120B has a corresponding memory unit 3124B, and an Nth partition unit 3120N has a corresponding Nth memory unit 3124N. In other embodiments, the number of partition units 3120A-3120N may not be equal to the number of memory devices.

In various embodiments, the memory units 3124A-3124N can include various types of memory devices, including dynamic random-access memory (DRAM) or graphics random access memory, such as synchronous graphics random access memory (SGRAM), including graphics double data rate (GDDR) memory. In one embodiment, the memory units 3124A-3124N may also include 3D stacked memory, including but not limited to high bandwidth memory (HBM). Persons skilled in the art will appreciate that the specific implementation of the memory units 3124A-3124N can vary, and can be selected from one of various conventional designs. Render targets, such as frame buffers or texture maps may be stored across the memory units 3124A-3124N, allowing partition units 3120A-3120N to write portions of each render target in parallel to efficiently use the available bandwidth of parallel processor memory 3122. In some embodiments, a local instance of the parallel processor memory 3122 may be excluded in favor of a unified memory design that utilizes system memory in conjunction with local cache memory.

In one embodiment, any one of the clusters 3114A-3114N of the processing cluster array 3112 can process data that will be written to any of the memory units 3124A-3124N within parallel processor memory 3122. The memory crossbar 3116 can be configured to transfer the output of each cluster 3114A-3114N to any partition unit 3120A-3120N or to another cluster 3114A-3114N, which can perform additional processing operations on the output. Each cluster 3114A-3114N can communicate with the memory interface 3118 through the memory crossbar 3116 to read from or write to various external memory devices. In one embodiment the memory crossbar 3116 has a connection to the memory interface 3118 to communicate with the I/O unit 3104, as well as a connection to a local instance of the parallel processor memory 3122, enabling the processing units within the different processing clusters 3114A-3114N to communicate with system memory or other memory that is not local to the parallel processing unit 3102. In one embodiment the memory crossbar 3116 can use virtual channels to separate traffic streams between the clusters 3114A-3114N and the partition units 3120A-3120N.

While a single instance of the parallel processing unit 3102 is illustrated within the parallel processor 3100, any number of instances of the parallel processing unit 3102 can be included. For example, multiple instances of the parallel processing unit 3102 can be provided on a single add-in card, or multiple add-in cards can be interconnected. The different instances of the parallel processing unit 3102 can be configured to inter-operate even if the different instances have different numbers of processing cores, different amounts of local parallel processor memory, and/or other configuration differences. For example, in one embodiment some instances of the parallel processing unit 3102 can include higher precision floating point units relative to other instances. Systems incorporating one or more instances of the parallel processing unit 3102 or the parallel processor 3100 can be implemented in a variety of configurations and form factors, including but not limited to desktop, laptop, or handheld personal computers, servers, workstations, game consoles, and/or embedded systems.

Figure 31B:
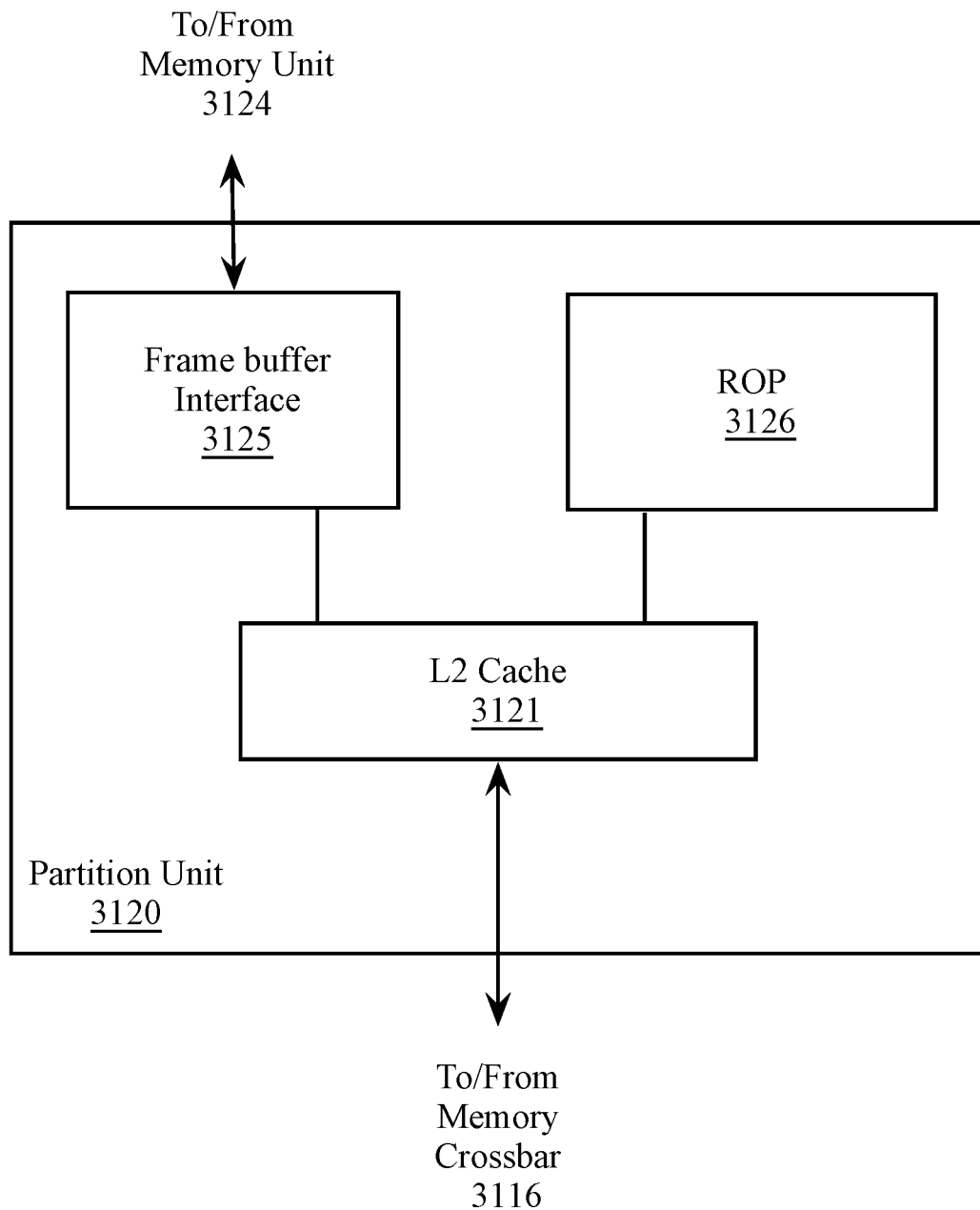

FIG. 31B is a block diagram of a partition unit 3120, according to an embodiment. In one embodiment the partition unit 3120 is an instance of one of the partition units 3120A-3120N of FIG. 31A. As illustrated, the partition unit 3120 includes an L2 cache 3121, a frame buffer interface 3125, and a ROP 3126 (raster operations unit). The L2 cache 3121 is a read/write cache that is configured to perform load and store operations received from the memory crossbar 3116 and ROP 3126. Read misses and urgent write-back requests are output by L2 cache 3121 to frame buffer interface 3125 for processing. Updates can also be sent to the frame buffer via the frame buffer interface 3125 for processing. In one embodiment the frame buffer interface 3125 interfaces with one of the memory units in parallel processor memory, such as the memory units 3124A-3124N of FIG. 31 (e.g., within parallel processor memory 3122).

In graphics applications, the ROP 3126 is a processing unit that performs raster operations such as stencil, z test, blending, and the like. The ROP 3126 then outputs processed graphics data that is stored in graphics memory. In some embodiments the ROP 3126 includes compression logic to compress depth or color data that is written to memory and decompress depth or color data that is read from memory. The compression logic can be lossless compression logic that makes use of one or more of multiple compression algorithms. The type of compression that is performed by the ROP 3126 can vary based on the statistical characteristics of the data to be compressed. For example, in one embodiment, delta color compression is performed on depth and color data on a per-tile basis.

In some embodiments, the ROP 3126 is included within each processing cluster (e.g., cluster 3114A-3114N of FIG. 31) instead of within the partition unit 3120. In such embodiment, read and write requests for pixel data are transmitted over the memory crossbar 3116 instead of pixel fragment data. The processed graphics data may be displayed on a display device, such as one of the one or more display device(s) 3010 of FIG. 30, routed for further processing by the processor(s) 3002, or routed for further processing by one of the processing entities within the parallel processor 3100 of FIG. 31A.

Figure 31C:
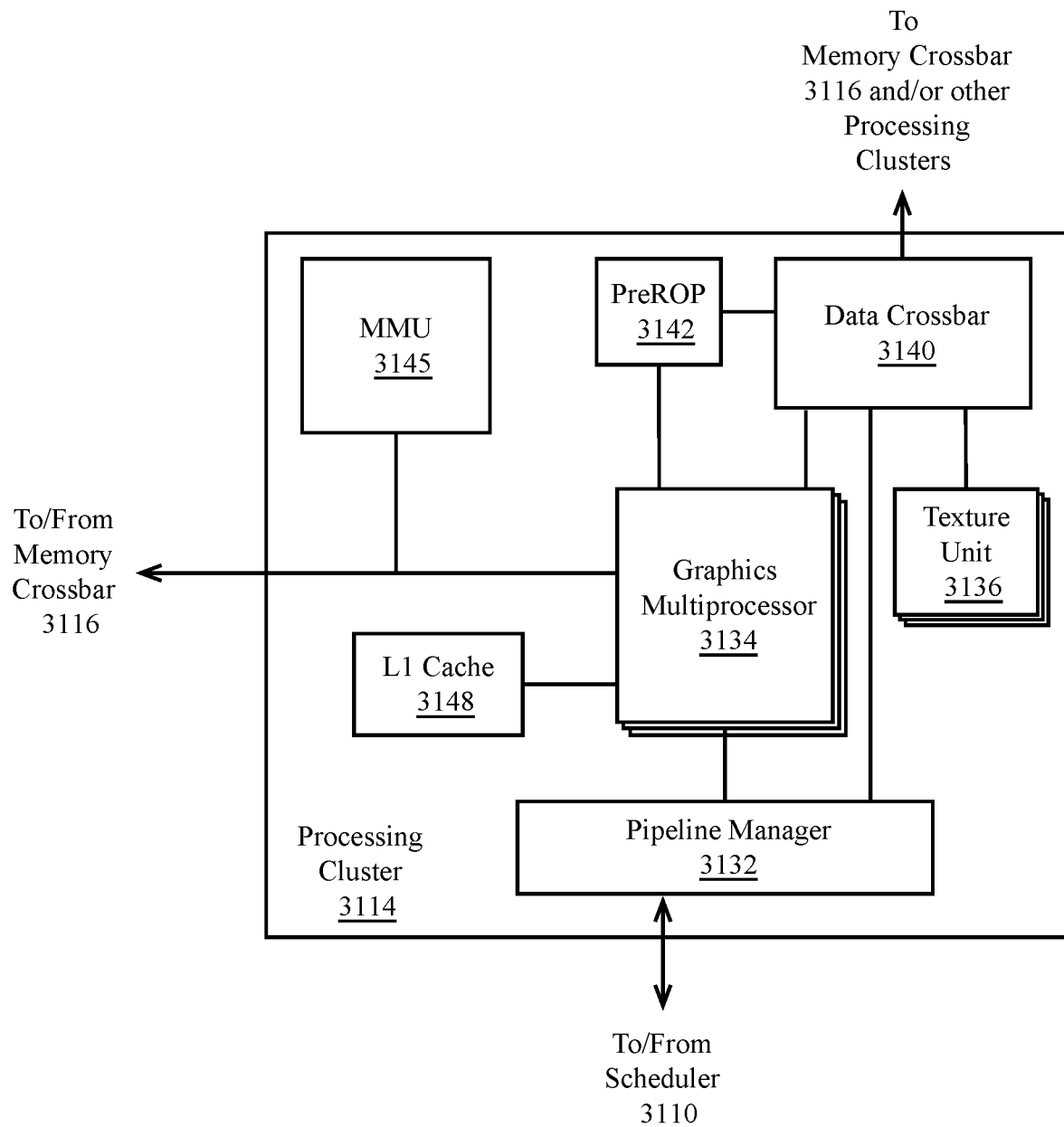

FIG. 31C is a block diagram of a processing cluster 3114 within a parallel processing unit, according to an embodiment. In one embodiment, the processing cluster is an instance of one of the processing clusters 3114A-3114N of FIG. 31. The processing cluster 3114 can be configured to execute many threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 3114 can be controlled via a pipeline manager 3132 that distributes processing tasks to SIMT parallel processors. The pipeline manager 3132 receives instructions from the scheduler 3110 of FIG. 31 and manages execution of those instructions via a graphics multiprocessor 3134 and/or a texture unit 3136. The illustrated graphics multiprocessor 3134 is an exemplary instance of a SIMT parallel processor. However, various types of SIMT parallel processors of differing architectures may be included within the processing cluster 3114. One or more instances of the graphics multiprocessor 3134 can be included within a processing cluster 3114. The graphics multiprocessor 3134 can process data and a data crossbar 3140 can be used to distribute the processed data to one of multiple possible destinations, including other shader units. The pipeline manager 3132 can facilitate the distribution of processed data by specifying destinations for processed data to be distributed vis the data crossbar 3140.

Each graphics multiprocessor 3134 within the processing cluster 3114 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. In one embodiment the same functional-unit hardware can be leveraged to perform different operations and any combination of functional units may be present.

The instructions transmitted to the processing cluster 3114 constitutes a thread. A set of threads executing across the set of parallel processing engines is a thread group. A thread group executes the same program on different input data. Each thread within a thread group can be assigned to a different processing engine within a graphics multiprocessor 3134. A thread group may include fewer threads than the number of processing engines within the graphics multiprocessor 3134. When a thread group includes fewer threads than the number of processing engines, one or more of the processing engines may be idle during cycles in which that thread group is being processed. A thread group may also include more threads than the number of processing engines within the graphics multiprocessor 3134. When the thread group includes more threads than the number of processing engines within the graphics multiprocessor 3134, processing can be performed over consecutive clock cycles. In one embodiment multiple thread groups can be executed concurrently on a graphics multiprocessor 3134.

In one embodiment the graphics multiprocessor 3134 includes an internal cache memory to perform load and store operations. In one embodiment, the graphics multiprocessor 3134 can forego an internal cache and use a cache memory (e.g., L1 cache 3148) within the processing cluster 3114. Each graphics multiprocessor 3134 also has access to L2 caches within the partition units (e.g., partition units 3120A-3120N of FIG. 31) that are shared among all processing clusters 3114 and may be used to transfer data between threads. The graphics multiprocessor 3134 may also access off-chip global memory, which can include one or more of local parallel processor memory and/or system memory. Any memory external to the parallel processing unit 3102 may be used as global memory. Embodiments in which the processing cluster 3114 includes multiple instances of the graphics multiprocessor 3134 can share common instructions and data, which may be stored in the L1 cache 3148.

Each processing cluster 3114 may include an MMU 3145 (memory management unit) that is configured to map virtual addresses into physical addresses. In other embodiments, one or more instances of the MMU 3145 may reside within the memory interface 3118 of FIG. 31. The MMU 3145 includes a set of page table entries (PTEs) used to map a virtual address to a physical address of a tile and optionally a cache line index. The MMU 3145 may include address translation lookaside buffers (TLB) or caches that may reside within the graphics multiprocessor 3134 or the L1 cache or processing cluster 3114. The physical address is processed to distribute surface data access locality to allow efficient request interleaving among partition units. The cache line index may be used to determine whether a request for a cache line is a hit or miss.

In graphics and computing applications, a processing cluster 3114 may be configured such that each graphics multiprocessor 3134 is coupled to a texture unit 3136 for performing texture mapping operations, e.g., determining texture sample positions, reading texture data, and filtering the texture data. Texture data is read from an internal texture L1 cache (not shown) or in some embodiments from the L1 cache within graphics multiprocessor 3134 and is fetched from an L2 cache, local parallel processor memory, or system memory, as needed. Each graphics multiprocessor 3134 outputs processed tasks to the data crossbar 3140 to provide the processed task to another processing cluster 3114 for further processing or to store the processed task in an L2 cache, local parallel processor memory, or system memory via the memory crossbar 3116. A preROP 3142 (pre-raster operations unit) is configured to receive data from graphics multiprocessor 3134, direct data to ROP units, which may be located with partition units as described herein (e.g., partition units 3120A-3120N of FIG. 31). The preROP 3142 unit can perform optimizations for color blending, organize pixel color data, and perform address translations.

It will be appreciated that the core architecture described herein is illustrative and that variations and modifications are possible. Any number of processing units, e.g., graphics multiprocessor 3134, texture units 3136, preROPs 3142, etc., may be included within a processing cluster 3114. Further, while only one processing cluster 3114 is shown, a parallel processing unit as described herein may include any number of instances of the processing cluster 3114. In one embodiment, each processing cluster 3114 can be configured to operate independently of other processing clusters 3114 using separate and distinct processing units, L1 caches, etc.

Figure 31D:
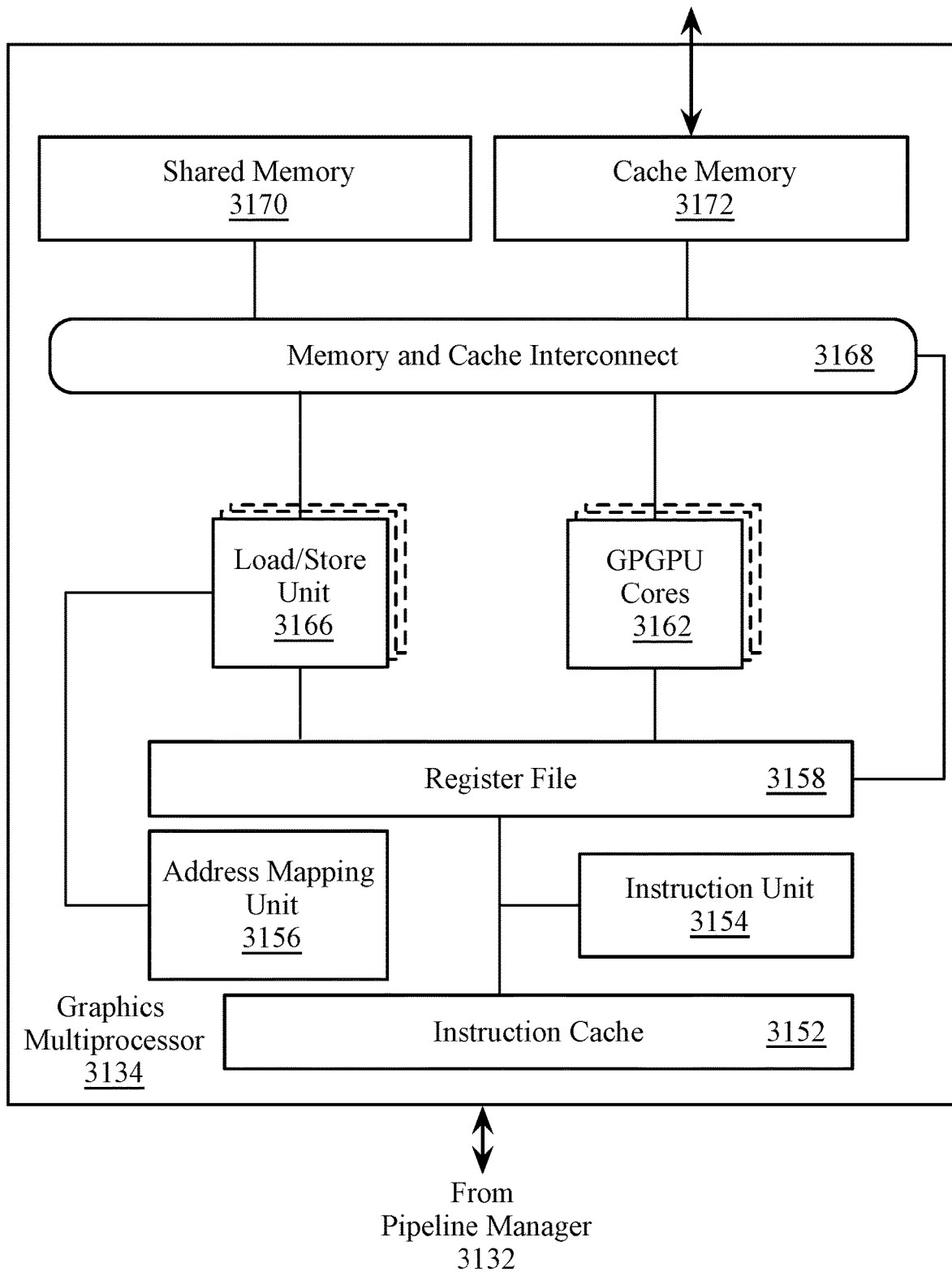

FIG. 31D shows a graphics multiprocessor 3134, according to one embodiment. In such embodiment, the graphics multiprocessor 3134 couples with the pipeline manager 3132 of the processing cluster 3114. The graphics multiprocessor 3134 has an execution pipeline including but not limited to an instruction cache 3152, an instruction unit 3154, an address mapping unit 3156, a register file 3158, one or more general purpose graphics processing unit (GPGPU) cores 3162, and one or more load/store units 3166. The GPGPU cores 3162 and load/store units 3166 are coupled with cache memory 3172 and shared memory 3170 via a memory and cache interconnect 3168.

In one embodiment, the instruction cache 3152 receives a stream of instructions to execute from the pipeline manager 3132. The instructions are cached in the instruction cache 3152 and dispatched for execution by the instruction unit 3154. The instruction unit 3154 can dispatch instructions as thread groups (e.g., warps), with each thread of the thread group assigned to a different execution unit within GPGPU core 3162. An instruction can access any of a local, shared, or global address space by specifying an address within a unified address space. The address mapping unit 3156 can be used to translate addresses in the unified address space into a distinct memory address that can be accessed by the load/store units 3166.

The register file 3158 provides a set of registers for the functional units of the graphics multiprocessor 3134. The register file 3158 provides temporary storage for operands connected to the data paths of the functional units (e.g., GPGPU cores 3162, load/store units 3166) of the graphics multiprocessor 3134. In one embodiment, the register file 3158 is divided between each of the functional units such that each functional unit is allocated a dedicated portion of the register file 3158. In one embodiment, the register file 3158 is divided between the different warps being executed by the graphics multiprocessor 3134.

The GPGPU cores 3162 can each include floating point units (FPUs) and/or integer arithmetic logic units (ALUs) that are used to execute instructions of the graphics multiprocessor 3134. The GPGPU cores 3162 can be similar in architecture or can differ in architecture, according to embodiments. For example, in one embodiment, a first portion of the GPGPU cores 3162 include a single precision FPU and an integer ALU while a second portion of the GPGPU cores include a double precision FPU. In one embodiment, the FPUs can implement the IEEE 754-2008 standard for floating point arithmetic or enable variable precision floating point arithmetic. The graphics multiprocessor 3134 can additionally include one or more fixed function or special function units to perform specific functions such as copy rectangle or pixel blending operations. In one embodiment one or more of the GPGPU cores can also include fixed or special function logic.

In one embodiment, the GPGPU cores 3162 include SIMD logic capable of performing a single instruction on multiple sets of data. In one embodiment GPGPU cores 3162 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can executed via a single SIMD instruction. For example and in one embodiment, eight SIMT threads that perform the same or similar operations can be executed in parallel via a single SIMD8 logic unit.

The memory and cache interconnect 3168 is an interconnect network that connects each of the functional units of the graphics multiprocessor 3134 to the register file 3158 and to the shared memory 3170. In one embodiment, the memory and cache interconnect 3168 is a crossbar interconnect that allows the load/store unit 3166 to implement load and store operations between the shared memory 3170 and the register file 3158. The register file 3158 can operate at the same frequency as the GPGPU cores 3162, thus data transfer between the GPGPU cores 3162 and the register file 3158 is very low latency. The shared memory 3170 can be used to enable communication between threads that execute on the functional units within the graphics multiprocessor 3134. The cache memory 3172 can be used as a data cache for example, to cache texture data communicated between the functional units and the texture unit 3136. The shared memory 3170 can also be used as a program managed cached. Threads executing on the GPGPU cores 3162 can programmatically store data within the shared memory in addition to the automatically cached data that is stored within the cache memory 3172.

Figure 32A:
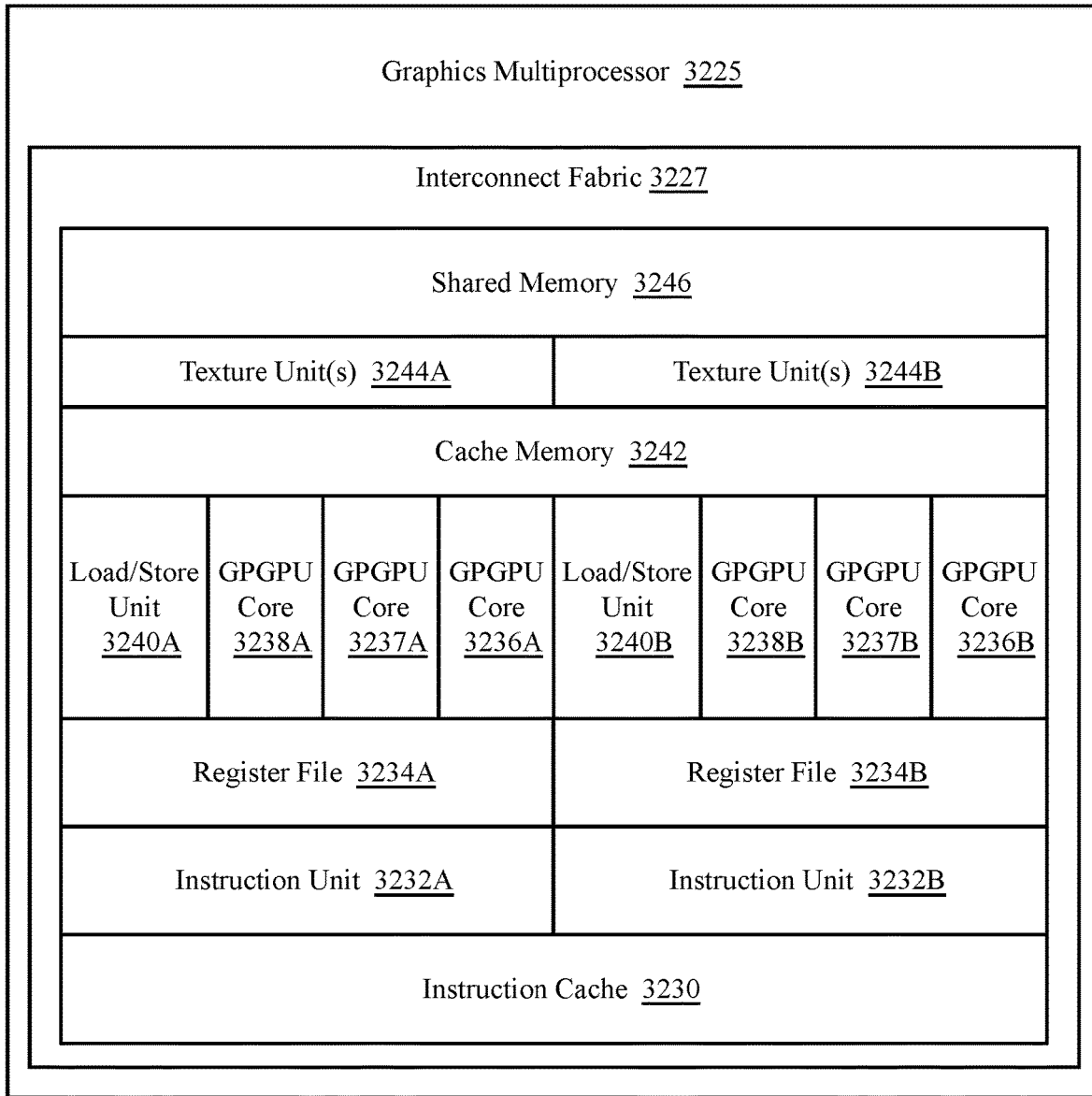
FIGS. 32A-32B are block diagrams of graphics multiprocessors, according to embodiments.
Figure 32B:
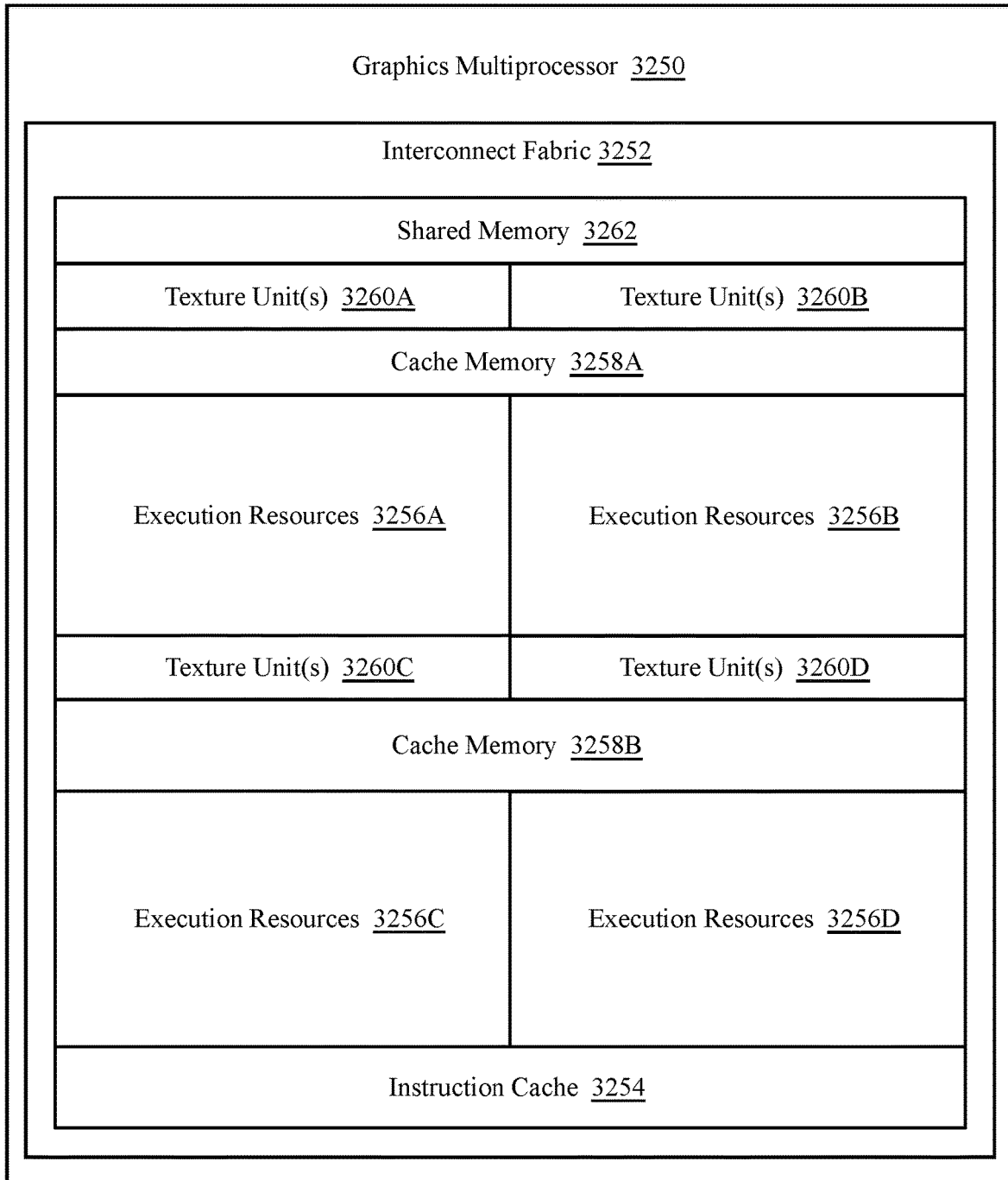

FIGS. 32A-32B illustrate additional graphics multiprocessors, according to embodiments. The illustrated graphics multiprocessors 3225, 3250 are variants of the graphics multiprocessor 3134 of FIG. 31C. The illustrated graphics multiprocessors 3225, 3250 can be configured as a streaming multiprocessor (SM) capable of simultaneous execution of a large number of execution threads.

FIG. 32A shows a graphics multiprocessor 3225 according to an additional embodiment. The graphics multiprocessor 3225 includes multiple additional instances of execution resource units relative to the graphics multiprocessor 3134 of FIG. 31D. For example, the graphics multiprocessor 3225 can include multiple instances of the instruction unit 3232A-3232B, register file 3234A-3234B, and texture unit(s) 3244A-3244B. The graphics multiprocessor 3225 also includes multiple sets of graphics or compute execution units (e.g., GPGPU core 3236A-3236B, GPGPU core 3237A-3237B, GPGPU core 3238A-3238B) and multiple sets of load/store units 3240A-3240B. In one embodiment the execution resource units have a common instruction cache 3230, texture and/or data cache memory 3242, and shared memory 3246.

The various components can communicate via an interconnect fabric 3227. In one embodiment the interconnect fabric 3227 includes one or more crossbar switches to enable communication between the various components of the graphics multiprocessor 3225. In one embodiment the interconnect fabric 3227 is a separate, high-speed network fabric layer upon which each component of the graphics multiprocessor 3225 is stacked. The components of the graphics multiprocessor 3225 communicate with remote components via the interconnect fabric 3227. For example, the GPGPU cores 3236A-3236B, 3237A-3237B, and 32378A-3238B can each communicate with shared memory 3246 via the interconnect fabric 3227. The interconnect fabric 3227 can arbitrate communication within the graphics multiprocessor 3225 to ensure a fair bandwidth allocation between components.

FIG. 32B shows a graphics multiprocessor 3250 according to an additional embodiment. The graphics processor includes multiple sets of execution resources 3256A-3256D, where each set of execution resource includes multiple instruction units, register files, GPGPU cores, and load store units, as illustrated in FIG. 31D and FIG. 32A. The execution resources 3256A-3256D can work in concert with texture unit(s) 3260A-3260D for texture operations, while sharing an instruction cache 3254, and shared memory 3262. In one embodiment the execution resources 3256A-3256D can share an instruction cache 3254 and shared memory 3262, as well as multiple instances of a texture and/or data cache memory 3258A-3258B. The various components can communicate via an interconnect fabric 3252 similar to the interconnect fabric 3227 of FIG. 32A.

Persons skilled in the art will understand that the architecture described in FIGS. 30, 31A-31D, and 32A-32B are descriptive and not limiting as to the scope of the present embodiments. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 3102 of FIG. 31, as well as one or more graphics processors or special purpose processing units, without departure from the scope of the embodiments described herein.

In some embodiments a parallel processor or GPGPU as described herein is communicatively coupled to host/processor cores to accelerate graphics operations, machine-learning operations, pattern analysis operations, and various general purpose GPU (GPGPU) functions. The GPU may be communicatively coupled to the host processor/cores over a bus or other interconnect (e.g., a high speed interconnect such as PCIe or NVLink). In other embodiments, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

Techniques for GPU to Host Processor Interconnection

Figure 33A:
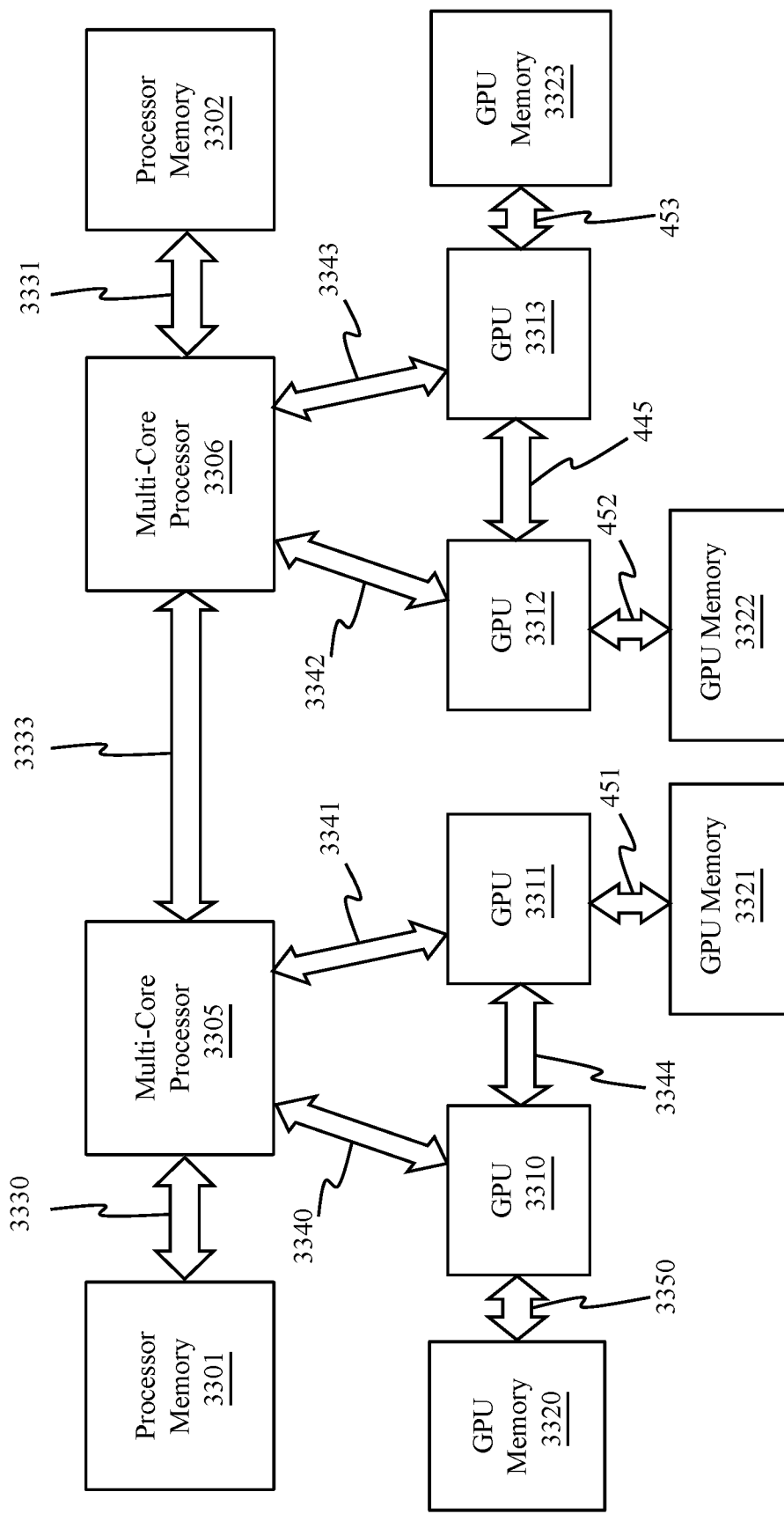
FIGS. 33A-33G illustrate an exemplary architecture in which a plurality of GPUs are communicatively coupled to a plurality of multi-core processors.

FIG. 33A illustrates an exemplary architecture in which a plurality of GPUs 3310-3313 are communicatively coupled to a plurality of multi-core processors 3305-3306 over high-speed links 3340-3343 (e.g., buses, point-to-point interconnects, etc.). In one embodiment, the high-speed links 3340-3343 support a communication throughput of 4 GB/s, 30 GB/s, 80 GB/s or higher, depending on the implementation. Various interconnect protocols may be used including, but not limited to, PCIe 4.0 or 5.0 and NVLink 2.0. However, the underlying principles of the invention are not limited to any particular communication protocol or throughput.

In addition, in one embodiment, two or more of the GPUs 3310-3313 are interconnected over high-speed links 3344-3345, which may be implemented using the same or different protocols/links than those used for high-speed links 3340-3343. Similarly, two or more of the multi-core processors 3305-3306 may be connected over high speed link 3333 which may be symmetric multi-processor (SMP) buses operating at 20 GB/s, 30 GB/s, 120 GB/s or higher. Alternatively, all communication between the various system components shown in FIG. 33A may be accomplished using the same protocols/links (e.g., over a common interconnection fabric). As mentioned, however, the underlying principles of the invention are not limited to any particular type of interconnect technology.

In one embodiment, each multi-core processor 3305-3306 is communicatively coupled to a processor memory 3301-3302, via memory interconnects 3330-3331, respectively, and each GPU 3310-3313 is communicatively coupled to GPU memory 3320-3323 over GPU memory interconnects 3350-3353, respectively. The memory interconnects 3330-3331 and 3350-3353 may utilize the same or different memory access technologies. By way of example, and not limitation, the processor memories 3301-3302 and GPU memories 3320-3323 may be volatile memories such as dynamic random access memories (DRAMs) (including stacked DRAMs), Graphics DDR SDRAM (GDDR) (e.g., GDDR5, GDDR6), or High Bandwidth Memory (HBM) and/or may be non-volatile memories such as 3D XPoint or Nano-Ram. In one embodiment, some portion of the memories may be volatile memory and another portion may be non-volatile memory (e.g., using a two-level memory (2LM) hierarchy).

As described below, although the various processors 3305-3306 and GPUs 3310-3313 may be physically coupled to a particular memory 3301-3302, 3320-3323, respectively, a unified memory architecture may be implemented in which the same virtual system address space (also referred to as the "effective address" space) is distributed among all of the various physical memories. For example, processor memories 3301-3302 may each comprise 64 GB of the system memory address space and GPU memories 3320-3323 may each comprise 32 GB of the system memory address space (resulting in a total of 256 GB addressable memory in this example).

Figure 33B:
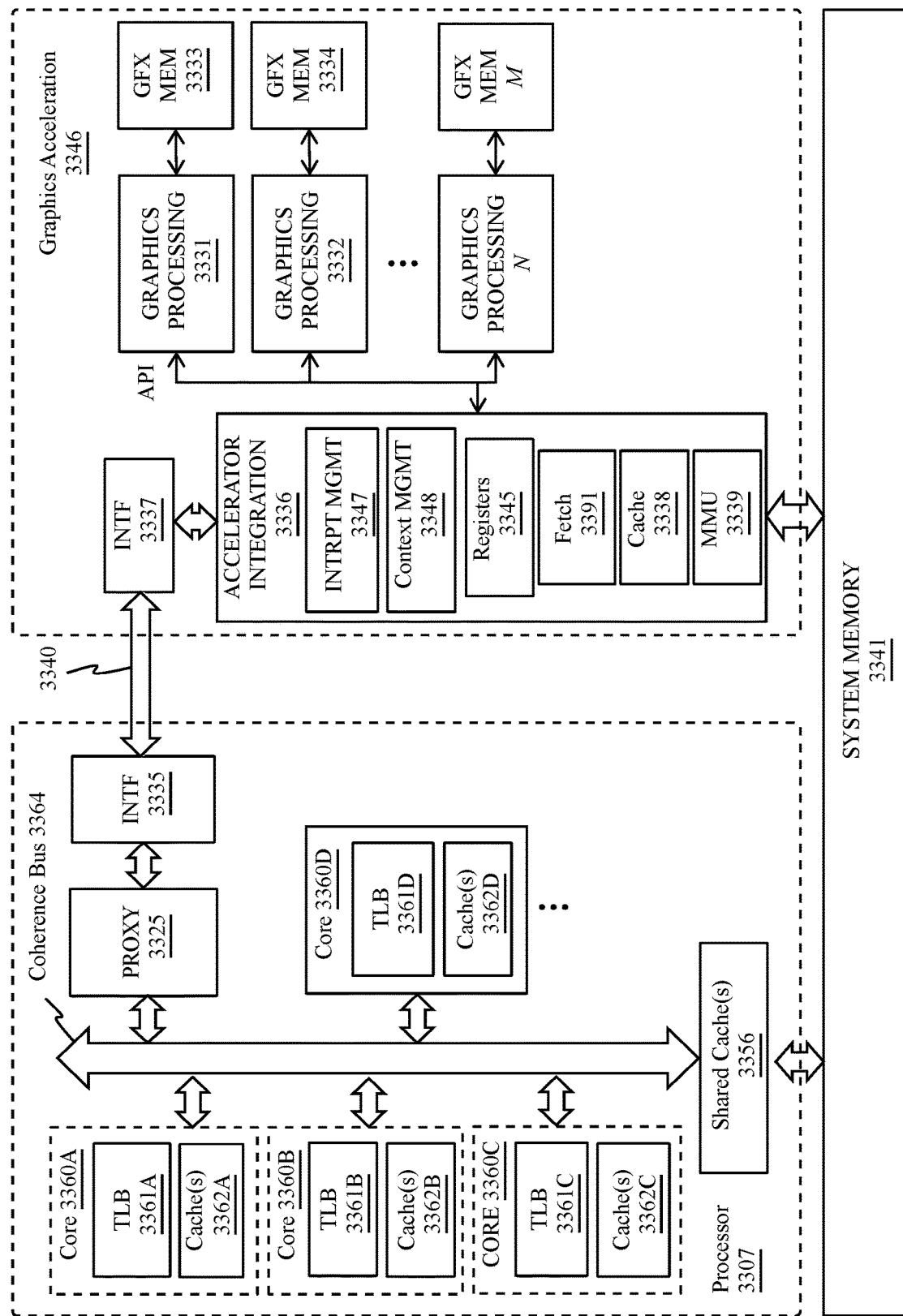

FIG. 33B illustrates additional details for an interconnection between a multi-core processor 3307 and a graphics acceleration module 3346 in accordance with one embodiment. The graphics acceleration module 3346 may include one or more GPU chips integrated on a line card which is coupled to the processor 3307 via the high-speed link 3340. Alternatively, the graphics acceleration module 3346 may be integrated on the same package or chip as the processor 3307.

The illustrated processor 3307 includes a plurality of cores 3360A-3360D, each with a translation lookaside buffer 3361A-3361D and one or more caches 3362A-3362D. The cores may include various other components for executing instructions and processing data which are not illustrated to avoid obscuring the underlying principles of the invention (e.g., instruction fetch units, branch prediction units, decoders, execution units, reorder buffers, etc.). The caches 3362A-3362D may comprise level 1 (L1) and level 2 (L2) caches. In addition, one or more shared caches 3326 may be included in the caching hierarchy and shared by sets of the cores 3360A-3360D. For example, one embodiment of the processor 3307 includes 24 cores, each with its own L1 cache, twelve shared L2 caches, and twelve shared L3 caches. In this embodiment, one of the L2 and L3 caches are shared by two adjacent cores. The processor 3307 and the graphics accelerator integration module 3346 connect with system memory 3341, which may include processor memories 3301-3302.

Coherency is maintained for data and instructions stored in the various caches 3362A-3362D, 3356 and system memory 3341 via inter-core communication over a coherence bus 3364. For example, each cache may have cache coherency logic/circuitry associated therewith to communicate to over the coherence bus 3364 in response to detected reads or writes to particular cache lines. In one implementation, a cache snooping protocol is implemented over the coherence bus 3364 to snoop cache accesses. Cache snooping/coherency techniques are well understood by those of skill in the art and will not be described in detail here to avoid obscuring the underlying principles of the invention.

In one embodiment, a proxy circuit 3325 communicatively couples the graphics acceleration module 3346 to the coherence bus 3364, allowing the graphics acceleration module 3346 to participate in the cache coherence protocol as a peer of the cores. In particular, an interface 3335 provides connectivity to the proxy circuit 3325 over high-speed link 3340 (e.g., a PCIe bus, NVLink, etc.) and an interface 3337 connects the graphics acceleration module 3346 to the link 3340.

In one implementation, an accelerator integration circuit 3336 provides cache management, memory access, context management, and interrupt management services on behalf of a plurality of graphics processing engines 3331, 3332, N of the graphics acceleration module 3346. The graphics processing engines 3331, 3332, N may each comprise a separate graphics processing unit (GPU). Alternatively, the graphics processing engines 3331, 3332, N may comprise different types of graphics processing engines within a GPU such as graphics execution units, media processing engines (e.g., video encoders/decoders), samplers, and blit engines. In other words, the graphics acceleration module may be a GPU with a plurality of graphics processing engines 3331-3332, N or the graphics processing engines 3331-3332, N may be individual GPUs integrated on a common package, line card, or chip.

In one embodiment, the accelerator integration circuit 3336 includes a memory management unit (MMU) 3339 for performing various memory management functions such as virtual-to-physical memory translations (also referred to as effective-to-real memory translations) and memory access protocols for accessing system memory 3341. The MMU 3339 may also include a translation lookaside buffer (TLB) (not shown) for caching the virtual/effective to physical/real address translations. In one implementation, a cache 3338 stores commands and data for efficient access by the graphics processing engines 3331-3332, N. In one embodiment, the data stored in cache 3338 and graphics memories 3333-3334, N is kept coherent with the core caches 3362A-3362D, 3356 and system memory 3311. As mentioned, this may be accomplished via proxy circuit 3325 which takes part in the cache coherency mechanism on behalf of cache 3338 and memories 3333-3334, N (e.g., sending updates to the cache 3338 related to modifications/accesses of cache lines on processor caches 3362A-3362D, 3356 and receiving updates from the cache 3338).

A set of registers 3349 store context data for threads executed by the graphics processing engines 3331-3332, N and a context management circuit 3348 manages the thread contexts. For example, the context management circuit 3348 may perform save and restore operations to save and restore contexts of the various threads during contexts switches (e.g., where a first thread is saved and a second thread is stored so that the second thread can be execute by a graphics processing engine). For example, on a context switch, the context management circuit 3348 may store current register values to a designated region in memory (e.g., identified by a context pointer). It may then restore the register values when returning to the context. In one embodiment, an interrupt management circuit 3347 receives and processes interrupts received from system devices.

In one implementation, virtual/effective addresses from a graphics processing engine 3331 are translated to real/physical addresses in system memory 3311 by the MMU 3339. One embodiment of the accelerator integration circuit 3336 supports multiple (e.g., 4, 8, 16) graphics accelerator modules 3346 and/or other accelerator devices. The graphics accelerator module 3346 may be dedicated to a single application executed on the processor 3307 or may be shared between multiple applications. In one embodiment, a virtualized graphics execution environment is presented in which the resources of the graphics processing engines 3331-3332, N are shared with multiple applications or virtual machines (VMs). The resources may be subdivided into "slices" which are allocated to different VMs and/or applications based on the processing requirements and priorities associated with the VMs and/or applications.

Thus, the accelerator integration circuit acts as a bridge to the system for the graphics acceleration module 3346 and provides address translation and system memory cache services. In addition, the accelerator integration circuit 3336 may provide virtualization facilities for the host processor to manage virtualization of the graphics processing engines, interrupts, and memory management.

Because hardware resources of the graphics processing engines 3331-3332, N are mapped explicitly to the real address space seen by the host processor 3307, any host processor can address these resources directly using an effective address value. One function of the accelerator integration circuit 3336, in one embodiment, is the physical separation of the graphics processing engines 3331-3332, N so that they appear to the system as independent units.

As mentioned, in the illustrated embodiment, one or more graphics memories 3333-3334, M are coupled to each of the graphics processing engines 3331-3332, N, respectively. The graphics memories 3333-3334, M store instructions and data being processed by each of the graphics processing engines 3331-3332, N. The graphics memories 3333-3334, M may be volatile memories such as DRAMs (including stacked DRAMs), GDDR memory (e.g., GDDR5, GDDR6), or HBM, and/or may be non-volatile memories such as 3D XPoint or Nano-Ram.

In one embodiment, to reduce data traffic over link 3340, biasing techniques are used to ensure that the data stored in graphics memories 3333-3334, M is data which will be used most frequently by the graphics processing engines 3331-3332, N and preferably not used by the cores 3360A-3360D (at least not frequently). Similarly, the biasing mechanism attempts to keep data needed by the cores (and preferably not the graphics processing engines 3331-3332, N) within the caches 3362A-3362D, 3356 of the cores and system memory 3311.

Figure 33C:
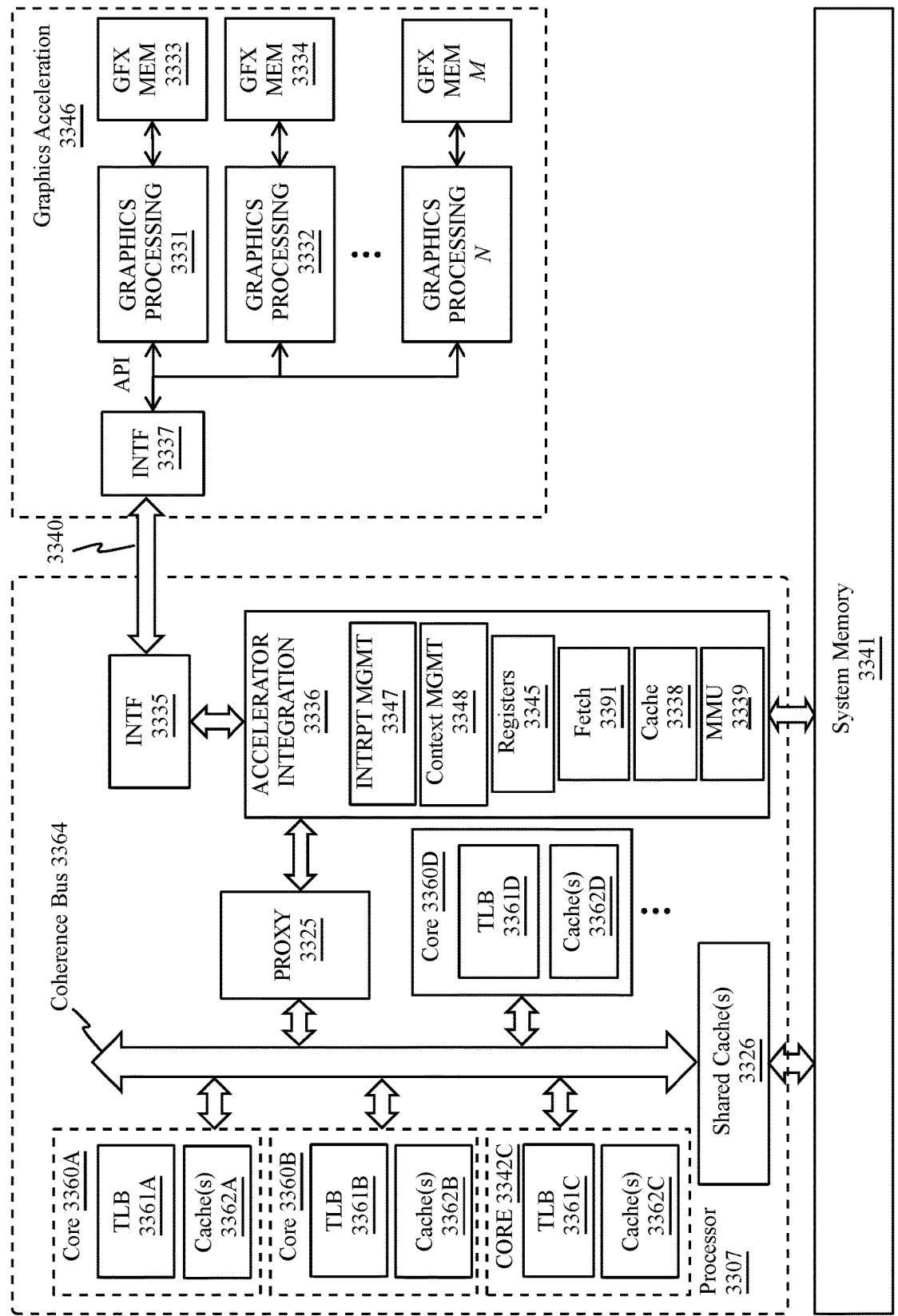

FIG. 33C illustrates another embodiment in which the accelerator integration circuit 3336 is integrated within the processor 3307. In this embodiment, the graphics processing engines 3331-3332, N communicate directly over the high-speed link 3340 to the accelerator integration circuit 3336 via interface 3337 and interface 3335 (which, again, may be utilize any form of bus or interface protocol). The accelerator integration circuit 3336 may perform the same operations as those described with respect to FIG. 33B, but potentially at a higher throughput given its close proximity to the coherency bus 3362 and caches 3362A-3362D, 3326.

One embodiment supports different programming models including a dedicated-process programming model (no graphics acceleration module virtualization) and shared programming models (with virtualization). The latter may include programming models which are controlled by the accelerator integration circuit 3336 and programming models which are controlled by the graphics acceleration module 3346.

In one embodiment of the dedicated process model, graphics processing engines 3331-3332, N are dedicated to a single application or process under a single operating system. The single application can funnel other application requests to the graphics engines 3331-3332, N, providing virtualization within a VM/partition.

In the dedicated-process programming models, the graphics processing engines 3331-3332, N, may be shared by multiple VM/application partitions. The shared models require a system hypervisor to virtualize the graphics processing engines 3331-3332, N to allow access by each operating system. For single-partition systems without a hypervisor, the graphics processing engines 3331-3332, N are owned by the operating system. In both cases, the operating system can virtualize the graphics processing engines 3331-3332, N to provide access to each process or application.

For the shared programming model, the graphics acceleration module 3346 or an individual graphics processing engine 3331-3332, N selects a process element using a process handle. In one embodiment, process elements are stored in system memory 3311 and are addressable using the effective address to real address translation techniques described herein. The process handle may be an implementation-specific value provided to the host process when registering its context with the graphics processing engine 3331-3332, N (that is, calling system software to add the process element to the process element linked list). The lower 16-bits of the process handle may be the offset of the process element within the process element linked list.

Figure 33D:
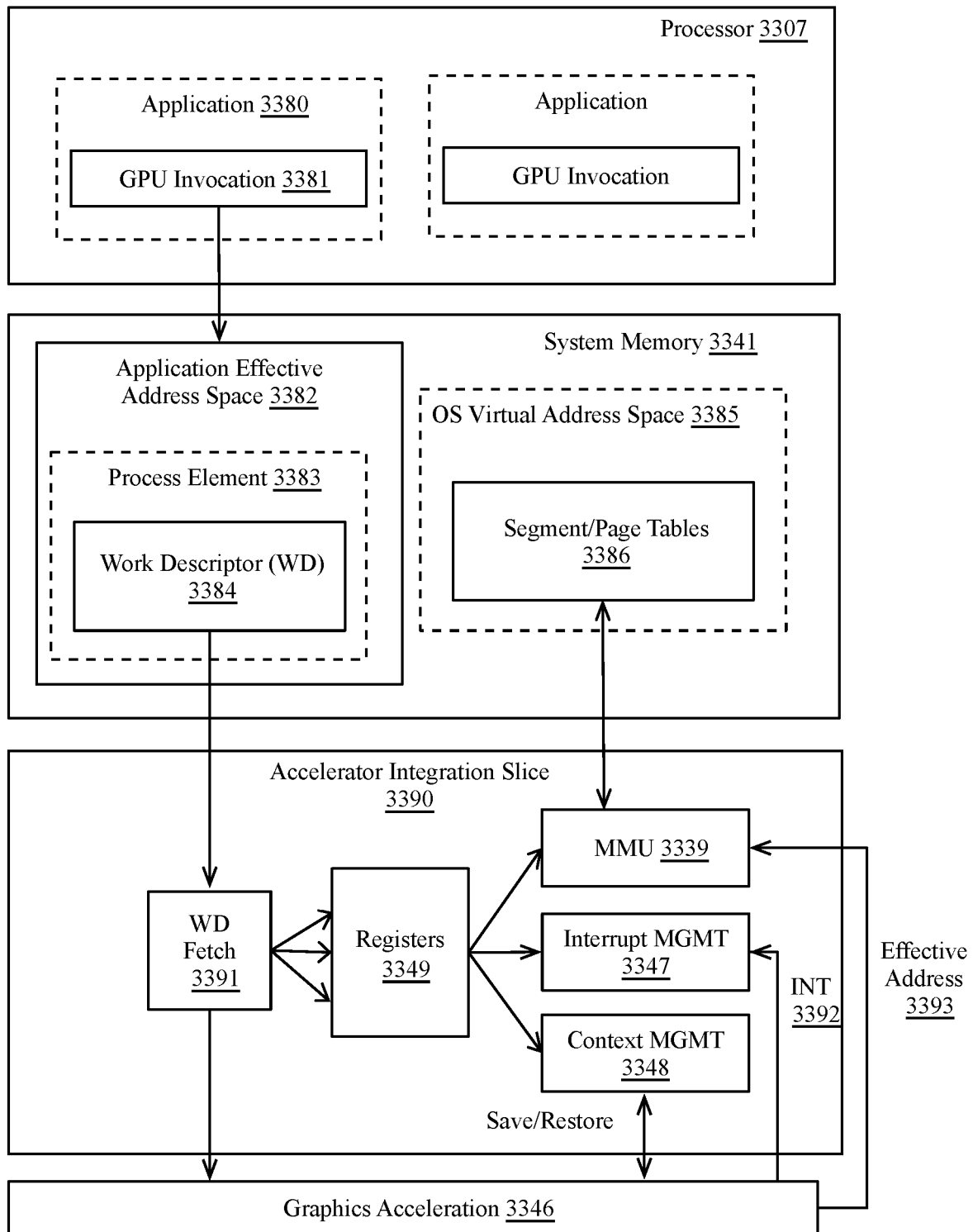

FIG. 33D illustrates an exemplary accelerator integration slice 3390. As used herein, a "slice" comprises a specified portion of the processing resources of the accelerator integration circuit 3336. Application effective address space 3382 within system memory 3311 stores process elements 3383. In one embodiment, the process elements 3383 are stored in response to GPU invocations 3381 from applications 3380 executed on the processor 3307. A process element 3383 contains the process state for the corresponding application 3380. A work descriptor (WD) 3384 contained in the process element 3383 can be a single job requested by an application or may contain a pointer to a queue of jobs. In the latter case, the WD 3384 is a pointer to the job request queue in the application's address space 3382.

The graphics acceleration module 3346 and/or the individual graphics processing engines 3331-3332, N can be shared by all or a subset of the processes in the system. Embodiments of the invention include an infrastructure for setting up the process state and sending a WD 3384 to a graphics acceleration module 3346 to start a job in a virtualized environment.

In one implementation, the dedicated-process programming model is implementation-specific. In this model, a single process owns the graphics acceleration module 3346 or an individual graphics processing engine 3331. Because the graphics acceleration module 3346 is owned by a single process, the hypervisor initializes the accelerator integration circuit 3336 for the owning partition and the operating system initializes the accelerator integration circuit 3336 for the owning process at the time when the graphics acceleration module 3346 is assigned.

In operation, a WD fetch unit 3391 in the accelerator integration slice 3390 fetches the next WD 3384 which includes an indication of the work to be done by one of the graphics processing engines of the graphics acceleration module 3346. Data from the WD 3384 may be stored in registers 3349 and used by the MMU 3339, interrupt management circuit 3347 and/or context management circuit 3346 as illustrated. For example, one embodiment of the MMU 3339 includes segment/page walk circuitry for accessing segment/page tables 3386 within the OS virtual address space 3385. The interrupt management circuit 3347 may process interrupt events 3392 received from the graphics acceleration module 3346. When performing graphics operations, an effective address 3393 generated by a graphics processing engine 3331-3332, N is translated to a real address by the MMU 3339.

In one embodiment, the same set of registers 3349 are duplicated for each graphics processing engine 3331-3332, N and/or graphics acceleration module 3346 and may be initialized by the hypervisor or operating system. Each of these duplicated registers may be included in an accelerator integration slice 3390. Exemplary registers that may be initialized by the hypervisor are shown in Table 1.

TABLE 1

Hypervisor Initialized Registers

1 Slice Control Register
2 Real Address (RA) Scheduled Processes Area Pointer
3 Authority Mask Override Register
4 Interrupt Vector Table Entry Offset
5 Interrupt Vector Table Entry Limit
6 State Register
7 Logical Partition ID
8 Real address (RA) Hypervisor Accelerator Utilization Record Pointer
9 Storage Description Register Exemplary registers that may be initialized by the operating system are shown in Table 2.

TABLE 2

Operating System Initialized Registers

1 Process and Thread Identification
2 Effective Address (EA) Context Save/Restore Pointer
3 Virtual Address (VA) Accelerator Utilization Record Pointer
4 Virtual Address (VA) Storage Segment Table Pointer
5 Authority Mask
6 Work descriptor In one embodiment, each WD 3384 is specific to a particular graphics acceleration module 3346 and/or graphics processing engine 3331-3332, N. It contains all the information a graphics processing engine 3331-3332, N requires to do its work or it can be a pointer to a memory location where the application has set up a command queue of work to be completed.

Figure 33E:
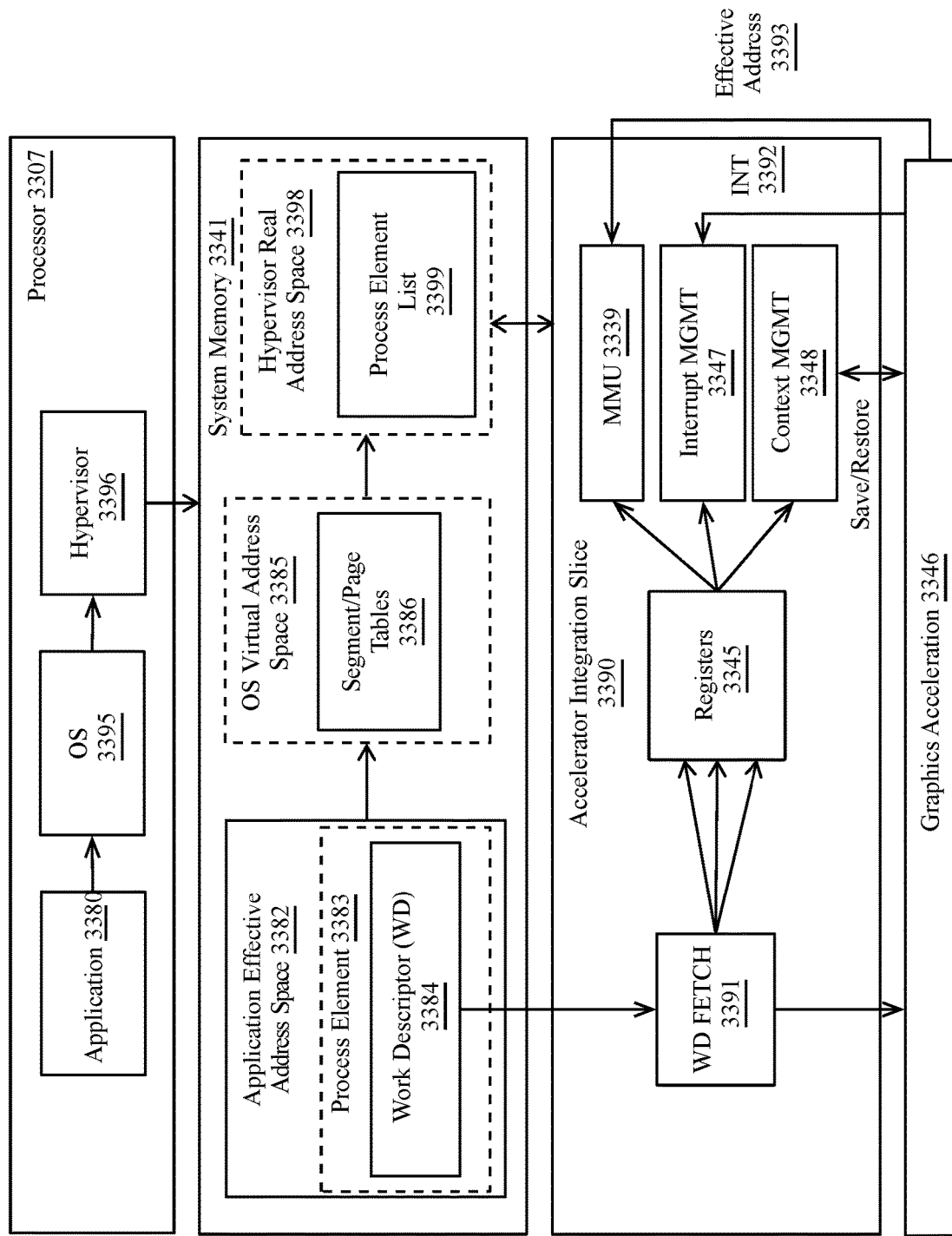

FIG. 33E illustrates additional details for one embodiment of a shared model. This embodiment includes a hypervisor real address space 3398 in which a process element list 3399 is stored. The hypervisor real address space 3398 is accessible via a hypervisor 3396 which virtualizes the graphics acceleration module engines for the operating system 3395.

The shared programming models allow for all or a subset of processes from all or a subset of partitions in the system to use a graphics acceleration module 3346. There are two programming models where the graphics acceleration module 3346 is shared by multiple processes and partitions: time-sliced shared and graphics directed shared.

In this model, the system hypervisor 3396 owns the graphics acceleration module 3346 and makes its function available to all operating systems 3395. For a graphics acceleration module 3346 to support virtualization by the system hypervisor 3396, the graphics acceleration module 3346 may adhere to the following requirements: 1) An application's job request must be autonomous (that is, the state does not need to be maintained between jobs), or the graphics acceleration module 3346 must provide a context save and restore mechanism. 2) An application's job request is guaranteed by the graphics acceleration module 3346 to complete in a specified amount of time, including any translation faults, or the graphics acceleration module 3346 provides the ability to preempt the processing of the job. 3) The graphics acceleration module 3346 must be guaranteed fairness between processes when operating in the directed shared programming model.

In one embodiment, for the shared model, the application 3380 is required to make an operating system 3395 system call with a graphics acceleration module 3346 type, a work descriptor (WD), an authority mask register (AMR) value, and a context save/restore area pointer (CSRP). The graphics acceleration module 3346 type describes the targeted acceleration function for the system call. The graphics acceleration module 3346 type may be a system-specific value. The WD is formatted specifically for the graphics acceleration module 3346 and can be in the form of a graphics acceleration module 3346 command, an effective address pointer to a user-defined structure, an effective address pointer to a queue of commands, or any other data structure to describe the work to be done by the graphics acceleration module 3346. In one embodiment, the AMR value is the AMR state to use for the current process. The value passed to the operating system is similar to an application setting the AMR. If the accelerator integration circuit 3336 and graphics acceleration module 3346 implementations do not support a User Authority Mask Override Register (UAMOR), the operating system may apply the current UAMOR value to the AMR value before passing the AMR in the hypervisor call. The hypervisor 3396 may optionally apply the current Authority Mask Override Register (AMOR) value before placing the AMR into the process element 3383. In one embodiment, the CSRP is one of the registers 3349 containing the effective address of an area in the application's address space 3382 for the graphics acceleration module 3346 to save and restore the context state. This pointer is optional if no state is required to be saved between jobs or when a job is preempted. The context save/restore area may be pinned system memory.

Upon receiving the system call, the operating system 3395 may verify that the application 3380 has registered and been given the authority to use the graphics acceleration module 3346. The operating system 3395 then calls the hypervisor 3396 with the information shown in Table 3.

TABLE 3

OS to Hypervisor Call Parameters

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)

Upon receiving the hypervisor call, the hypervisor 3396 verifies that the operating system 3395 has registered and been given the authority to use the graphics acceleration module 3346. The hypervisor 3396 then puts the process element 3383 into the process element linked list for the corresponding graphics acceleration module 3346 type. The process element may include the information shown in Table 4.

TABLE 4

Process Element Information

1 A work descriptor (WD)
2 An Authority Mask Register (AMR) value (potentially masked).
3 An effective address (EA) Context Save/Restore Area Pointer (CSRP)
4 A process ID (PID) and optional thread ID (TID)
5 A virtual address (VA) accelerator utilization record pointer (AURP)
6 The virtual address of the storage segment table pointer (SSTP)
7 A logical interrupt service number (LISN)
8 Interrupt vector table, derived from the hypervisor call parameters.
9 A state register (SR) value
10 A logical partition ID (LPID)
11 A real address (RA) hypervisor accelerator utilization record pointer
12 The Storage Descriptor Register (SDR)

In one embodiment, the hypervisor initializes a plurality of accelerator integration slice 3390 registers 3349.

Figure 33F:
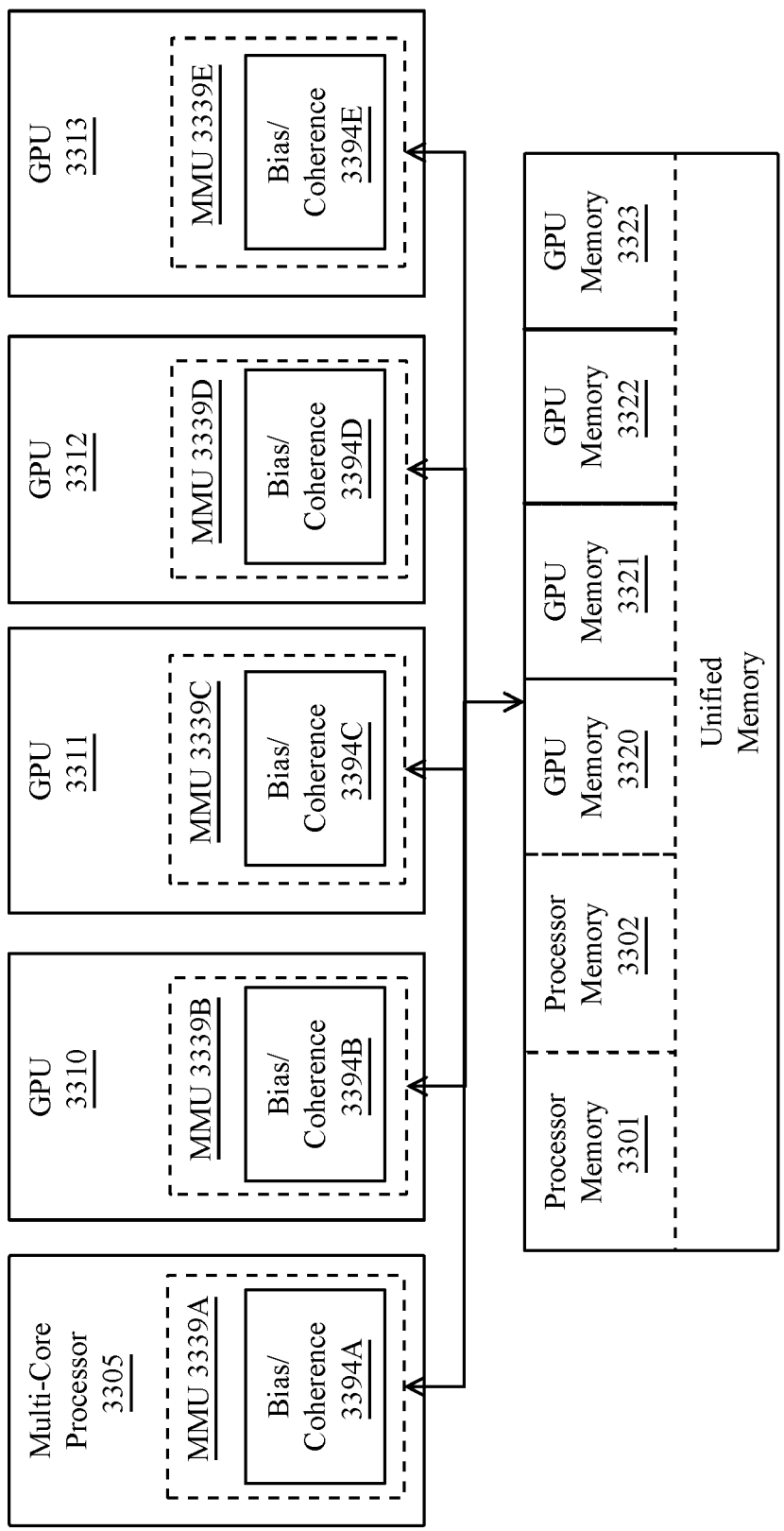

As illustrated in FIG. 33F, one embodiment of the invention employs a unified memory addressable via a common virtual memory address space used to access the physical processor memories 3301-3302 and GPU memories 3320-3323. In this implementation, operations executed on the GPUs 3310-3313 utilize the same virtual/effective memory address space to access the processors memories 3301-3302 and vice versa, thereby simplifying programmability. In one embodiment, a first portion of the virtual/effective address space is allocated to the processor memory 3301, a second portion to the second processor memory 3302, a third portion to the GPU memory 3320, and so on. The entire virtual/effective memory space (sometimes referred to as the effective address space) is thereby distributed across each of the processor memories 3301-3302 and GPU memories 3320-3323, allowing any processor or GPU to access any physical memory with a virtual address mapped to that memory.

In one embodiment, bias/coherence management circuitry 3394A-3394E within one or more of the MMUs 3339A-3339E ensures cache coherence between the caches of the host processors (e.g., 3305) and the GPUs 3310-3313 and implements biasing techniques indicating the physical memories in which certain types of data should be stored. While multiple instances of bias/coherence management circuitry 3394A-3394E are illustrated in FIG. 33F, the bias/coherence circuitry may be implemented within the MMU of one or more host processors 3305 and/or within the accelerator integration circuit 3336.

One embodiment allows GPU-attached memory 3320-3323 to be mapped as part of system memory, and accessed using shared virtual memory (SVM) technology, but without suffering the typical performance drawbacks associated with full system cache coherence. The ability to GPU-attached memory 3320-3323 to be accessed as system memory without onerous cache coherence overhead provides a beneficial operating environment for GPU offload. This arrangement allows the host processor 3305 software to setup operands and access computation results, without the overhead of tradition I/O DMA data copies. Such traditional copies involve driver calls, interrupts and memory mapped I/O (MMIO) accesses that are all inefficient relative to simple memory accesses. At the same time, the ability to access GPU attached memory 3320-3323 without cache coherence overheads can be critical to the execution time of an offloaded computation. In cases with substantial streaming write memory traffic, for example, cache coherence overhead can significantly reduce the effective write bandwidth seen by a GPU 3310-3313. The efficiency of operand setup, the efficiency of results access, and the efficiency of GPU computation all play a role in determining the effectiveness of GPU offload.

In one implementation, the selection of between GPU bias and host processor bias is driven by a bias tracker data structure. A bias table may be used, for example, which may be a page-granular structure (i.e., controlled at the granularity of a memory page) that includes 1 or 2 bits per GPU-attached memory page. The bias table may be implemented in a stolen memory range of one or more GPU-attached memories 3320-3323, with or without a bias cache in the GPU 3310-3313 (e.g., to cache frequently/recently used entries of the bias table). Alternatively, the entire bias table may be maintained within the GPU.

In one implementation, the bias table entry associated with each access to the GPU-attached memory 3320-3323 is accessed prior the actual access to the GPU memory, causing the following operations. First, local requests from the GPU 3310-3313 that find their page in GPU bias are forwarded directly to a corresponding GPU memory 3320-3323. Local requests from the GPU that find their page in host bias are forwarded to the processor 3305 (e.g., over a high-speed link as discussed above). In one embodiment, requests from the processor 3305 that find the requested page in host processor bias complete the request like a normal memory read. Alternatively, requests directed to a GPU-biased page may be forwarded to the GPU 3310-3313. The GPU may then transition the page to a host processor bias if it is not currently using the page.

The bias state of a page can be changed either by a software-based mechanism, a hardware-assisted software-based mechanism, or, for a limited set of cases, a purely hardware-based mechanism.

One mechanism for changing the bias state employs an API call (e.g. OpenCL), which, in turn, calls the GPU's device driver which, in turn, sends a message (or enqueues a command descriptor) to the GPU directing it to change the bias state and, for some transitions, perform a cache flushing operation in the host. The cache flushing operation is required for a transition from host processor 3305 bias to GPU bias, but is not required for the opposite transition.

In one embodiment, cache coherency is maintained by temporarily rendering GPU-biased pages uncacheable by the host processor 3305. To access these pages, the processor 3305 may request access from the GPU 3310 which may or may not grant access right away, depending on the implementation. Thus, to reduce communication between the processor 3305 and GPU 3310 it is beneficial to ensure that GPU-biased pages are those which are required by the GPU but not the host processor 3305 and vice versa.

Figure 33G:
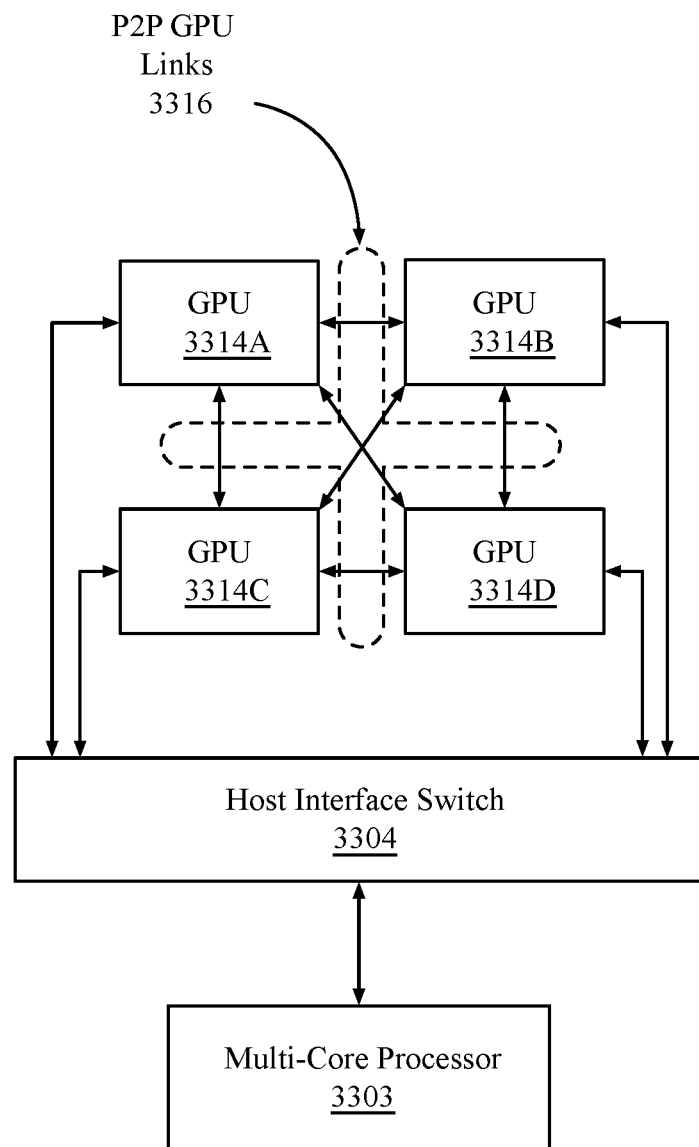

FIG. 33G illustrates a multi-GPU computing system, according to an embodiment. The multi-GPU computing system can include a processor 3303 coupled to multiple GPUs 3314A-3314D via a host interface switch 3304. The host interface switch 3304, in one embodiment, is a PCI express switch device that couples the processor 3303 to a PCI express bus over which the processor 3303 can communicate with the set of GPUs 3314A-3314D. The GPUs 3314A-3314D can interconnect via a set of high-speed point to point GPU to GPU links 3316. The high-speed GPU to GPU links can connect to each of the GPUs 3314A-3314D via a dedicated GPU link, such as the GPU link DPLAB10 as in FIG. DPLAB. The P2P GPU links 3316 enable direct communication between each of the GPUs 3314A-3314D without requiring communication over the host interface bus to which the processor 3303 is connected. With GPU-to-GPU traffic directed to the P2P GPU links, the host interface bus remains available for system memory access or to communicate with other instances of the multi-GPU computing system 3300, for example, via one or more network devices. While in the illustrated embodiment the GPUs 3314A-3314D connect to the processor 3303 via the host interface switch 3304, in one embodiment the processor 3303 includes direct support for the P2P GPU links 3316 and can connect directly to the GPUs 3314A-3314D.

Graphics Processing Pipeline

Figure 34:
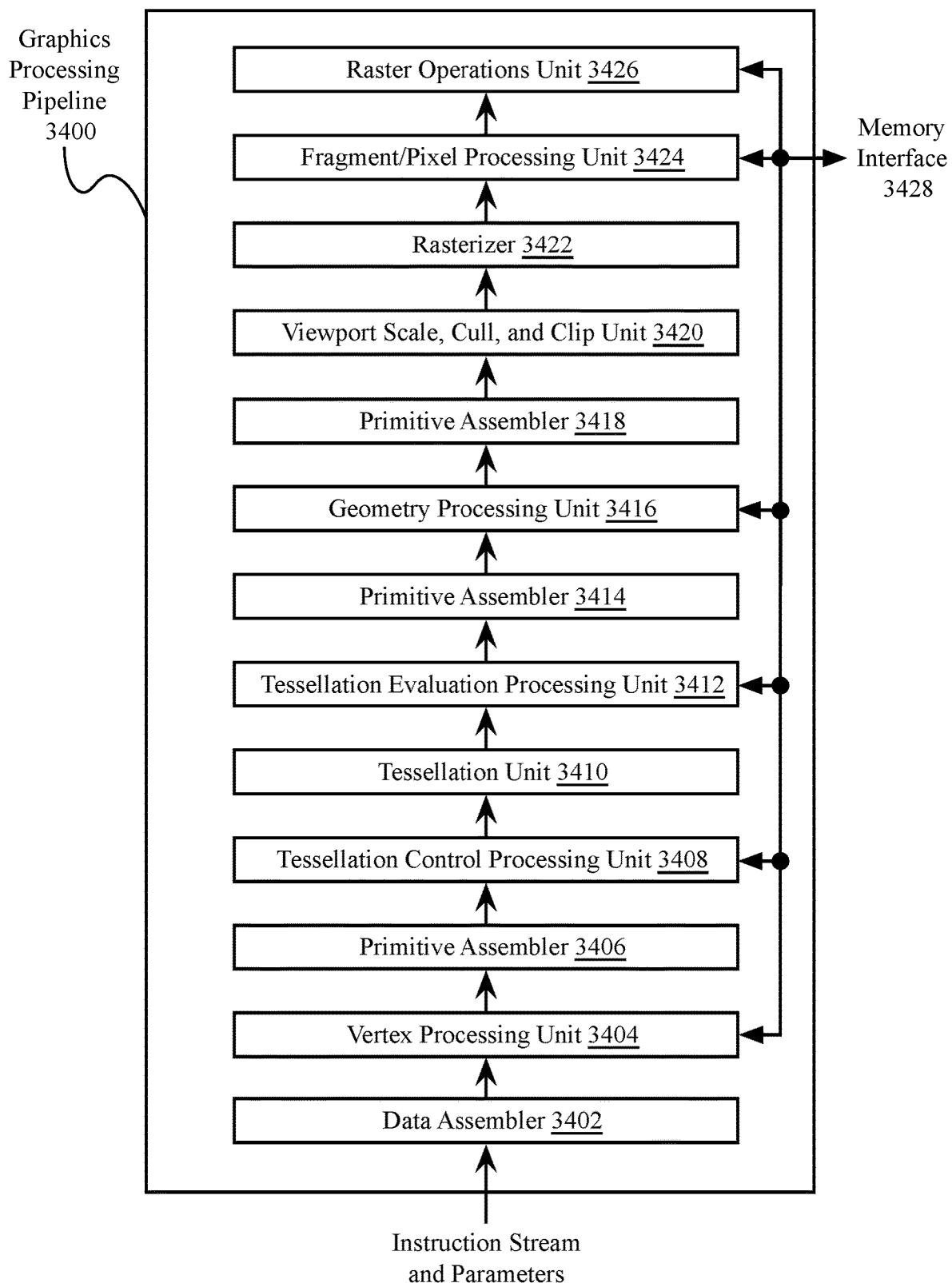
FIG. 34 illustrates a graphics processing pipeline, according to an embodiment.

FIG. 34 illustrates a graphics processing pipeline 3400, according to an embodiment. In one embodiment, a graphics processor can implement the illustrated graphics processing pipeline 3400. The graphics processor can be included within the parallel processing subsystems as described herein, such as the parallel processor 3100 of FIG. 31, which, in one embodiment, is a variant of the parallel processor(s) 3012 of FIG. 30. The various parallel processing systems can implement the graphics processing pipeline 3400 via one or more instances of the parallel processing unit (e.g., parallel processing unit 3102 of FIG. 31) as described herein. For example, a shader unit (e.g., graphics multiprocessor 3134 of FIG. 31) may be configured to perform the functions of one or more of a vertex processing unit 3404, a tessellation control processing unit 3408, a tessellation evaluation processing unit 3412, a geometry processing unit 3416, and a fragment/pixel processing unit 3424. The functions of data assembler 3402, primitive assemblers 3406, 3414, 3418, tessellation unit 3410, rasterizer 3422, and raster operations unit 3426 may also be performed by other processing engines within a processing cluster (e.g., processing cluster 3114 of FIG. 3) and a corresponding partition unit (e.g., partition unit 3120A-3120N of FIG. 31). The graphics processing pipeline 3400 may also be implemented using dedicated processing units for one or more functions. In one embodiment, one or more portions of the graphics processing pipeline 3400 can be performed by parallel processing logic within a general-purpose processor (e.g., CPU). In one embodiment, one or more portions of the graphics processing pipeline 3400 can access on-chip memory (e.g., parallel processor memory 3122 as in FIG. 31) via a memory interface 3428, which may be an instance of the memory interface 3118 of FIG. 31.

In one embodiment, the data assembler 3402 is a processing unit that collects vertex data for surfaces and primitives. The data assembler 3402 then outputs the vertex data, including the vertex attributes, to the vertex processing unit 3404. The vertex processing unit 3404 is a programmable execution unit that executes vertex shader programs, lighting and transforming vertex data as specified by the vertex shader programs. The vertex processing unit 3404 reads data that is stored in cache, local or system memory for use in processing the vertex data and may be programmed to transform the vertex data from an object-based coordinate representation to a world space coordinate space or a normalized device coordinate space.

A first instance of a primitive assembler 3406 receives vertex attributes from the vertex processing unit 3404. The primitive assembler 3406 readings stored vertex attributes as needed and constructs graphics primitives for processing by tessellation control processing unit 3408. The graphics primitives include triangles, line segments, points, patches, and so forth, as supported by various graphics processing application programming interfaces (APIs).

The tessellation control processing unit 3408 treats the input vertices as control points for a geometric patch. The control points are transformed from an input representation from the patch (e.g., the patch's bases) to a representation that is suitable for use in surface evaluation by the tessellation evaluation processing unit 3412. The tessellation control processing unit 3408 can also compute tessellation factors for edges of geometric patches. A tessellation factor applies to a single edge and quantifies a view-dependent level of detail associated with the edge. A tessellation unit 3410 is configured to receive the tessellation factors for edges of a patch and to tessellate the patch into multiple geometric primitives such as line, triangle, or quadrilateral primitives, which are transmitted to a tessellation evaluation processing unit 3412. The tessellation evaluation processing unit 3412 operates on parameterized coordinates of the subdivided patch to generate a surface representation and vertex attributes for each vertex associated with the geometric primitives.

A second instance of a primitive assembler 3414 receives vertex attributes from the tessellation evaluation processing unit 3412, reading stored vertex attributes as needed, and constructs graphics primitives for processing by the geometry processing unit 3416. The geometry processing unit 3416 is a programmable execution unit that executes geometry shader programs to transform graphics primitives received from primitive assembler 3414 as specified by the geometry shader programs. In one embodiment the geometry processing unit 3416 is programmed to subdivide the graphics primitives into one or more new graphics primitives and calculate parameters used to rasterize the new graphics primitives.

In some embodiments the geometry processing unit 3416 can add or delete elements in the geometry stream. The geometry processing unit 3416 outputs the parameters and vertices specifying new graphics primitives to primitive assembler 3418. The primitive assembler 3418 receives the parameters and vertices from the geometry processing unit 3416 and constructs graphics primitives for processing by a viewport scale, cull, and clip unit 3420. The geometry processing unit 3416 reads data that is stored in parallel processor memory or system memory for use in processing the geometry data. The viewport scale, cull, and clip unit 3420 performs clipping, culling, and viewport scaling and outputs processed graphics primitives to a rasterizer 3422.

The rasterizer 3422 can perform depth culling and other depth-based optimizations. The rasterizer 3422 also performs scan conversion on the new graphics primitives to generate fragments and output those fragments and associated coverage data to the fragment/pixel processing unit 3424. The fragment/pixel processing unit 3424 is a programmable execution unit that is configured to execute fragment shader programs or pixel shader programs. The fragment/pixel processing unit 3424 transforming fragments or pixels received from rasterizer 3422, as specified by the fragment or pixel shader programs. For example, the fragment/pixel processing unit 3424 may be programmed to perform operations included but not limited to texture mapping, shading, blending, texture correction and perspective correction to produce shaded fragments or pixels that are output to a raster operations unit 3426. The fragment/pixel processing unit 3424 can read data that is stored in either the parallel processor memory or the system memory for use when processing the fragment data. Fragment or pixel shader programs may be configured to shade at sample, pixel, tile, or other granularities depending on the sampling rate configured for the processing units.

The raster operations unit 3426 is a processing unit that performs raster operations including, but not limited to stencil, z test, blending, and the like, and outputs pixel data as processed graphics data to be stored in graphics memory (e.g., parallel processor memory 3122 as in FIG. 31, and/or system memory 3004 as in FIG. 30, to be displayed on the one or more display device(s) 3010 or for further processing by one of the one or more processor(s) 3002 or parallel processor(s) 3012. In some embodiments the raster operations unit 3426 is configured to compress z or color data that is written to memory and decompress z or color data that is read from memory.

The foregoing description and drawings are to be regarded in an illustrative rather than a restrictive sense. Persons skilled in the art will understand that various modifications and changes may be made to the embodiments described herein without departing from the broader spirit and scope of the invention as set forth in the appended claims.

In some embodiments, an apparatus for compression of untyped data includes a graphical processing unit (GPU) including a data compression pipeline, the data compression pipeline including a data port coupled with one or more shader cores, wherein the data port is to allow transfer of untyped data without format conversion, and a 3D compression/decompression unit to provide for compression of untyped data to be stored to a memory subsystem and decompression of untyped data from the memory subsystem.

In some embodiments, the apparatus is to utilize fixed sequential blocks for storage of the untyped data.

In some embodiments, the apparatus is to convert a buffer for the untyped data to a stateful buffer, the stateful buffer to identify untyped data for compression.

In some embodiments, memory allocation of the untyped data is to be determined by software, and wherein a GPU driver is to determine whether the untyped data is to be compressed.

In some embodiments, the apparatus is to pass one or more hints regarding data compression of the untyped data to the GPU driver.

In some embodiments, the one or more hints include one or more of whether compression should be enabled for a buffer and a native data size that maps to the buffer.

In some embodiments, the GPU driver is to allocate an auxiliary buffer to store compression metadata.

In some embodiments, the data compression pipeline further includes a surface state cache to hold a surface state.

In some embodiments, the apparatus is to provide decompression of compressed untyped data without copying the data.

In some embodiments, the apparatus is to change a description or pointer to a buffer for the untyped data from a compressed designation to an uncompressed designation.

In some embodiments, the untyped data is machine learning or deep learning data.

In some embodiments, a non-transitory computer-readable storage medium having stored thereon data representing sequences of instructions that, when executed by one or more processors, cause the one or more processors to perform operations comprising receiving untyped data for processing by a graphical processing unit (GPU) including a data compression pipeline; determining by a GPU driver to compress the untyped data; and performing compression of untyped data by the data compression pipeline, wherein the data compression pipeline includes a 3D compression/decompression unit to provide for compression of untyped data to be stored to a memory subsystem and decompression of untyped data from the memory subsystem.

In some embodiments, the medium further includes instructions for receiving a request to read untyped data from system memory; reading a block of data from a memory surface via a first surface state to one or more memory arrays; and writing back the block of data as uncompressed data to the memory surface via a second surface state.

In some embodiments, the medium further includes instructions for preventing any thread other than a current thread from accessing the block of data until processing is completed.

In some embodiments, the medium further includes instructions for, upon the entire memory surface being written, writing to the memory surface to indicate the memory surface is not compressed.

In some embodiments, the medium further includes instructions for converting a buffer for the untyped data to a stateful buffer, the stateful buffer to identify untyped data for compression.

In some embodiments, the medium further includes instructions for passing one or more hints regarding data compression of the untyped data to the GPU driver.

In some embodiments, the medium further includes instructions for allocating an auxiliary buffer to store compression metadata for the compression of the untyped.

In some embodiments, an apparatus includes means for receiving untyped data for processing by a graphical processing unit (GPU) including a data compression pipeline; means for determining by a GPU driver to compress the untyped data; and means for performing compression of untyped data by the data compression pipeline, wherein the data compression pipeline includes a 3D compression/decompression unit to provide for compression of untyped data to be stored to a memory subsystem and decompression of untyped data from the memory subsystem.

In some embodiments, the apparatus further includes means for receiving a request to read untyped data from system memory; means for reading a block of data via a first surface state to one or more memory arrays; and means for writing back the block of data as uncompressed data to the memory surface via a second surface state.

In some embodiments, the apparatus further includes means for preventing any thread other than a current thread from accessing the block of data until processing is completed.

In some embodiments, t the apparatus further includes means for writing to the memory surface to indicate the memory surface is not compressed upon the entire memory surface being written.

In some embodiments, the apparatus further includes means for converting a buffer for the untyped data to a stateful buffer, the stateful buffer to identify untyped data for compression.

In some embodiments, the apparatus further includes means for passing one or more hints regarding data compression of the untyped data to the GPU driver.

In some embodiments, the apparatus further includes means for allocating an auxiliary buffer to store compression metadata for the compression of the untyped.

In some embodiments, a method includes receiving untyped data for processing by a graphical processing unit (GPU) including a data compression pipeline; determining by a GPU driver to compress the untyped data; and performing compression of untyped data by the data compression pipeline, wherein the data compression pipeline includes a 3D compression/decompression unit to provide for compression of untyped data to be stored to a memory subsystem and decompression of untyped data from the memory subsystem.

In some embodiments, the method further includes receiving a request to read untyped data from system memory; reading a block of data via a first surface state to one or more memory arrays; and writing back the block of data as uncompressed data to the memory surface via a second surface state.

In some embodiments, the method further includes preventing any thread other than a current thread from accessing the block of data until processing is completed.

In some embodiments, the method further includes, upon the entire memory surface being written, writing to the memory surface to indicate the memory surface is not compressed.

In some embodiments, the method further includes converting a buffer for the untyped data to a stateful buffer, the stateful buffer to identify untyped data for compression.

In some embodiments, the method further includes passing one or more hints regarding data compression of the untyped data to the GPU driver.

In some embodiments, the method further includes allocating an auxiliary buffer to store compression metadata for the compression of the untyped.

In some embodiments, a processing system includes a central processing unit (CPU); a system memory; and a graphical processing unit (GPU) a graphical processing unit (GPU) including a data compression pipeline, the data compression pipeline including a data port coupled with one or more shader cores, wherein the data port is to allow transfer of untyped data without format conversion, and a 3D compression/decompression unit to provide for compression of untyped data to be stored to a memory subsystem and decompression of untyped data from the memory subsystem.

In some embodiments, the system is to utilize fixed sequential blocks for storage of the untyped data.

In some embodiments, the system is to convert a buffer for the untyped data to a stateful buffer, the stateful buffer to identify untyped data for compression.

In some embodiments, the data compression pipeline further includes a surface state cache to hold a surface state.

In some embodiments, the system is to provide decompression of compressed untyped data without copying the data.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

The terms "logic", "module", "component", "engine", "mechanism", "tool", "circuit", and "circuitry" are referenced interchangeably throughout this document and may include, by way of example, software, hardware, firmware, or any combination thereof.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer. In some embodiments, a non-transitory computer-readable storage medium has stored thereon data representing sequences of instructions that, when executed by a processor, cause the processor to perform certain operations.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus comprising:
one or more processors including a graphical processing unit (GPU); and
a memory to store data, including data for machine learning;
wherein the one or more processors are to:
train an original model utilizing a training set of data, the original model being a machine learning model,
perform inference with the original model using a set of unlabeled data examples to generate a set of outputs,
generate a set of pseudo labels for the unlabeled data examples based on the generated set of outputs from the trained original model, and generating a pseudo-labeled data set using the unlabeled data and the generated pseudo labels,
compress the original model to generate a compressed model, and
train the compressed model at a lower precision than a precision of the original model, the training of the compressed model utilizing the pseudo-labeled data set.

2. The apparatus of claim 1, wherein the one or more processors are further to perform one or more additional iterations of model compression, including:
further compress the trained compressed model to generate a second compressed model; and
train the second compressed model utilizing the pseudo-labeled data set.

3. The apparatus of claim 1, wherein the one or more processors are further to:
evaluate accuracy of the compressed model by performing inference with the trained compressed model utilizing a validation set of data.

4. The apparatus of claim 1, wherein compressing the trained original model includes one or more of:
reducing a number of layers from the trained original model; or
reducing a width of one or more layers of the trained original model.

5. The apparatus of claim 1, wherein performing inference with the original model using the set of unlabeled data examples includes collecting the generated set of outputs as a vector of values.

6. The apparatus of claim 5, wherein training the compressed model includes teaching the compressed model to generate the vector of values.

7. The apparatus of claim 1, wherein one or more of the unlabeled data examples are generated based on one or more data elements of the training set of data.

8. The apparatus of claim 1, wherein the compressed model is trained for installation in an edge device for a system.

9. A non-transitory computer-readable storage medium having stored thereon data representing sequences of instructions that, when executed by one or more processors, cause the one or more processors to perform operations comprising:
training an original model utilizing a training set of data, the original model being a machine learning model;
performing inference with the original model using a set of unlabeled data examples to generate a set of outputs;
generating a set of pseudo labels for the unlabeled data examples based on the generated set of outputs from the trained original model, and generating a pseudo-labeled data set using the unlabeled data and the generated pseudo labels;
compressing the original model to generate a compressed model; and
training the compressed model at a lower precision than a precision of the original model, the training of the compressed model utilizing the pseudo-labeled data set.

10. The medium of claim 9, further comprising instructions that, when executed by the one or more processors, cause the one or more processors to perform operations comprising:
performing one or more additional iterations of model compression, including:
further compressing the trained compressed model to generate a second compressed model; and
training the second compressed model utilizing the pseudo-labeled data set.

11. The medium of claim 9, further comprising instructions that, when executed by the one or more processors, cause the one or more processors to perform operations comprising:
evaluate accuracy of the compressed model by performing inference with the trained compressed model utilizing a validation set of data.

12. The medium of claim 9, wherein compressing the trained original model includes one or more of:
reducing a number of layers from the trained original model; or
reducing a width of one or more layers of the trained original model.

13. The medium of claim 9, wherein performing inference with the original model using the set of unlabeled data examples includes collecting the generated set of outputs as a vector of values.

14. The medium of claim 13, wherein training the compressed model includes teaching the compressed model to generate the vector of values.

15. A method comprising:
training an original model in a computing system utilizing a training set of data, the original model being a machine learning model;
performing inference with the original model using a set of unlabeled data examples to generate a set of outputs;
generating a set of pseudo labels for the unlabeled data examples based on the generated set of outputs from the trained original model, and generating a pseudo-labeled data set using the unlabeled data and the generated pseudo labels;
compressing the original model to generate a compressed model; and
training the compressed model at a lower precision than a precision of the original model, the training of the compressed model utilizing the pseudo-labeled data set.

16. The method of claim 15, further comprising:
performing one or more additional iterations of model compression, including:
further compressing the trained compressed model to generate a second compressed model; and
training the second compressed model utilizing the pseudo-labeled data set.

17. The method of claim 15, further comprising:
evaluate accuracy of the compressed model by performing inference with the trained compressed model utilizing a validation set of data.

18. The method of claim 15, wherein compressing the trained original model includes one or more of:
reducing a number of layers from the trained original model; or
reducing a width of one or more layers of the trained original model.

19. The method of claim 15, wherein performing inference with the original model using the set of unlabeled data examples includes collecting the generated set of outputs as a vector of values.

20. The method of claim 19, wherein training the compressed model includes teaching the compressed model to generate the vector of values.

* * * * *